US012674745B2

(12) United States Patent
Alsheimer et al.

(10) Patent No.: US 12,674,745 B2
(45) Date of Patent: Jul. 7, 2026

(54) SAMPLE CARRIER AND METHOD FOR IMAGING A SAMPLE

(71) Applicant: LEICA MICROSYSTEMS CMS GMBH, Wetzlar (DE)

(72) Inventors: Soeren Alsheimer, Wetzlar (DE); Joachim Bradl, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 120 days.

(21) Appl. No.: 18/698,429

(22) PCT Filed: Sep. 30, 2022

(86) PCT No.: PCT/EP2022/077378

§ 371 (c)(1),
(2) Date: Apr. 4, 2024

(87) PCT Pub. No.: WO2023/057348

PCT Pub. Date: Apr. 13, 2023

(65) Prior Publication Data

US 2024/0410818 A1 Dec. 12, 2024

(30) Foreign Application Priority Data

Oct. 5, 2021 (EP) .................................... 21200992

(51) Int. Cl.
*G01N 21/05* (2006.01)
*G01N 21/64* (2006.01)
(Continued)

(52) U.S. Cl.
CPC ........... *G01N 21/05* (2013.01); *G01N 21/645* (2013.01); *G02B 21/0076* (2013.01);
(Continued)

(58) Field of Classification Search
CPC .... G01N 21/05; G01N 21/33; G01N 21/0303; G01N 2021/6482
See application file for complete search history.

(56) References Cited

U.S. PATENT DOCUMENTS 7,554,725 B2    6/2009  Stelzer et al.
8,619,237 B2   12/2013  Hillman et al.
(Continued)

FOREIGN PATENT DOCUMENTS

DE      202013012338 U1    6/2016
DE      102019214929 A1    4/2021
(Continued)

OTHER PUBLICATIONS

Badur, Thorben et al.; "High Refractive Index Polymers by Design"; *Macromolecules*; May 24, 2018; pp. 4220-4228; vol. 51, No. 11; ACS Publications; Washington, D.C., USA.
(Continued)

*Primary Examiner* — Thanh Luu
(74) *Attorney, Agent, or Firm* — LEYDIG, VOIT & MAYER, LTD.

(57) ABSTRACT

A sample carrier for receiving a sample includes an optical medium in which the sample is received, the optical medium having a first refractive index. A window portion defining two parallel surfaces includes an optically transparent material having a second refractive index, and is arranged at a bottom side of the sample carrier. The first and second refractive indices do not deviate by more than 2.5%.

20 Claims, 43 Drawing Sheets

(51) Int. Cl.
  *G02B 21/00*    (2006.01)
  *G02B 21/33*    (2006.01)
  *G02B 21/34*    (2006.01)

(52) U.S. Cl.
  CPC ............. *G02B 21/33* (2013.01); *G02B 21/34*
  (2013.01); *G01N 2021/6482* (2013.01)

(56)      References Cited

U.S. PATENT DOCUMENTS

| | | |
|---|---|---|
| 9,061,474 B2 | 6/2015 | Ju et al. |
| 10,632,696 B2 | 4/2020 | Tanaka et al. |
| 11,371,927 B2 | 6/2022 | Kalkbrenner et al. |
| 2019/0353884 A1 | 11/2019 | Hedde et al. |
| 2021/0010920 A1* | 1/2021 | Taniguchi ............ G01N 21/253 |
| 2022/0326498 A1* | 10/2022 | Oreopoulos ......... G02B 6/0006 |

FOREIGN PATENT DOCUMENTS

| | | |
|---|---|---|
| EP | 1254190 B1 | 2/2008 |
| EP | 2801855 A1 | 11/2014 |
| EP | 3757550 A1 | 12/2020 |
| WO | WO 2004/053558 A1 | 6/2004 |
| WO | WO 2010/012980 A1 | 2/2010 |
| WO | WO 2019/063539 A1 | 4/2019 |
| WO | WO 2019/185174 A1 | 10/2019 |
| WO | WO 2022/207125 A1 | 10/2022 |

OTHER PUBLICATIONS

Kaufmann, Anna et al.; "Multilayer mounting enables long-term imaging of zebrafish development in a light sheet microscope"; *Development*; Sep. 1, 2012; pp. 3242-3247; vol. 139; No. 17; The Company of Biologists Ltd.; Cambridge, UK.

Torres-Mapa, Maria Leilani et al.; "Fabrication of a Monolithic Lab-on-a-Chip Platform with Integrated Hydrogel Waveguides for Chemical Sensing"; *Sensors*; Oct. 8, 2019; pp. 1-15; vol. 19, No. 19, Art. 4333; MDPI; Basel, Switzerland.

Wu, Xiuming et al.; "Optically Transparent and Thermal-Stable Polyimide Films Derived from a Semi-Aliphatic Diamine: Synthesis and Properties"; *Macromolecular Chemistry and Physics*; Jan. 29, 2020; pp. 1-7; vol. 221; No. 1900506; Wiley-VCH Verlag GmbH & Co. KGaA; Weinheim, Germany.

\* cited by examiner

FIG. 1B
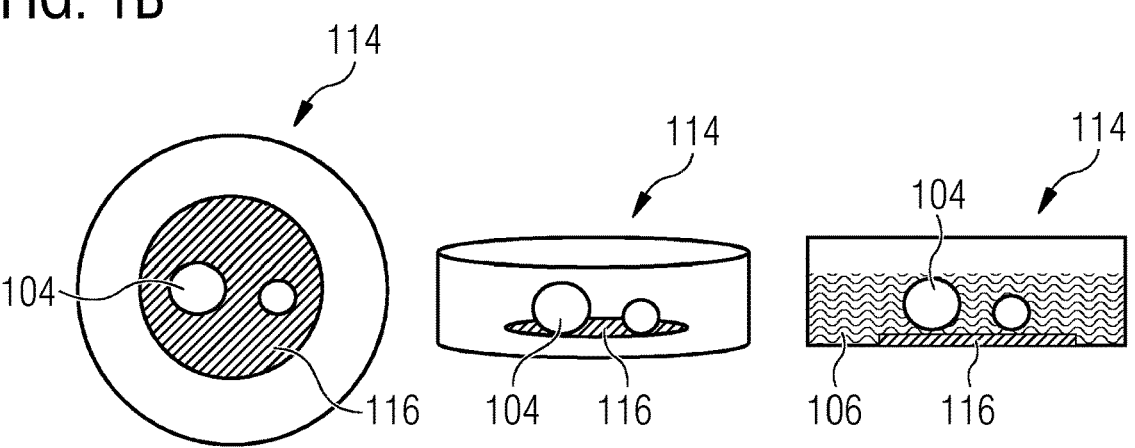
FIG. 1C
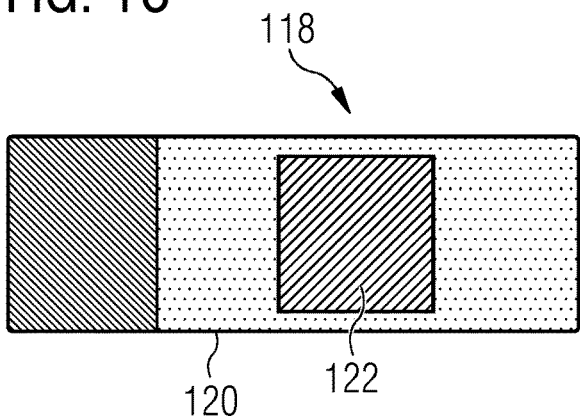
FIG. 1D
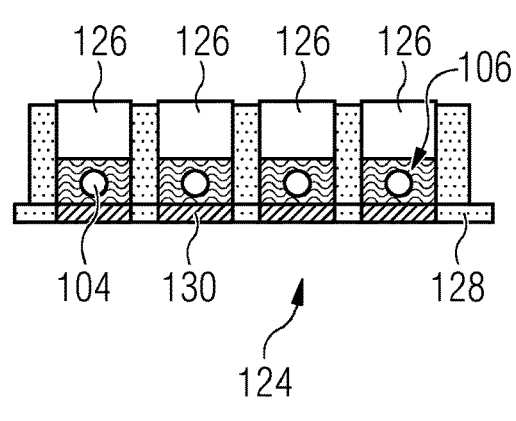
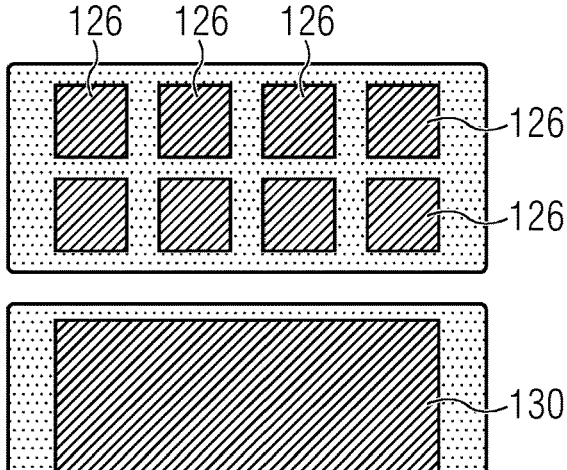

FIG. 2A
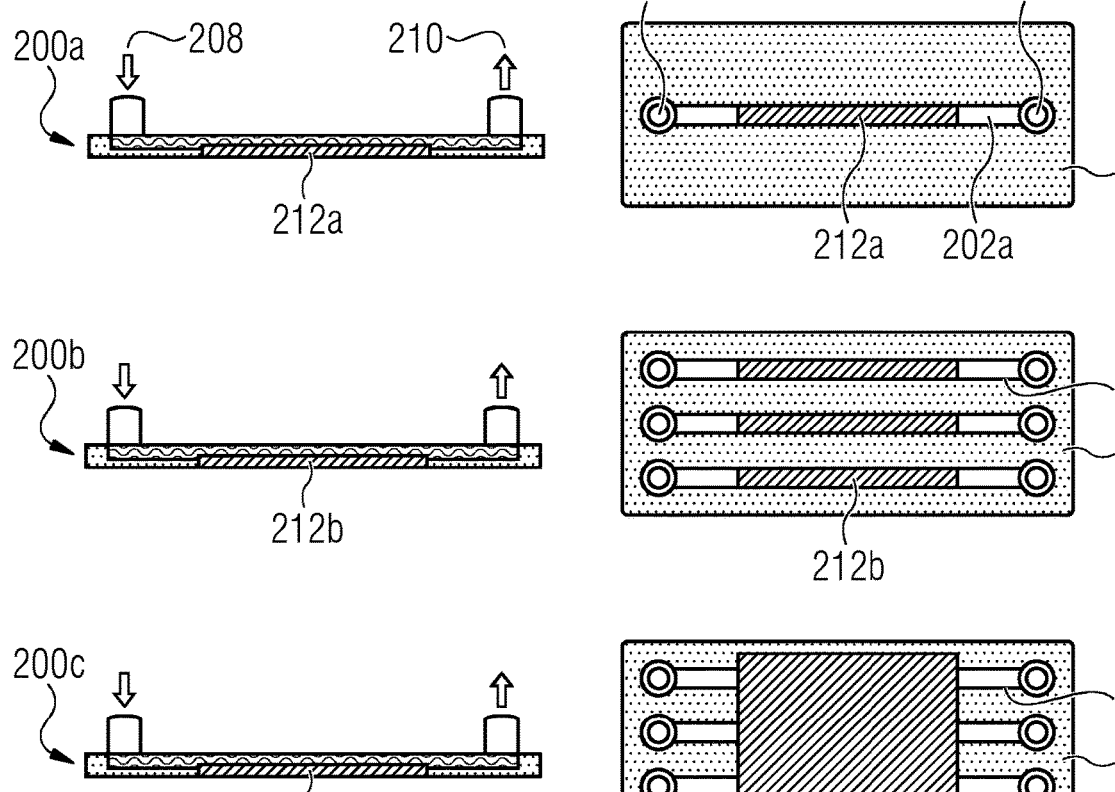
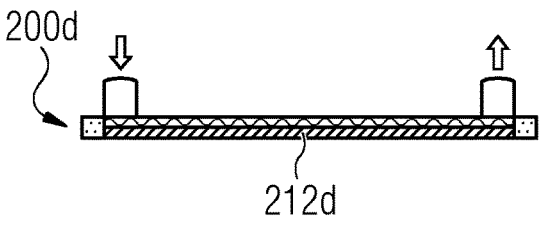
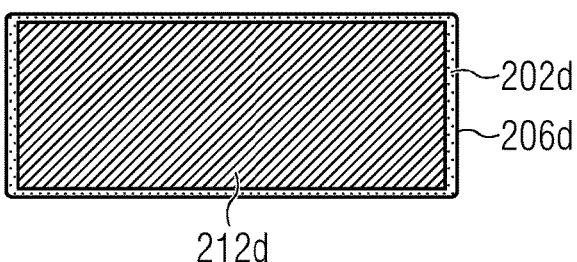

FIG. 7E
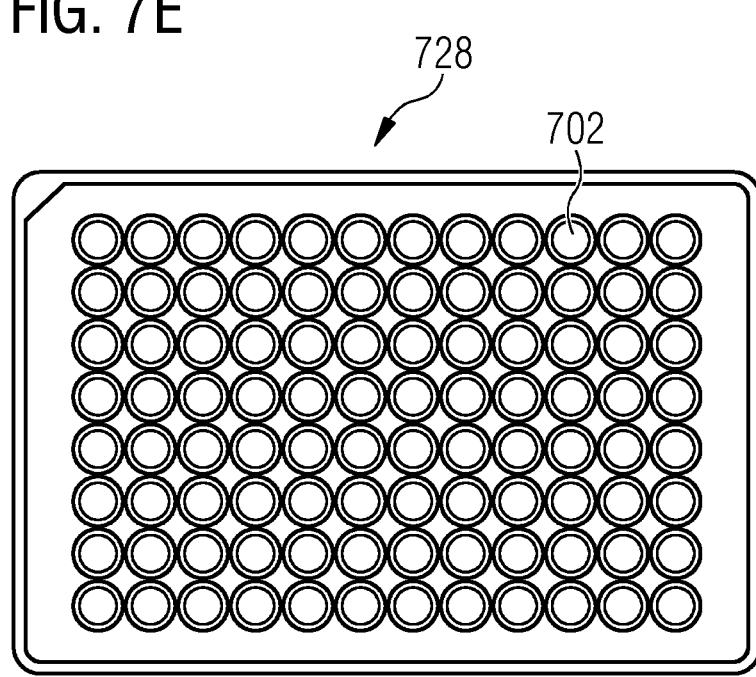
728
702
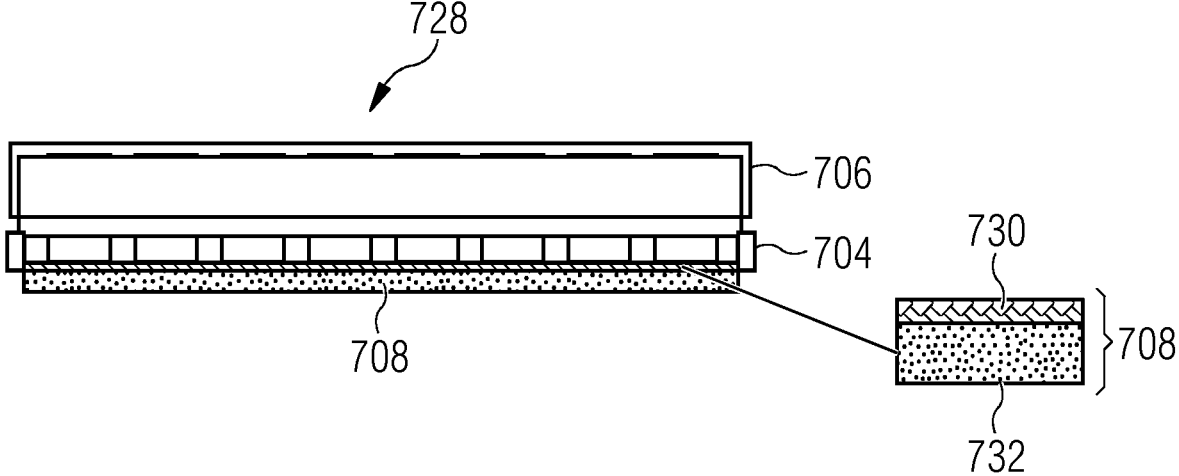
728
706
704
730
708
708
732

FIG. 8A
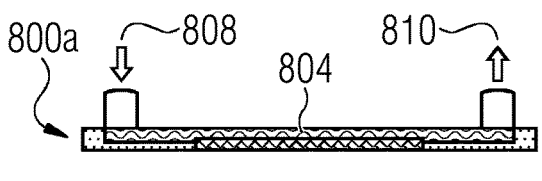
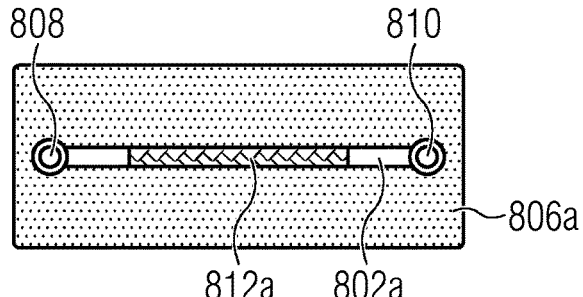
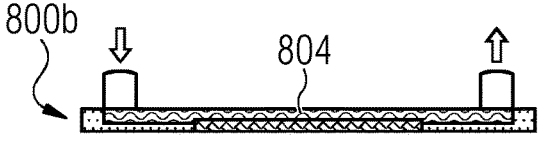
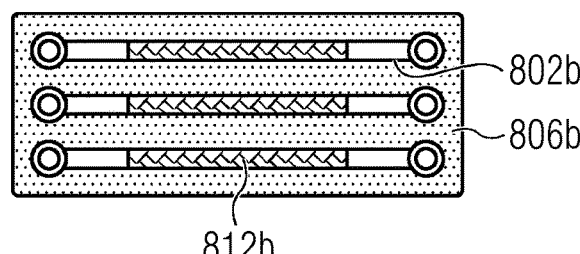
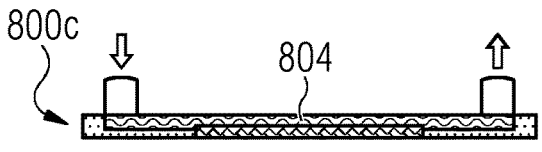
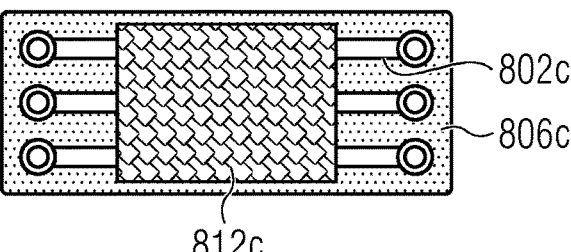
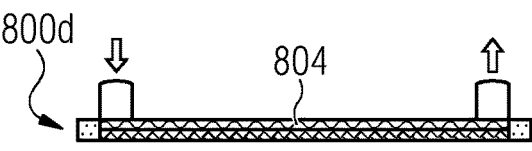
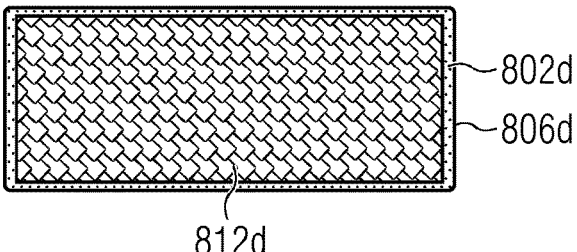

| Material B | Material A | Air | Blood | Water | Colon | 0.4% Agarose | 8% Poly-acrylamide | EtOH | Liver |
|---|---|---|---|---|---|---|---|---|---|
| | Refractive Index at 700nm | 1.0002 | 1.301 | 1.331 | 1.3257 | 1.3329 | 1.349 | 1.36 | 1.3624 |
| Air | 1.0002 | 0.0% | 23.1% | 24.9% | 24.6% | 25.0% | 25.9% | 26.2.5% | 26.6% |
| Blood | 1.301 | -30.1% | 0.0% | 2.3% | 1.9% | 2.4% | 3.6% | 4.3% | 4.2.5% |
| Water | 1.331 | -33.1% | -2.3% | 0.0% | -0.4% | 0.1% | 1.3% | 2.1% | 2.3% |
| Colon | 1.3257 | -32.2.5% | -1.9% | -0.4% | 0.0% | 0.2.5% | 1.7% | 2.2.5% | 2.7% |
| 0.4% Agarose | 1.3329 | -33.3% | -2.2.5% | -0.1% | -0.2.5% | 0.0% | 1.2% | 2.0% | 2.2% |
| 8% Polyacrylamide | 1.349 | -34.9% | -3.7% | -1.4% | -1.8% | -1.2% | 0.0% | 0.8% | 1.0% |
| EtOH | 1.36 | -36.0% | -4.2.5% | -2.2% | -2.6% | -2.0% | -0.8% | 0.0% | 0.2% |
| Liver | 1.3624 | -36.2% | -4.7% | -2.4% | -2.8% | -2.2% | -1.0% | -0.2% | 0.0% |
| PDMS,Polydi-methyl-siloxane | 1.426 | -42.6% | -9.6% | -7.1% | -7.6% | -7.0% | -5.7% | -4.9% | -4.7% |
| Fused Silica | 1.4584 | -45.8% | -12.1% | -9.6% | -10.0% | -9.4% | -8.1% | -7.2% | -7.0% |
| Glycerol | 1.4687 | -46.8% | -12.9% | -10.3% | -10.8% | -10.2% | -8.9% | -8.0% | -7.8% |
| Olive oil | 1.47 | -47.0% | -13.0% | -10.4% | -10.9% | -10.3% | -9.0% | -8.1% | -7.9% |
| Cellulose | 1.471 | -47.1% | -13.1% | -10.2.5% | -11.0% | -10.4% | -9.0% | -8.2% | -8.0% |
| PMMA | 1.4866 | -48.6% | -14.3% | -11.7% | -12.1% | -11.2.5% | -10.2% | -9.3% | -9.1% |
| EVASKY S87 | 1.494 | -49.4% | -14.8% | -12.2% | -12.7% | -12.1% | -10.7% | -9.9% | -9.7% |
| Optorez 1330 | 1.509 | -50.9% | -16.0% | -13.4% | -13.8% | -13.2% | -11.9% | -11.0% | -10.8% |
| Cargille BK matching liquid | 1.5125 | -51.2% | -16.3% | -13.6% | -14.1% | -13.2.5% | -12.1% | -11.2% | -11.0% |
| BK 7 Glass | 1.5168 | -51.6% | -16.6% | -14.0% | -14.4% | -13.8% | -12.4% | -11.2.5% | -11.3% |
| Polystyrene | 1.5829 | -58.3% | -21.7% | -18.9% | -19.4% | -18.8% | -17.3% | -16.4% | -16.2% |

FIG. 11-2

| PDMS, Polydimethylsiloxane | Fused Silica | Glycerol | Olive oil | Cellulose | PMMA, Polymethyl methacrylate | EVASKY S87 | Optorez 1330 | Cargille BK matching liquid | SCHOTT BK 7 Glass | Polystyrene |
|---|---|---|---|---|---|---|---|---|---|---|
| 1.426 | 1.4584 | 1.4687 | 1.47 | 1.471 | 1.4866 | 1.494 | 1.509 | 1.5125 | 1.5168 | 1.5829 |
| 29.9% | 31.4% | 31.9% | 32.0% | 32.0% | 32.7% | 33.1% | 33.7% | 33.9% | 34.1% | 36.8% |
| 8.8% | 10.8% | 11.4% | 11.2.5% | 11.6% | 12.2.5% | 12.9% | 13.8% | 14.0% | 14.2% | 17.8% |
| 6.7% | 8.7% | 9.4% | 9.2.5% | 9.2.5% | 10.2.5% | 10.9% | 11.8% | 12.0% | 12.2% | 15.9% |
| 7.0% | 9.1% | 9.7% | 9.8% | 9.9% | 10.8% | 11.3% | 12.1% | 12.4% | 12.6% | 16.2% |
| 6.2.5% | 8.6% | 9.2% | 9.3% | 9.4% | 10.3% | 10.8% | 11.7% | 11.9% | 12.1% | 15.8% |
| 5.4% | 7.2.5% | 8.2% | 8.2% | 8.3% | 9.3% | 9.7% | 10.6% | 10.8% | 11.1% | 14.8% |
| 4.6% | 6.7% | 7.4% | 7.2.5% | 7.2.5% | 8.2.5% | 9.0% | 9.9% | 10.1% | 10.3% | 14.1% |
| 4.2.5% | 6.6% | 7.2% | 7.3% | 7.4% | 8.4% | 8.8% | 9.7% | 9.9% | 10.2% | 13.9% |
| 0.0% | 2.2% | 2.9% | 3.0% | 3.1% | 4.1% | 4.6% | 5.2.5% | 5.7% | 6.0% | 9.9% |
| -2.3% | 0.0% | 0.7% | 0.8% | 0.9% | 1.9% | 2.4% | 3.4% | 3.6% | 3.9% | 7.9% |
| -3.0% | -0.7% | 0.0% | 0.1% | 0.2% | 1.2% | 1.7% | 2.7% | 2.9% | 3.2% | 7.2% |
| -3.1% | -0.8% | -0.1% | 0.0% | 0.1% | 1.1% | 1.6% | 2.6% | 2.8% | 3.1% | 7.1% |
| -3.2% | -0.9% | -0.2% | -0.1% | 0.0% | 1.0% | 1.2.5% | 2.2.5% | 2.7% | 3.0% | 7.1% |
| -4.2% | -1.9% | -1.2% | -1.1% | -1.1% | 0.0% | 0.2.5% | 1.2.5% | 1.7% | 2.0% | 6.1% |
| -4.8% | -2.4% | -1.7% | -1.6% | -1.6% | -0.2.5% | 0.0% | 1.0% | 1.2% | 1.2.5% | 5.6% |
| -5.8% | -3.2.5% | -2.7% | -2.7% | -2.6% | -1.2.5% | -1.0% | 0.0% | 0.2% | 0.2.5% | 4.7% |
| -6.1% | -3.7% | -3.0% | -2.9% | -2.8% | -1.7% | -1.2% | -0.2% | 0.0% | 0.3% | 4.4% |
| -6.4% | -4.0% | -3.3% | -3.2% | -3.1% | -2.0% | -1.2.5% | -0.2.5% | -0.3% | 0.0% | 4.2% |
| -11.0% | -8.2.5% | -7.8% | -7.7% | -7.6% | -6.2.5% | -6.0% | -4.9% | -4.7% | -4.4% | 0.0% |

FIG. 35
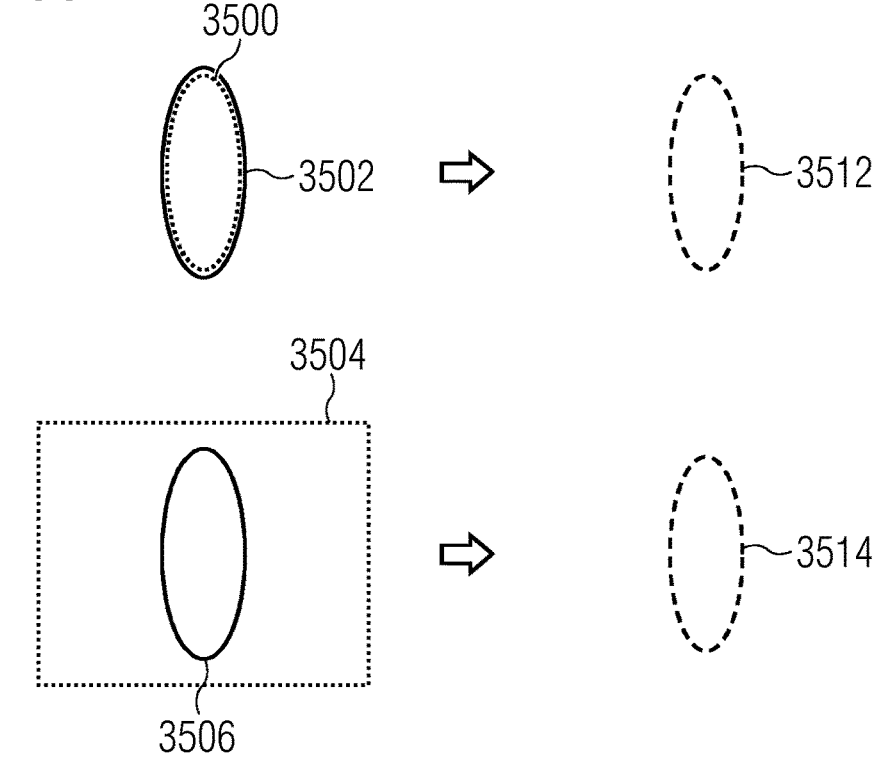
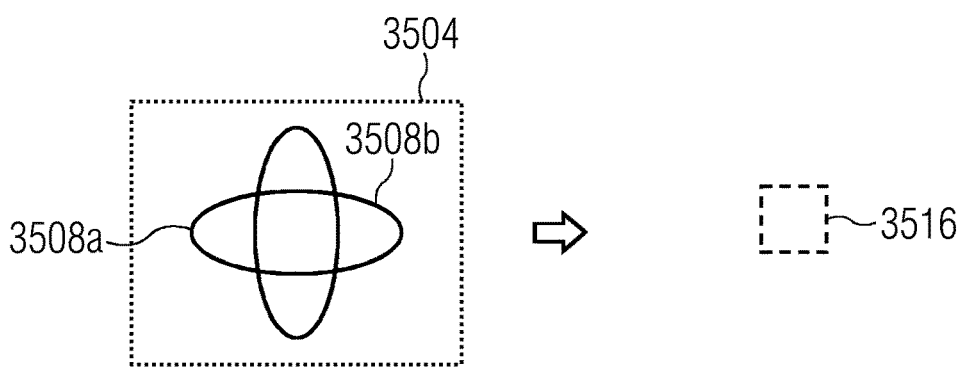
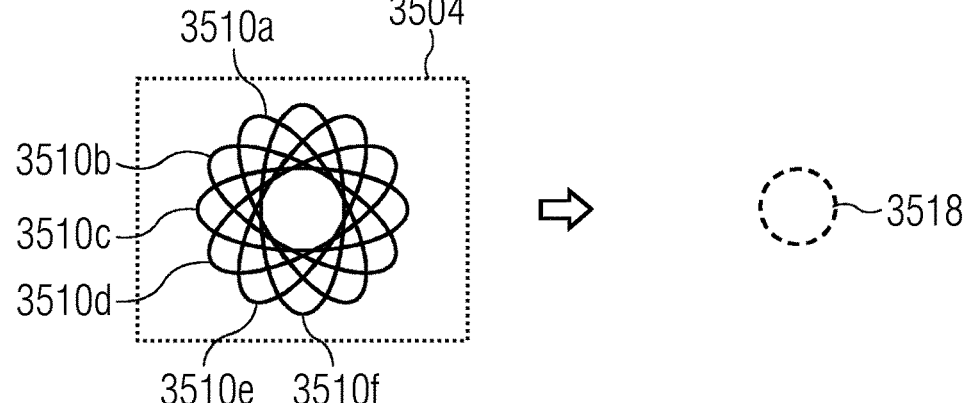

FIG. 37
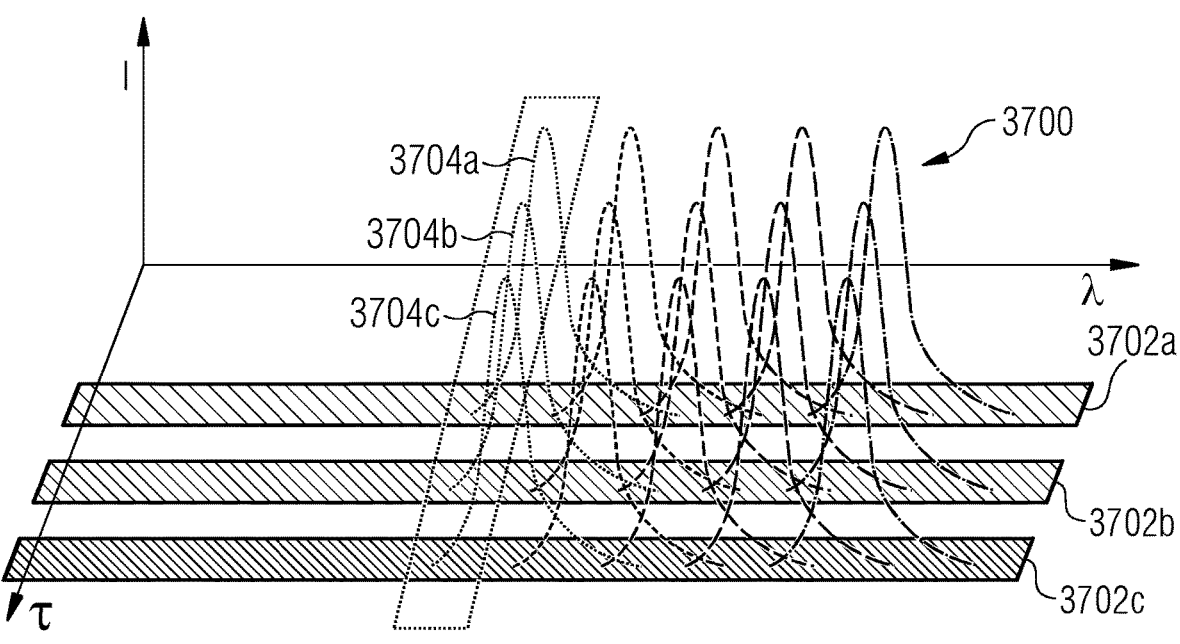
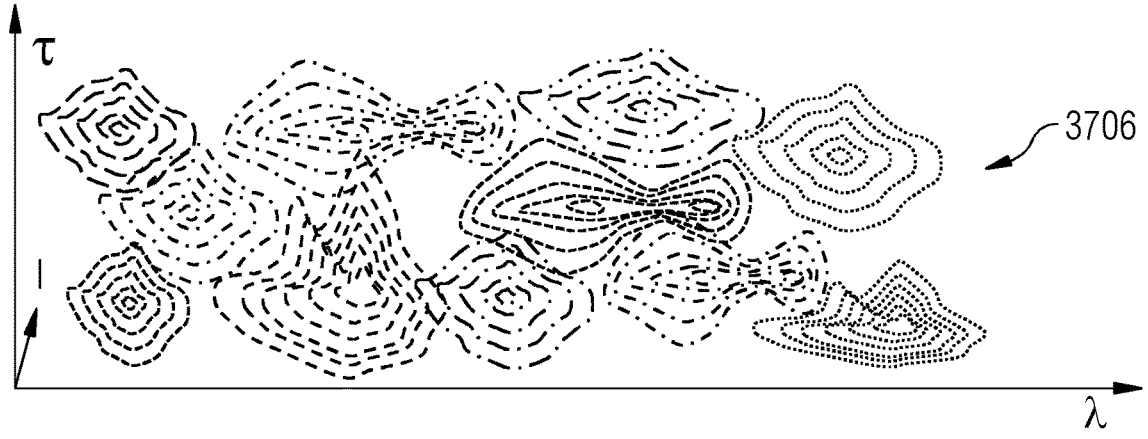
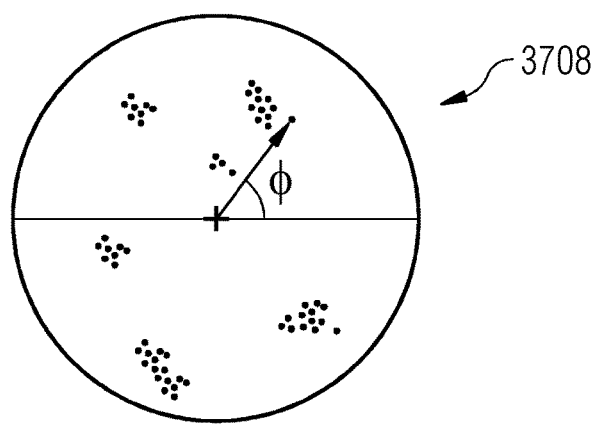

1

SAMPLE CARRIER AND METHOD FOR IMAGING A SAMPLE

CROSS REFERENCE TO RELATED APPLICATIONS

This application is a U.S. National Phase application under 35 U.S.C. § 371 of International Application No. PCT/EP2022/077378, filed on Sep. 30, 2022, and claims benefit to European Patent Application No. 21200992.2, filed on Oct. 5, 2021. The International Application was published in English on Apr. 13, 2023 as WO 2023/057348 A1 under PCT Article 21(2).

FIELD

The invention relates to a sample carrier for receiving a sample. The invention further relates to a method for imaging a sample with an imaging system.

BACKGROUND

The imaging of samples, for example biological samples, non-biological specimen or analytes, has important use cases in the life sciences, diagnostics, bioprocessing, and healthcare. In particular, the imaging of biological samples is a key tool for basic and translational research, and an important pillar of diagnostics and healthcare. Further, imaging is an important tool in the quality control and process development in the context of bioprocessing. For example, one important problem is the selection of clones that produce desired biologics, their culture, quality control and quality assurance. Likewise, there is a need for solutions that allow the three-dimensional imaging of fixed specimens such as tissue biopsies or tissue sections or living specimens, so called live imaging. Similarly, three-dimensional cell culture samples, for example spheroids, tumoroids, organoids, cardioids, and brain organoids, are of great interest in basic and translational research. They hold the promise of being of higher physiological relevance, i.e. findings obtained from them are expected to translate well to humans. This is especially true for patient-derived three-dimensional cell culture models. Three-dimensional cell cultures may be generated using scaffolds, which are typically hydrogels of synthetic or natural origin. Cells seeded in these scaffolds and cultivated with the right set of factors and conditions will develop structures that bear stunning resemblance of endogenous tissues.

In many of these applications it is desirable to find ways to image samples at high speeds, high throughput, high spatial resolution and with a high number of markers. Fluorescence microscopy is commonly used in such applications to label pre-determined structures which may also be named target molecules, molecular markers or analytes inside biological samples. Some molecular markers may also be referred to as biomarkers, when their presence or absence can be connected to a particular biological phenomenon such as for example the level of blood sugar and insulin.

Typical samples are derived from either field collection, a biopsy or a cell culture. The size of a typical sample may be in the range of a couple μm, for example a single cell, tens or hundreds of microns, for example a three-dimensional cell culture sample like a group of cells, a spheroid, an organoid or a tumoroid, or even in the range of several millimeters, for example large organoids, embryos, or tissue sections and organotypic slices.

For cultivation, sample preparation, and imaging the samples are typically maintained in dedicated labware, for example slides, dishes, microplates, and flasks. Especially for fluorescence microscopy with objectives that have a high numerical aperture it is required that the vessel containing sample has a substantially transparent window.

For this reason, there exist a large number of sample carriers, such as petri dishes, chamber slides, flow cells, microplates comprising one or more vessels for receiving samples, for example wells or fluidic channels, which have substantially transparent bottom that allows the imaging of samples inside the vessel from below. Through imaging from below—e.g. with an inverse microscopical setup—is generally desirable some geometries preclude the use of high numerical aperture objectives, when trying to image upright, i.e. from above, due to sterical problems as well as reflections, and the meniscus which typically forms at the upper surface of the liquid contained in a well due to surface tension, in particular depending on the format of the sample carrier.

Many sample carriers and flow cells are available in different formats that have a flat optical-grade bottom window. This bottom window is generally made of glass or of a material with a similar refractive index, for example polystyrene or cyclic olefin polymer or cyclic olefin copolymer. These plastics may be glued or heat-sealed to the bottom either as disparate windows covering each vessel individually or as a cohesive foil covering many vessel at the same time. Such sample carriers will also be referred to as imaging plates in the following.

Imaging systems or microscopes that are compatible with imaging plates are generally referred to as inverted as opposed to upright microscopes, meaning that their detection objective is imaging the sample from below. A variety of inverted imaging systems exist including widefield microscopes, spinning disk confocal microscopes, point-scanning confocal microscopes, and super resolution microscopes. In general, these microscopes are configured such that the object plane of the detection objective is parallel to a reference plane, which is parallel to the plane defined by the x- and y-axes of a relative movement between sample and objective, for example the flow direction in a flow cell or the sample carrier. This also means that these microscopes might create three-dimensional images of samples by a relative movement perpendicular to the reference plane. Usually, the reference plane is perpendicular to an optical axis of a microscope objective.

SUMMARY

In an embodiment, the present disclosure provides a sample carrier for receiving a sample. The sample carrier includes an optical medium in which the sample is received, the optical medium having a first refractive index. A window portion defining two parallel surfaces includes an optically transparent material having a second refractive index, and is arranged at a bottom side of the sample carrier. The first and second refractive indices do not deviate by more than 2.5%.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1B shows three schematic views of a petri-dish;

FIG. 1C is a top view of a microscope slide;

FIG. 1D shows three schematic views of a chamber slide;

FIG. 2A shows four flow cells each in a side view and a top view;

FIG. 5 is a schematic view of an imaging system as a comparative example;

FIG. 7E shows three schematic views of a sample carrier according to another embodiment;

FIG. 8A shows four sample carrier according to different embodiments each in a side view and a top view;

FIG. 11 is a table comparing refractive indices for different materials;

FIG. 14 shows a schematic view of an imaging system according to another embodiment;

FIG. 15 shows a schematic view of an imaging system according to another embodiment;

FIG. 25 shows a schematic view of an imaging system according to another embodiment;

FIG. 31 is a schematic view of a sample detection unit according to another embodiment;

FIG. 35 shows schematic views of different point spread functions;

FIG. 37 shows three diagrams illustrating how spectral information and fluorescence lifetime information can be used to discriminate fluorescent dyes.

DETAILED DESCRIPTION

Figure 1A:
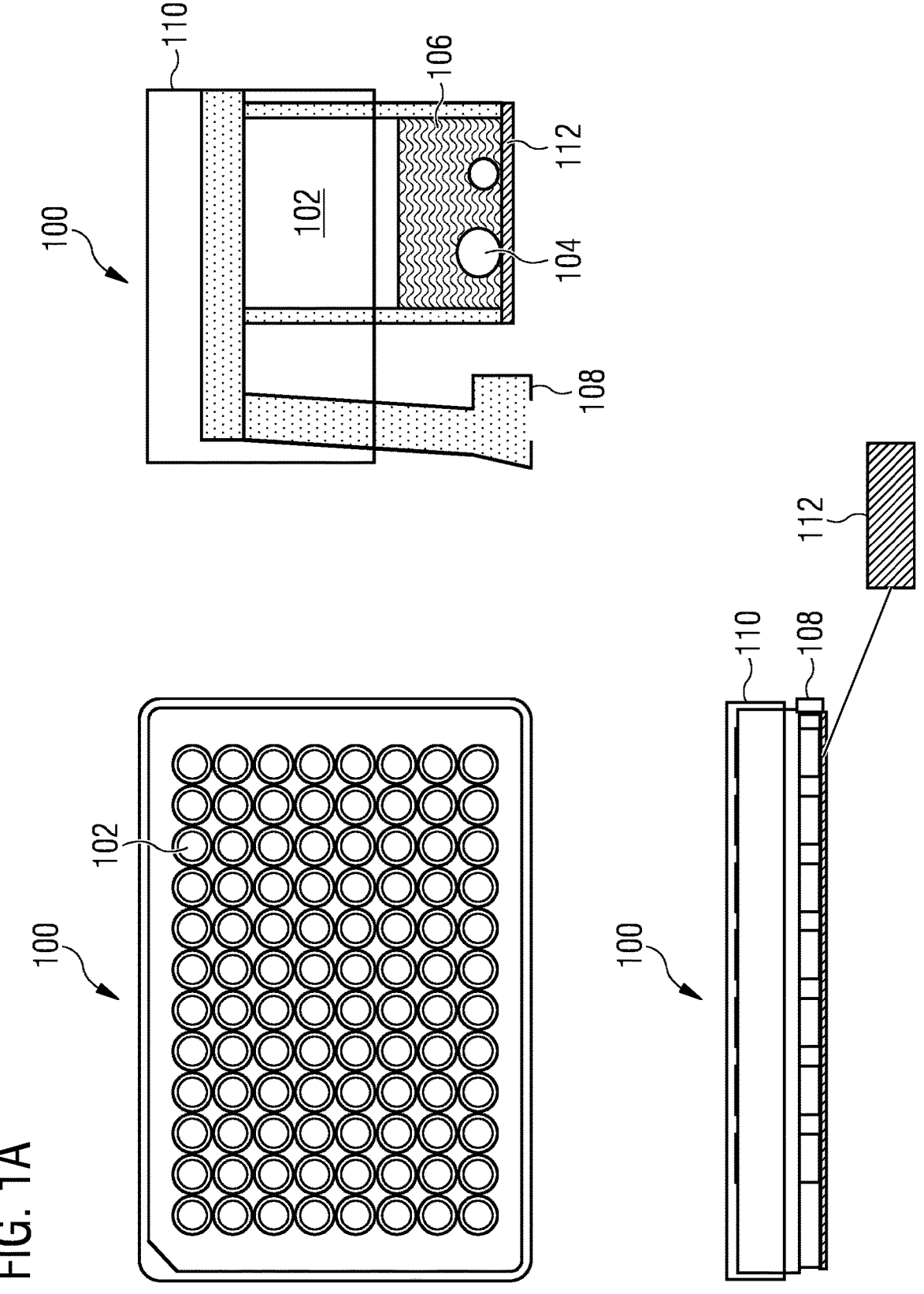
FIG. 1A shows three schematic views of a microplate.

Embodiments of the present invention can provide a sample carrier for receiving a sample, and a method for imaging the sample that allow imaging the sample at an oblique angle, and in particular embodiments, at an oblique angle relative to the reference plane, with a high spatial resolution.

In an embodiment, the proposed sample carrier for receiving a sample comprises an optical medium in which the sample is received, the optical medium having a first refractive index. The sample carrier further comprises a window portion defining two parallel surfaces that comprises an optically transparent material having a second refractive index, and that is arranged at a bottom side of the sample carrier. The first and second refractive indices do not deviate by more than 2.5%. In this document "optically transparent material" and "index-matched material" are used interchangeably.

An optical interface is formed where the optically transparent material of the window portion meets with the optical medium in which the sample is received. Such an optical interface typically results in imaging aberrations, in particular spherical aberrations. The negative effects of the optical interface are even stronger when the sample is imaged at an oblique angle, i.e. when the sample is imaged with a detection objective having an optical axis that encloses an angle with the normal of the two parallel surfaces of the window portion (or with the normal of the reference plane) that is substantially different from 0°. Typically, this tilt of the optical axis of the detection objective might lead to an essential degradation of the image, i.e. loss of intensity, coma, spherical aberration and chromatic aberrations.

However, the afore-mentioned negative effects of the optical interface are mainly caused by a difference in refractive indices between the two media forming the optical interface. In an embodiment of the present invention, since the refractive indices of the window portion and the optical medium do not deviate by more than 2.5%, the negative effects of the optical interface are greatly reduced with the proposed sample carrier. Thereby, the sample may be observed with an inverted microscope, i.e. a setup where the detection objective is placed below the sample carrier or flow cell, and the sample is being imaged from below. In a particular embodiment, the proposed sample carrier or flow cell allows the sample to be imaged at an oblique angle. Even though it might be preferred to observe or to image the sample with an inverted microscope type, i.e. with a detection objective being placed below the sample, alternatively or additionally it is possible to observe the sample from above—with an upright microscope type—or from a side or from any other direction in space. In such a case, the window portion of the sample carrier with the optically transparent material is accordingly arranged on top of the sample carrier or at a side of the sample carrier or at any other direction in space of the sample carrier.

In a preferred embodiment, the optical medium, the window portion, and/or any material being arranged adjacent to or in contact to the window portion are selected such that the dispersion of these items are similar or (almost) identical to each other as well.

The optical medium may be any optically transparent medium configured to receive the sample. In a particular embodiment, the optical medium is an embedding medium configured to embed the sample, or a flow medium configured for use in a flow cell.

Unless denoted otherwise, refractive index in the sense of this document refers to the refractive index at a given wavelength or in a wavelength range. In particular, it refers to the refractive index in the VIS range, and may refer as well to UV-VIS-IR range. As far as refractive index values are provided in this document, refer to the refractive index of a material at 700 nm unless denoted otherwise.

In a preferred embodiment, the sample carrier comprises at least one of a microplate, a carrier body, a lid, a sample carrier, a petri dish, a chamber slide, and a flow cell. These are well known geometries for the use in microscopy and many existing microscopes are therefore configured to receive these. The sample carrier may therefore be used with a wide range of existing microscope systems.

In another preferred embodiment, the parallel surfaces are plan parallel surfaces. Flat surfaces in general generate less aberrations than curved surfaces. By using plan parallel surfaces for the window portion, aberrations might be further reduced.

In another preferred embodiment, the optically transparent material is one of the following polymers or their derivatives: BIO-133, FEP, PEG-DA, PTFE, collagen, Matrigel™, agarose, alginate, cellulose, or polyacrylamide. The second refractive index has a value between 1.2977 and 1.3643. In this embodiment, the refractive index of the optically transparent material is within 2.5% of the refractive index of water, i.e. 1.331, being the optical medium for receiving the sample. Thus, water may be used as the optical medium for receiving the sample. Water is biocompatible and the primary solvent used for buffers, media, additives, and hydrogels, which are used in life science and diagnostic cell culture and imaging applications. Furthermore, the optical medium for receiving the sample could be cell culture medium, hydrogel, collagen, Matrigel™, agarose, alginate, cellulose, PEG-DA or polyacrylamide. In other words, the material of the optical medium for receiving the sample could be a similar or the same material as the optically transparent material. For this reason, there are numerous objectives which are corrected for water and optimized to work with samples in aqueous environments such as cell suspensions or scaffold-based three-dimensional cell culture samples, for examples hydrogel embedded spheroids, tumoroids or organoids. Alternatively, a solution or a hydrogel with a substantially similar refractive index may also be used as the optical medium, for example 0.4% agarose having a refractive index of 1.3329 or 8% Polyacrylamide having a refractive index of 1.349. Thus, the sample carrier according to this embodiment may be used in a wide variety of applications.

In another preferred embodiment, the optically transparent material is one of the following polymers or their derivatives: PMMA, EVASKY S87 or Optorez 1330. The second refractive index has a value between 1.47 and 1.49. In this embodiment, the refractive index of the optically transparent material is within 2.5% of the refractive index of the optical medium for receiving the sample which could be HISTO-1™ (Visikol), HISTO-2™ (Visikol), FocusClear™, polyethylene glycol, sucrose, an aromatic amide, or a solution or a hydrogel with substantially similar refractive index. These optical media are suitable for imaging of samples that have been cleared with aqueous-based tissue clearing or hydrogel embedding tissue clearing methods and could be imaged with a microscope objective which is corrected for glycerol.

In another preferred embodiment, the optically transparent material is one of the following polymers or their derivatives: pSX-DPM, pMA-DPM, a polycarbonate, a polyphosphonate, or a polyester. The second refractive index has a value between 1.55 and 1.56. In this embodiment, the refractive index of the optically transparent material is within 2.5% of the refractive index of the optical medium for receiving the sample which could be dibenzyl ether, diphenyl ether, or a solvent or a solution with substantially similar refractive index. These optical media are suitable for imaging of samples that have been cleared with organic-solvent based clearing methods including but not limited to three-dimensional ISCO, uDISCO, PEGAOS, vDISCO and other methods related to the Spalteholz technique and could be imaged with a microscope objective which is corrected for oil.

In another preferred embodiment, either fluorinated ethylene propylene (FEP) with a refractive index of 1.344 at a wavelength of light being 542 nm or Polyethylene glycol diacrylate (PEG-DA) is used as the index-matched material, since FEP and PEG-DA combine good optical and good mechanical properties. PEG-DA with a molecular weight of 6000 Da can be used to form hydrogels with about 5 to 30% concentration that display refractive indices ranging from about 1.34 to about 1.36 (c.f. Torres-Mapa et al. Sensors 2019, 19, 4333; doi:10.3390/s19194333).

In a particularly preferred embodiment of the present invention fluorinated ethylene propylene (FEP) with a refractive index of 1.344 at 542 nm is used as the index-matched material for the manufacturing of transparent windows.

Embodiments of the present invention also relate to an imaging system for imaging a sample. The imaging system comprises a sample carrier of the type described above, a sample carrier receiving portion configured to receive the sample carrier, and an optical detection system. The optical detection system comprises at least one objective arranged below the sample carrier receiving portion and being configured to receive detection light emitted by the sample. The optical axis of the at least one objective and the parallel surfaces of the window portion enclose an oblique angle when the sample carrier is received in the sample carrier receiving portion. Even though it might be preferred to arrange the objective below the sample carrier, alternatively or additionally it is possible to arrange the objective above or at a side or at any other direction in space relative to the sample carrier.

The imaging system has the same advantages as the sample carrier described above. In particular, the arrangement of the at least one objective below the sample carrier allows the objective to be positioned close to the sample itself. This, in turn, allows the use of an objective with a high numerical aperture—e.g. 0.8 or higher—as the at least one objective, which is required to achieve a high spatial resolution. The optical axis of the at least one objective is tilted with respect to the normal of the parallel surfaces of the window portion or with respect to the reference plane. Thus, the object plane of the at least one objective is non-parallel to the parallel surfaces or to the reference plane. By moving the sample in a plane parallel to the window portion, the sample is optically sectioned. It is therefore possible to acquire a series of images, each image corresponding to a different plane within the sample. This series, or stack, of images may then be combined into a single three-dimensional image of the sample.

A compact light sheet fluorescence microscope has been disclosed DE 10 2019 214 929 A1, which illuminates the sample at angle substantially different from 0° to a reference plane. However, the setup is not compatible with imaging sample from below through the bottom of an "imaging plate".

The aforementioned restrictions are the reason why the bulk of light sheet microscopy today is either performed by bringing in the illumination and detection optic into a sample chamber from the top, and at least partially immersing the front lenses of the detection optic. In this case, the sterical requirements necessitate the use of large petri dishes and preclude the use of small vessels, for examples the well of a 96-well microplate, since the illumination and detection optic would not fit into these wells. Alternatively, microscope systems are used, which are similar to the original SPIM design as disclosed in WO 2004/053558 A1. In this case, the samples are typically mounted and then brought into the sample chamber from the top to hang in front of the front lens. This may be brought about by using agarose gel rods that are pushed out a few millimeters from a glass capillary or by mounting samples in hydrogels inside fluorinated ethylene propylene (FEP) tubes as disclosed in Kaufmann et al. 2012 Development 139 (17): 3242-7.

The inverted microscope setup allows the use of detection objectives having a high numerical aperture. A high numerical aperture is necessary in order to achieve a high spatial resolution. Further, inverted microscopes allow the use of sample carrier geometries that would not be accessible to an upright microscope, for example due limited free working distance.

By tilting the optical axis of the detection objective relative to the normal of a reference plane defined by the imaging plate, the object plane of the detection objective is no longer parallel to the reference plane. Thus, by moving the sample in a direction parallel to the reference plane, it becomes possible to acquire a series of images of the sample, each image corresponding to a different plane within the sample. This series of images is also called a stack or z-stack or image stack and can form the basis for a volumetric, i.e. three-dimensional, image of the sample. It is further possible to image samples that are moving through a flow cell. Thereby, a large number of samples can be imaged in quick successes resulting in a high throughput.

The optical detection system may comprise at least one of the following a CMOS camera, a CCD/EM-CCD camera, a spectral camera, a hyperspectral camera, a FDFLIM camera or another time-sensitive Detector, a light-field camera, and a (multi) point-/line-scanning unit for confocal imaging.

In a preferred embodiment, the angle enclosed by the optical axis of the at least one objective and the parallel surfaces of the window portion when the sample carrier is received in the sample carrier receiving portion is between 10° and 80°, in particular 45°. Within this range, the object plane of the at least one objective is tilted such that the sample moving past the window portion (e.g. in a flow cell as the sample carrier or by a relative movement of the sample carrier in a direction parallel to the parallel surfaces of the window portion) can be optically sectioned without significant overlap of the planes of the image stack. This results in an easier generation of the volumetric image based on the image stack as well as an overall higher image quality. Further within this range, a larger diameter of a flow cell can be covered by the object plane of the detection objective such that also bigger samples in the range of 5 μm to 100 μm, 100 μm to 250 μm, 250 μm to 500 μm, or 500 μm to 2500 μm can be imaged using detection objectives with numerical apertures in the range of 0.4 to 1.0. Alternatively, or in addition, multiple flow cells like for example in a stacked and/or parallel arrangement may be imaged using such an arrangement, wherein each flow cell may have a diameter in the range of 10 μm to 500 μm.

In another preferred embodiment, the imaging system comprises a second objective arranged below the sample carrier receiving portion and configured to receive detection light emitted by the sample. The optical axis of the second objective and the parallel surfaces of the window portion or the reference plane enclose an oblique angle when the sample carrier is received in the sample carrier receiving portion. The second objective can be used to capture an image complementary to an image captured by the first objective. The complementary image may be used to image a different perspective, to enhance the image captured by the first objective or to create a composite image of the sample. Thereby, the versatility of the imaging system is increased.

In another preferred embodiment, the optical axis of the first objective and the optical axis of the second objective intersect each other, preferably in the object plane of the first and/or second objective. Alternatively, the first objective and the second objective are arranged relative to each other such that a field of view of the first objective and a field of view of the second objective intersect each other. The spatial resolution of an objective is described by its point spread function which describes how the objective images a point object. For a typical objective this point spread function is an ellipsoid that is elongated along the optical axis of the objective, i.e. the z-axis. This means that the z- or axial-resolution is lower than the x-y or lateral resolution. In this embodiment, the point spread functions of the first and second objectives overlap and can therefore be combined into a single effective point spread function by means of registration, deconvolution and fusion of the individual images. The effective point spread function then comprises the intersection of the two individual point spread functions.

In the case of two objectives, the effective point spread function is approximately cube-shaped. The edge length of this cube is approximately equal to the lateral resolution of the two objectives. Using even more objectives, for example six objectives, will result in an effective point spread function that approximates a sphere. Having a spherical effective point spread function corresponds to an isometric resolution, i.e. a comparable spatial resolution in all directions that is approximately equal to the lateral resolution of a single objective. Thereby, in this embodiment significant improvement in resolution can be achieved by acquiring multiple "equivalent views" from a sample from different angles. In the sense of this document "equivalent views" are views that are recorded with substantially the same acquisition parameters like for example excitation wavelength, excitation power, detection channel, gain or exposure, but from different angles or perspectives, e.g. with two or more objectives.

In another alternative embodiment, the first objective and the second objective are adapted to generate different views of the sample. In particular, the first objective and the second objective are arranged such that their object planes are not parallel. In this embodiment it is possible to generate different views of the sample at the same time. In particular if the sample is moved past the window portion, the sample may not be in the object plane of both objects at the same time, or one view of the sample may be preferable over the other, since it shows a feature of the sample that is of particular interest. Thereby, allowing to select the image with the highest image quality and/or image content.

In another preferred embodiment, at least one of an illumination characteristic and a detection characteristic are different for the first objective and for the second objective, in particular for generating images from different dyes in the sample with the first and the second objective. In other words, the two objectives might be set up for different imaging modalities. Different imaging modalities may be used to image different features of the sample, for example image different fluorochromes located in the sample. Thus, in this embodiment it is possible the generate multiple images of the sample showing different features of the sample at essentially the same time. In this way the number of dyes and/or analytes that can be readout can be increased.

In another preferred embodiment, the optical axis of the first objective encloses an angle with the optical axis of the second objective within a range of 50° to 90°. In this embodiment, the optical axes of the first and the second objective are nearly perpendicular. Thereby, one objective may be used to illuminate the object plane of the other objective, for example according to a widefield, darkfield or a lightsheet configuration. Further, the arrangement allows the sample to imaged such that features of the sample hidden in the image captured by the first objective are visible in the image captured by the second objective and vice versa. Thus, within this range the second objective complements the first objective best.

In another preferred embodiment, the imaging system comprises an illumination unit configured to create illumination light and to direct the illumination light through the at least one objective onto the sample. The illumination light may be excitation light for exciting fluorophores located in the sample in order to image features deep within the sample and/or to achieve ultra-high resolution images. The illumination unit may comprise at least one of the following light sources: a continuous wavelength laser, a pulsed laser, a white light laser, a solid state laser, and an LED illumination. The illumination unit may further be configured for multiphoton excitation.

In another preferred embodiment, the illumination unit is configured to form a light sheet by directing the illumination through the at least one objective onto the sample. At least one suitable optical component, such as a cylindrical lens, might be used to accomplish a light distribution which approximates the illumination of a single plane in the sample, i.e. a light sheet illumination. The light sheet is used to illuminate a thin stripe of the sample. Thereby optical sectioning of the sample is achieved, in particular if there is a relative movement between the sample and the illumination light distribution and several images of the sample are acquired during the sample movement. In particular (inverted) selective plane of illumination microscopy, SCAPE/OPM, or related setups may be used. Several beam profiles including but not limited to Gaussian, sinc2, Bessel beam as well as multi-beam configurations like for example lattice light sheet may be deployed to illuminate a thin stripe of the sample, which overlaps at least partially with the object plane of at least one objective.

In another preferred embodiment, the sample carrier comprises at least one flow cell, the at least one flow cell comprising the window portion. The imaging system comprises a fluid pump device, in particular a fluid pump device being operated according to the principle of pneumatics, configured to move the optical medium through the at least one flow cell, thereby moving samples received in the optical medium along a flow direction past the window portion. The flow direction might be essentially parallel to the parallel surfaces. The optical detection system is configured to sequentially image the samples being moved past the window portion, in particular by acquiring several images of the sample during the sample movement.

In this embodiment, the optical medium, also called flow medium, may be in a liquid or a gas phase. Both (micro) fluidic and pneumatic systems, or gravity flow-based systems, may be used to move the flow medium. The flow cell can be used to image a large number samples in quick succession. By moving the samples past the optical detection system, the samples are optically sectioned. It is therefore possible to sequentially generate three-dimensional images of the samples being moved past the window portion. Thereby, this embodiment allows to generate three-dimensional images having a high spatial resolution of a large number of samples in short time.

In another preferred embodiment, the sample carrier receiving portion is movable along at least one direction parallel to the parallel surfaces or relative to the at least one objective. In this embodiment, the movement of the sample that results in the sample being optically sectioned is accomplished by the movement of the sample carrier receiving portion. Thereby, an easy way of generating a three-dimensional image of the sample is provided. The sample carrier receiving portion may in particular be a microscope stage comprising one or more stepper motors, linear motors or Piezo drives. Further, the microscope stage may allow translation of sample carrier in x-, y- and z-direction as well tilting and rotating the sample, i.e. having up to 6 axes.

In another preferred embodiment, the at least one objective is an immersion objective, and the imaging system comprises an immersion medium that is arranged between a front lens of the at least one objective and the window portion of the sample carrier. The immersion medium has a third refractive index. Preferably, the first and third refractive indices and/or the second and third refractive indices do not deviate by more than 2.5%. In this embodiment, the space between the front lens of the at least one objective essentially has a uniform refraction index. Thus, the optical interfaces formed at the two parallel surfaces do not have a substantial effect on the imaging behavior of the imaging system. The negative effects usually associated with optical interfaces, i.e. aberrations and reflection, are therefore further reduced in this embodiment.

In a preferred embodiment, if the optical medium is water or has a refractive index that has substantially the same refractive index as water, water is also used as the immersion medium. In this preferred embodiment, the at least one objective is a water immersion objective. Such water immersion objectives are also available with motorized correction collars that allow for fine adjustments, and help to further minimize spherical aberrations, in particular.

If the optical medium is HISTO-1™ (Visikol), HISTO-2™ (Visikol), FocusClear™, polyethylene glycol, sucrose, an aromatic amide, or a solution or a hydrogel with substantially similar refractive index, silicon oil TSF4300 (Momentive Performance Materials) may be used as the immersion medium. In this preferred embodiment, the at least one objective is an oil immersion objective.

If the optical medium is a medium with a refractive index of approximately 1.55 to 1.56 like in the case of solvent-based clearing methods, which include but are not limited to e.g. Spalteholz (refractive index of 1,55; clearing agent: benzyl benzoate/methyl salicilate), BABB (refractive index of 1,55; clearing agent: benzyl alcohol/benzyl benzoate (BABB)), modified BABB (refractive index of 1,55; clearing agent: tert-butanol/BABB [1:2]), 3 DISCO (refractive index of 1,56; clearing agent: dichloromethane/dibenzyl ether), iDISCO (refractive index of 1,56; clearing agent: dichloromethane/dibenzyl ether) the same medium used for clearing may be used as an immersion medium. The compositions of solvent-based clearing media and refractive indices (RI) given in this paragraph were taken from: Richardson and Lichtman Cell. 2015 Jul. 16; 162 (2): 246-257. Microscope objectives which are specifically corrected for these media are available for at least some of the afore mentioned. Alternatively, microscope objectives specifically corrected for these media can be manufactured.

In another preferred embodiment, the optical detection system is a microscope, in particular a widefield microscope.

In another preferred embodiment, the imaging system is configured to perform at least one of widefield microscopy, widefield fluorescence microscopy, spinning disc microscopy, fluorescence lifetime microscopy, and light sheet microscopy. The imaging system may in particular be configured to perform fluorescence microscopy and acquire three-dimensional datasets through various means, for example by means of computation, like removing background information by applying a baseline estimation as described in WO 2019/185174 A1, or by deconvolution. Alternatively, or additionally, optical sectioning may be achieved by one of the following approaches: a structured illumination, aperture correlation, a physical pinhole or slit like in spinning disk confocal microscopy, point-scanning or line-scanning confocal microscopy, by using camera-read out schemes that emulate virtual pinholes or slits, rolling shutters, as well as through various implementations of light sheet fluorescence microscopy.

The imaging system may also comprise or might be adapted to at least one of the following components: a fluidics unit, a pre-scan and flow-control unit, a data analysis unit, a sorter unit for sorting samples, and a database, a software used for instrument control and data acquisition, and a personal computer.

The imaging system may further be configured to achieve optical sectioning by at least one of the following methods: aperture correlation, structured illumination, spinning disk, light sheet illumination, standing wave interference based optical sectioning, computational out-of-focus blur removal, deconvolution, and a virtual pinhole/virtual slit pinhole. The virtual pinhole/virtual slit pinhole may be achieved by a line-/or stripe-based detector readout, like for example by using a rolling shutter on a CMOS camera or using a slit-confocal and a line detector.

In another preferred embodiment, the optical detection system comprises a group of detectors configured to perform spectral imaging and/or spectral fluorescence lifetime imaging. For example, the optical detection system may comprise five detectors and an arrangement of dispersive optical elements. The dispersive optical elements are configured each to direct a certain spectral range, for example 350 to 450 nm, 450 to 500 nm, 500 to 550 nm, 550 to 650 nm, 650 to 850 nm, onto one of the five detectors. The detectors may be CMOS cameras, CCD-EMCCD cameras configured for intensity imaging, or a frequency domain fluorescence lifetime imaging camera. Such an optical detection system allows spectral imaging and/or spectral imaging combined with fluorescence lifetime imaging. Alternatively, or additionally, a detector configured for frequency domain fluorescence lifetime imaging may be provided.

Embodiments of the present invention further relate to a method for imaging a sample with an imaging system. The method comprises the following steps: providing a sample carrier having an optical medium for receiving the sample, the optical medium having a first refractive index, and a window portion defining two parallel surfaces, comprising an optically transparent material that has a second refractive index, and is arranged at a bottom side of the sample carrier, wherein the first and second refractive indices do not deviate by more than 2.5%. Arranging the sample in the sample carrier by immersing the sample in the optical medium. Positioning the sample carrier in a sample carrier receiving portion of the imaging device. Capturing at least on image of the sample with an optical detection system of the imaging device. The optical detection system comprises at least one objective arranged below the sample carrier and configured to receive detection light emitted by the sample. The optical axis of the at least one objective and the parallel surfaces of the window portion enclose an oblique angle.

The method has the same advantages as the sample carrier and the imaging system described above and can be supplemented using the features of the sample carrier and the imaging system.

FIGS. 1A to 1D show schematic views of different samples carriers 100, 114, 118, 124 for the microscopy of biological specimen as comparative examples.

FIG. 1A shows three schematic views of a microplate 100.

A first view shows the microplate 100 from the top. The microplate 100 comprises a plurality of sample containers, also called wells 102, for receiving a sample 104. The wells 102 may be filled with an optical medium, also called embedding medium 106, for example water, in which the samples 104 are immersed. A second view shows the microplate 100 from the side. The microplate 100 comprises a base 108 in which the wells 102 are formed and a cover 110 for covering the wells 102 from the top. As can be seen in the second view, a bottom portion of the base 108 is formed as an optically transparent window portion 112. The window portion 112 is made from a glass or a polymer with a refractive index close to that of glass. Material having a refractive index close to that of glass are denoted in this document by a diagonal hatching pattern. Polymers commonly used for imaging-grade microplates include polystyrene and cyclic olefin (co) polymer (COP/COC). A third view shows a single well 102 of the microplate 100 from the side. The well 102 is filled with the embedding medium 106. The embedding medium 106 is denoted in the FIGS. 1A to 1D by a wave pattern. The samples 104 arranged inside the well 102 can be observed with a microscope from below through the window portion 112. In the sense of this document "imaging-grade" refers to the thickness, refractive index, and Abbe number (dispersion behavior) of the transparent window of the microplate. In the sense of this document a microplate is referred to as an "imaging-grade" microplate, when the transparent window is made of glass, COP, COC or a material of substantially similar refractive index and Abbe number as well as of a thickness in the range of 170 μm. This means that an "imaging-grade" microplate or sample carrier can be used with objectives that have numerical apertures in the range of 0.8-1.4 and are corrected for use with a cover glass. Other microplates, which may have a transparent bottom that may be of the same material as the microplate body and display thicknesses in the range of 1 to several millimeters are not considered "imaging-grade" in the sense of this document.

FIG. 1B shows three schematic views of a petri-dish 114.

A first view shows the petri-dish 114 from the top. The petri-dish 114 has a glass bottom forming a window portion 116. The glass bottom allows the sample 104 or samples 104 arranged inside the petri-dish 114 to be observed with a microscope from below. A second view shows an oblique plan view of the petri-dish 114. As can be seen from the second view, the samples 104 are arranged atop the glass bottom. A third view shows the petri-dish 114 from the side. The petri-dish 114 is filled with the embedding medium 106.

FIG. 1C is a top view of a microscope slide 118.

The microscope slide 118 comprises a bottom portion 120 and cover glass 122 arranged atop the bottom portion. The sample 104 is arranged between the bottom portion 120 and the cover glass 122 and is observed through the cover glass 122. The embedding medium 106 may be also be arranged between the bottom portion 120 and the cover glass in order to embed the sample 104.

FIG. 1D shows three schematic views of a chamber slide 124.

A first view shows the chamber slide 124 from the side. The chamber slide 124 comprises 8 wells 126, for receiving the samples 104. The wells 126 may be filled with the embedding medium 106, in order to embed the samples 104. A part of a bottom portion 128 of the chamber slide 124 is formed as the transparent window portion 130. A second view shows the chamber slide 124 from the top. The wells 126 are arranged in 2 rows comprising 4 wells 126 each. A third view shows the chamber slide 124 from the bottom. As can be seen in the third view, the window portion 130 is a single element attached to the chamber slide 124 form below.

Figure 2B:
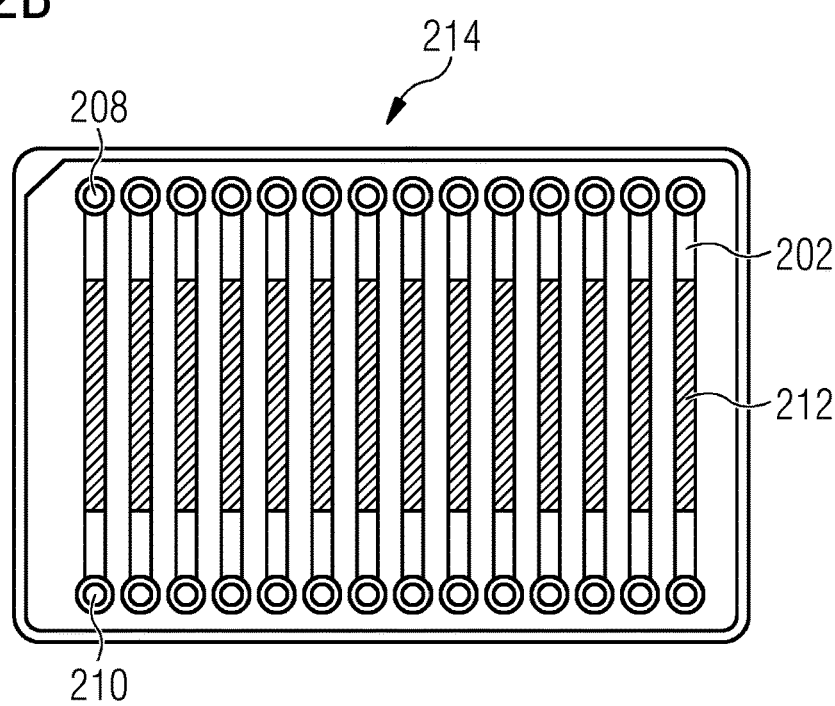
FIG. 2B is a top view of a flow cell.
Figure 2C:
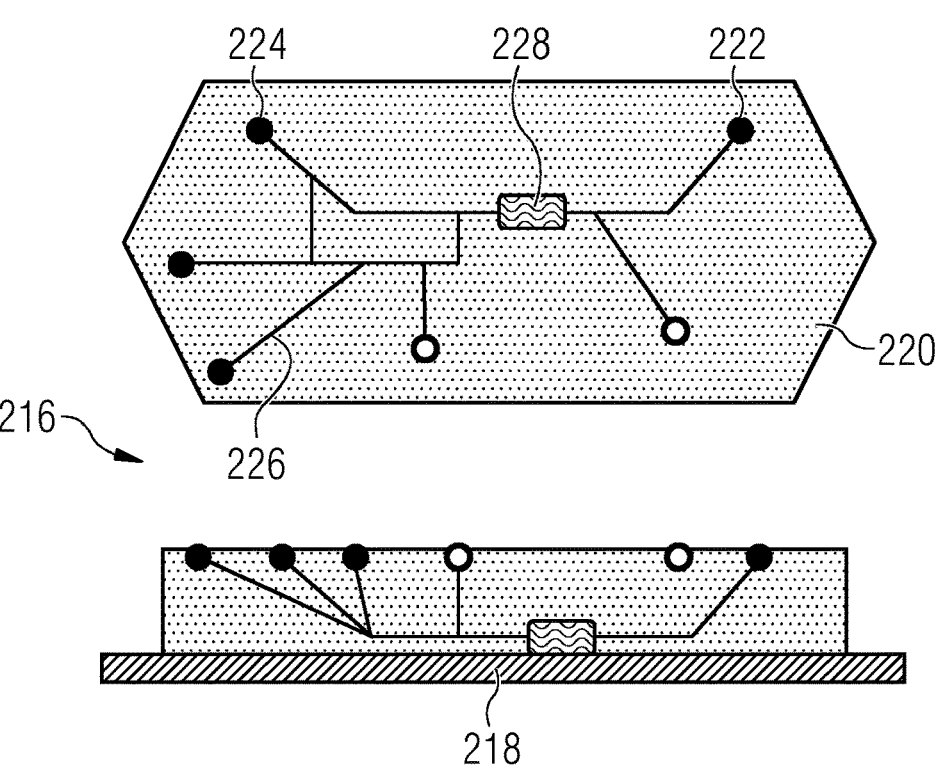
FIG. 2C is a schematic view of a microfluidic chip in a top view and a side view.

FIGS. 2A to 2C show schematic views of flow cells for the microscopy of biological specimens as comparative examples.

FIG. 2A shows four flow cells 200a, 200b, 200c, 200d each in a side view and a top view. The flow cells 200a, 200b, 200c, 200d comprise at least one fluidic channel 202a, 202b, 202c, 202d each of which is filled with a flow medium 204. The samples 104 are embedded in the flow medium 204 and can be moved through the fluidic channels 202a, 202b, 202c, 202d by means of (micro) fluidic and/or pneumatic systems. The fluidic channels 202a, 202b, 202c, 202d are embedded in a base portion 206a, 206b, 206c, 206d of the flow cell.

A first flow cell 200a comprises a single fluidic channel 202a having an inlet 208 and an outlet 210. The fluidic channel 202a comprises an optically transparent window portion 212a for observing the samples 104 moving through the fluidic channel 202a. A second flow cell 200b comprises 3 fluidic channels 202b each having an inlet 208 and an outlet 210. Each fluidic channel 200b comprises an optically transparent window portion 212b. A third flow cell 200c comprises 3 fluidic channels 202c each having an inlet 208 and an outlet 210. The three fluidic channels 202c comprises a single optically transparent window portion 212c that is shared by the three fluidic channels 202c, even though the three fluidic channels 202c are separately sealed. A fourth flow cell 200d comprises a single fluidic channel 202d having an inlet 208 and an outlet 210. The fluidic channel 202d comprises an optically transparent window portion 212d spanning almost the entire base portion 206d.

FIG. 2B is a top view of a flow cell 214. The flow cell 214 according to FIG. 2B is distinguished from the flow cells 200a, 200b, 200c, 200d according to FIG. 2A in being dimensioned to the normed specifications of a microplate. Since the flow cell 214 is formed according to standardized proportions, the flow cell 214 may be handled by standard lab automation solutions.

FIG. 2C is a schematic view of a microfluidic chip 216 in a top view and a side view.

As can be seen from the side view, the microfluidic chip 216 comprises a base portion 218 and a layer of a polymer 220, for example PDMS, arranged atop the base portion 218. An inlet 222, an outlet 224, an optically transparent window portion 226 and a microfluidic channels 228 are formed by the layer of polymer 220. The microfluidic chip 216 forms at least one flow cell.

Figure 3:
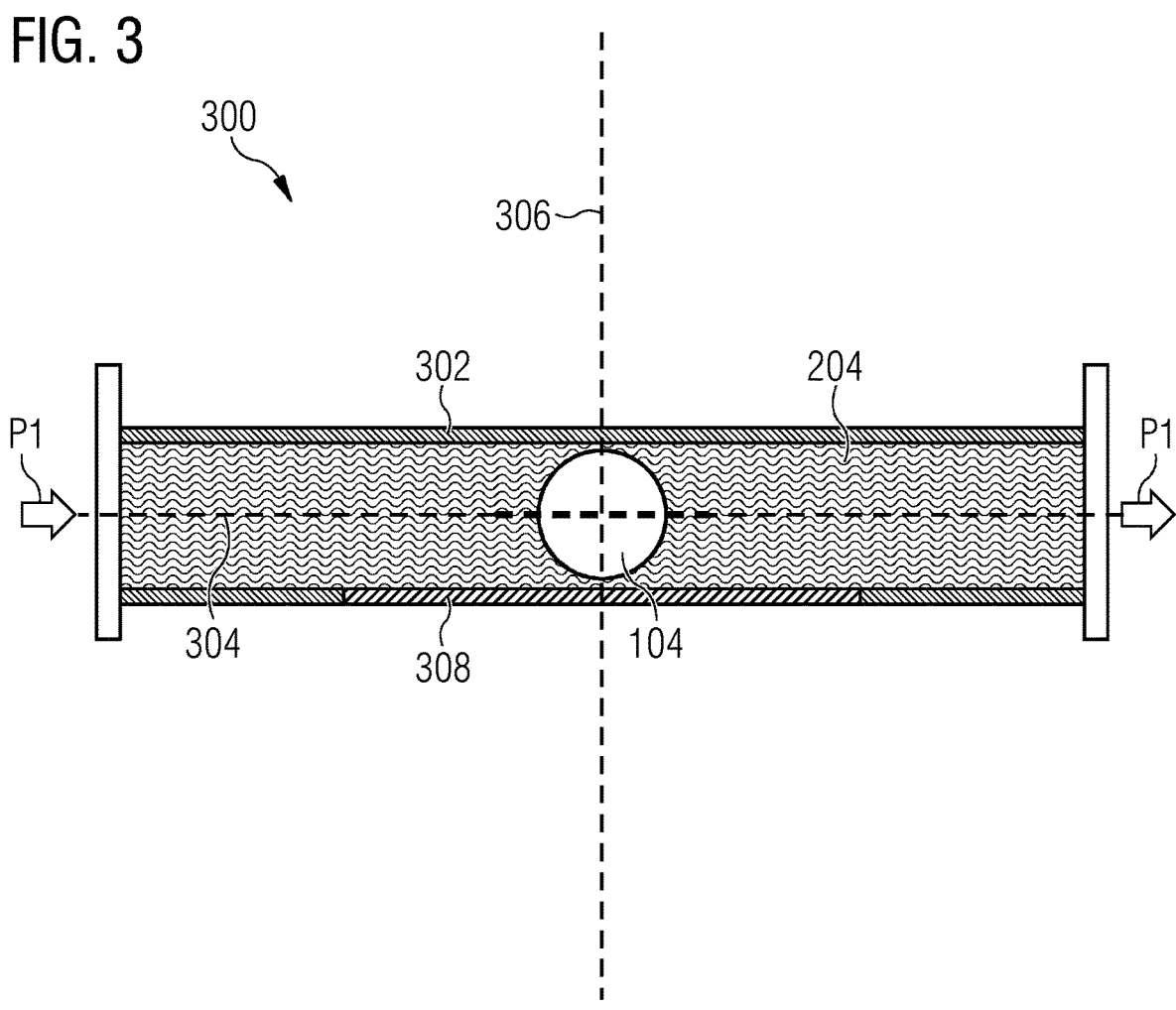
FIG. 3 is a schematic view of a central part of a fluidic channel of a flow cell according to a comparative example.

FIG. 3 is a schematic view of a central part of a fluidic channel 302 of a flow cell 300 as a comparative example. In FIG. 3 a flow direction of the flow medium 204 in which the sample 104 is embedded is denoted by a set of arrows P1. Further, a reference plane 304 which is parallel to the flow direction is denoted by a first dashed line, and the orthogonal 306 to the reference plane is denoted by a second dashed line. The reference plane 304 is perpendicular to the axis of gravity.

The fluidic channel 302 comprises an optically transparent window portion 308 made of glass or a material with substantially similar optical properties. In particular, the material of the window portion 308 has a refractive index in the range of glass, for example polystyrene or cyclic olefin copolymer. In the sense of this document the term glass refers to crown or borosilicate glasses like for example SCHOTT BK-7 as well as glasses that have substantially similar optical properties, unless denoted otherwise. Crown or borosilicate glasses are typically being used to manufacture coverslips and transparent windows for microscopic applications. In addition, the term glass in the sense of this document may refer to a sapphire.

The flow cell 300 in FIG. 3, but also the other flow cells mentioned in this document and in particular in the other Figures, showing flow cells, have a rectangular or square cross section. Alternatively, they could comprise a circular or elliptical cross section.

Figure 4:
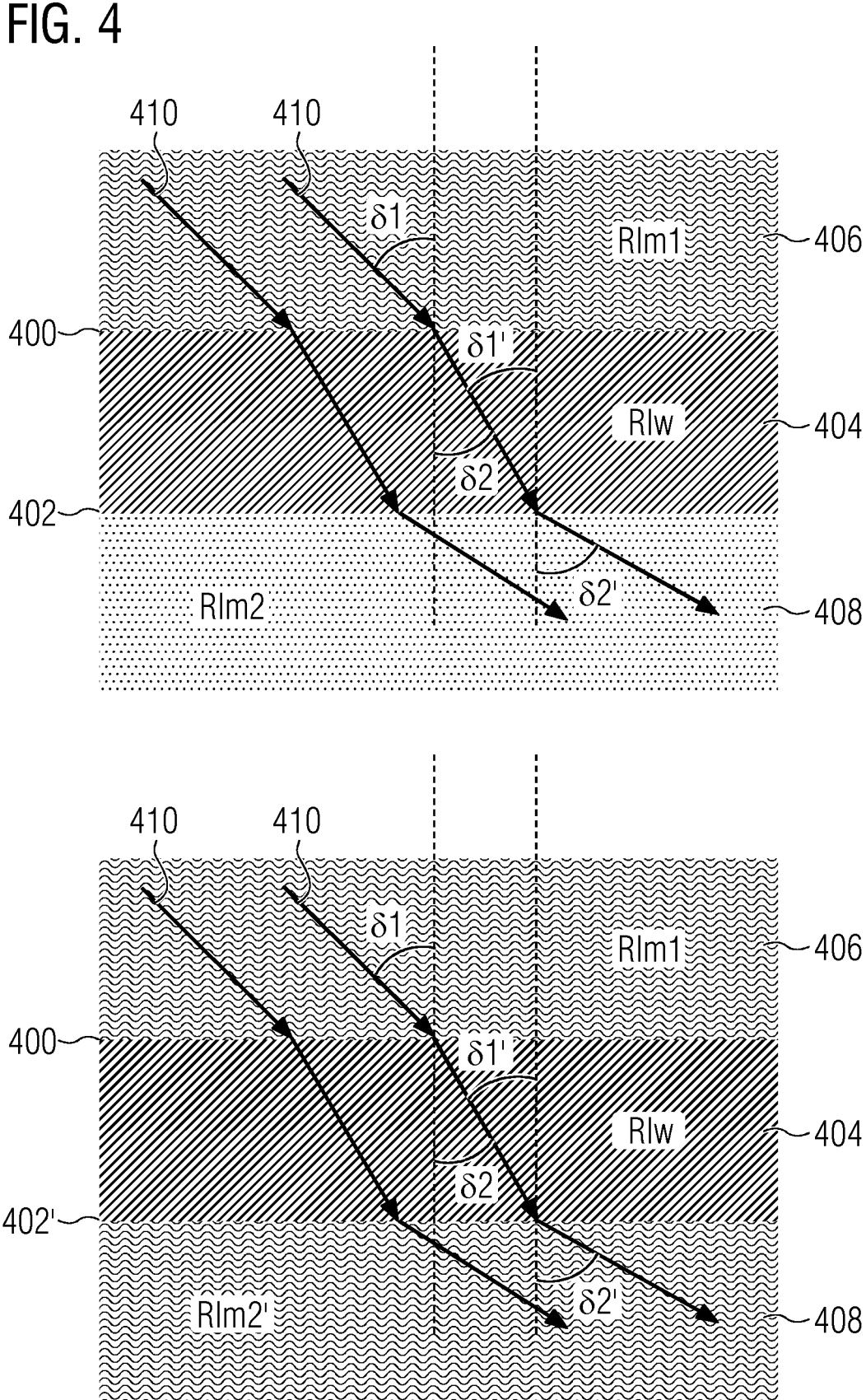
FIG. 4 shows two schematic views of two optical interfaces formed at the window portion of the sample carrier according to the FIGS. 1A to 3.

FIG. 4 shows two schematic views of two optical interfaces 400, 402 formed at a window portion of a sample carrier, in particular one of the sample carriers 100, 114, 118, 124, 200a, 200b, 200c, 200d according to the FIGS. 1A to 3, as a comparative example.

The optical interface is formed at the boundary where a window portion 404 touches a first optical medium 406, i.e. the embedding medium 106 or the flow medium 204, and a second optical medium 408 respectively. The first optical medium 406 has a first refractive index R1$m$1 and the optically transparent material of the window portion 404 has a second refractive index R1$w$. In a first schematic view at the top of FIG. 4 the second optical medium 408 is air having a refractive index R1$m$2 of about 1. In a second schematic view at the bottom of FIG. 4 the second optical medium 408 is the same medium as the first optical medium 406 or has a refractive R1$m$2' index close the first refractive R1$m$1.

Two parallel light rays 410 travel from the top through the first optical medium 406, the window portion 404, and the second optical medium 408 in that order. The light rays 410 are refracted at a first optical interface 400 formed at the boundary between the window portion 404 and the first optical medium 406. At the second optical interface 402 formed at the boundary between the window portion 404 and the second optical medium 408 the light rays are refracted again.

The two views of FIG. 4 illustrate two typical cases in microscopy. The first view illustrates the use of a liquid-filled sample carrier having a window portion 404 made of glass or an optical-grade plastic such as polystyrene, cyclic olefin polymer (COP) or cyclic olefin copolymer (COC), and a dry objective. The second view illustrates the use of the same liquid-filled sample carrier, and an immersion objective. In both cases there is a significant difference between the first and second refractive indices R1$m$1, R1$w$ and the first refractive index R1$m$1 and the refractive index R1$m$2, R1$m$2' of the second optical medium 408. These discontinuities of optical properties lead to significant refraction at the first and the second interfaces 400, 402 according to Snell's law of refraction.

Figure 5:
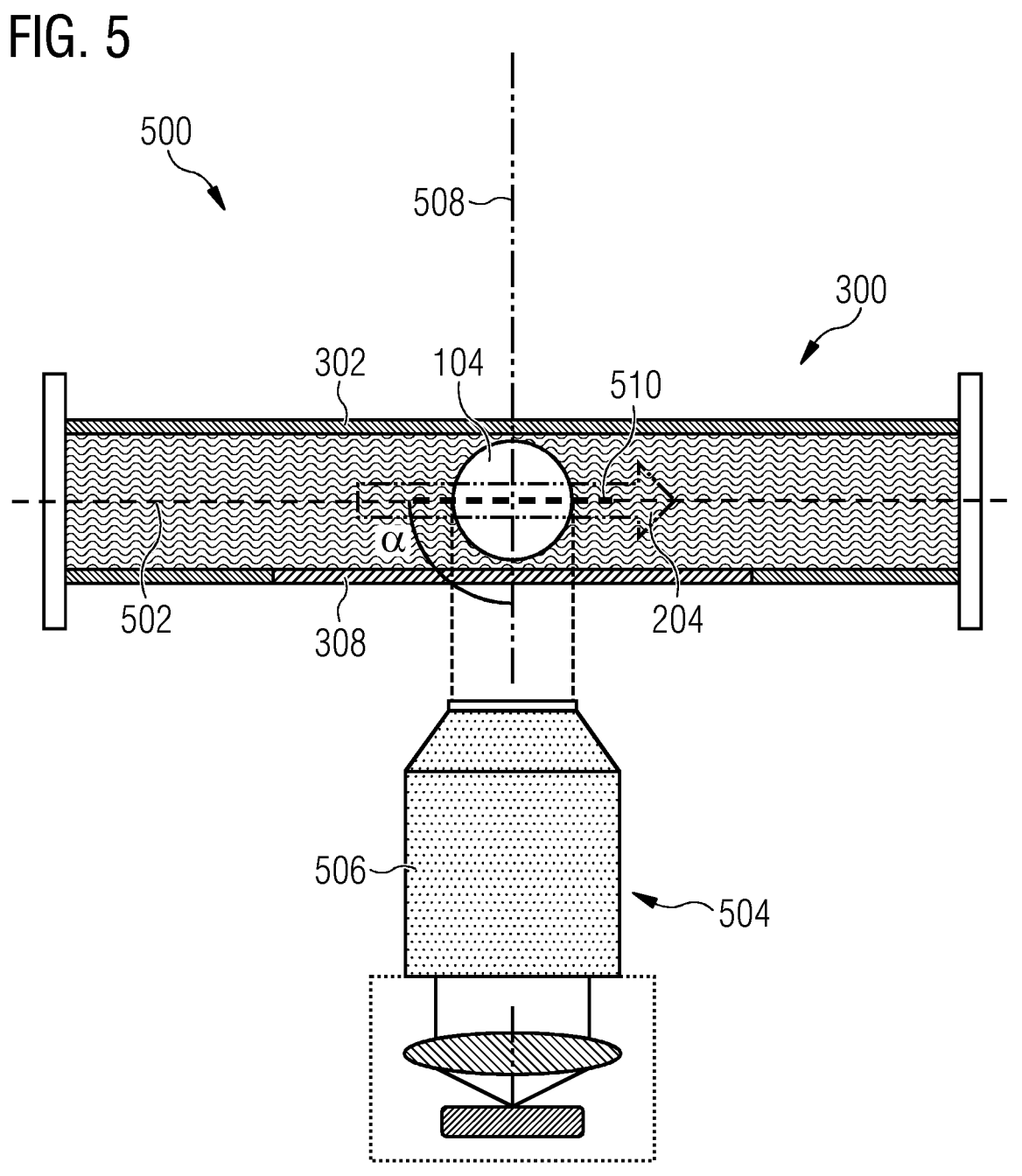

FIG. 5 is a schematic view of an imaging system 500 as a comparative example.

The imaging system 500 comprises the sample carrier 300 described above with reference to FIG. 3, having the optically transparent window portion 308 arranged at a bottom side of the sample carrier 300. The sample carrier 300 is exemplary formed as a flow cell filled with the flow medium 204. The flow direction of the flow medium 204 is from left to right in FIG. 5. Samples 104 embedded in the flow medium 204 are moving with the flow medium 204 along the flow direction. A reference plane 502 parallel to the flow direction is denoted by a dashed line.

The imaging system 500 further comprises an optical detection system 504 having an objective 506 directed at the window portion 308 of the sample carrier 300. The optical axis 508 of the objective 506 is perpendicular to the flow direction and to the reference plane 502. The object plane 510 of the objective 506 is parallel to the reference plane 502.

Microscope objectives are typically designed to work in either of the situations depicted in FIG. 4. Typical objectives are configured to image the sample 104 received in the sample carrier 300 through the window portion 308 such that the reference plane 502 is orthogonal to the optical axis 508 of the objective 506, as depicted in FIG. 5. As a result of this arrangement the object plane 510 is parallel to the reference plane 502, which means that z-stacks of the sample 104 can be recorded by bringing about a relative motion between the objective 506 and the sample 104 along the z-direction, i.e. the optical axis 508. However, for imaging the sample 104 while flowing through the flow cell 214 as well as for fast volumetric imaging it would be desirable to place the object plane 510 at an angle to the reference plane 502 unequal to 0°. In this case the sample 104 can easily be move through the object plane 510 by relative motion, either by moving the sample 104 or the imaging system 500. Moving the sample 104 is easily achieve using motorized stages, motorized positioning units or a flow cell 214.

There are two principle ways of tilting the object plane 510 of the objective 506. The first is implemented in SCAPE—as described in e.g. U.S. Pat. No. 8,619,237 B2—or OPM—as described in e.g. WO 2010/012980 A1—and relies on a detection objective whose optical axis is perpendicular to the reference plane 502, i.e. tilting the object plane 510 is achieved by positioning an illumination beam at a suitable position in the back focal plane of the objective 506. The second is based on tilting the optical axis 508 of the objective 506 such that the angle enclosed by the optical axis 508 and the reference plane 502 is unequal to 90°. The first strategy sacrifices resolution as only a fraction of the numerical aperture of the objective 506 can be used for detection. The second strategy is hampered by the refraction of light as shown in FIG. 4 and the fact that image quality degrades very essentially due to spherical aberrations and coma, when deviating from the situation illustrated in FIG. 5.

Figure 6:
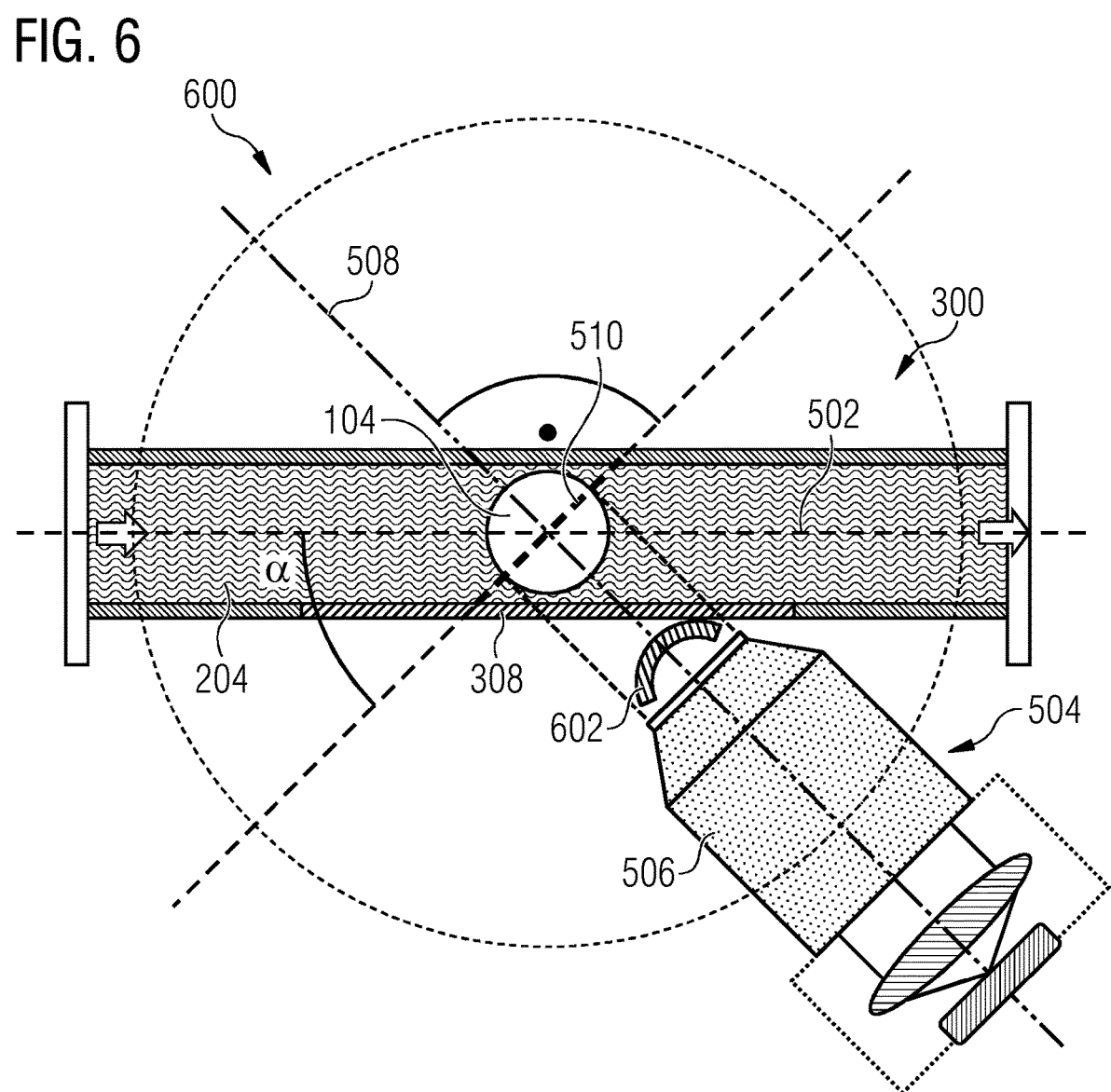
FIG. 6 is a schematic view of an imaging system as another comparative example.

FIG. 6 is a schematic view of an imaging system 600 as another comparative example. The imaging system 600 according to FIG. 6 is distinguished form the imaging system 500 according to FIG. 5 in that the optical axis 508 of the objective 506 and the reference plane 502 enclose an angle of 45°.

In order to correct the aberrations due to the tilted optical axis 508 relative to the reference plane 502, the objective 506 comprises a separate free-form optical element 602, disclosed for example in WO 2019/063539 A1. It is also very important to keep the window portion 308 substantially parallel to the reference plane 502, a process referred to as leveling. This has two implications. Firstly, a free-form optical element 602 has to be designed and manufactured. The manufacturing process is time-, labor- and cost-intensive. Secondly, the sample carrier 300 has to be precisely leveled either manually, which is a tedious task, or automatically, which requires dedicated functionalities in the imaging system 600, and thus raises the overall cost of the imaging system 600. Further, the leveling process requires time and may have to be repeated during an experiment, which reduces the throughput of the imaging system 600.

In the following, embodiments will be described which do not have the disadvantages of the comparative examples described with reference to FIGS. 1A to 6.

Figure 7A:
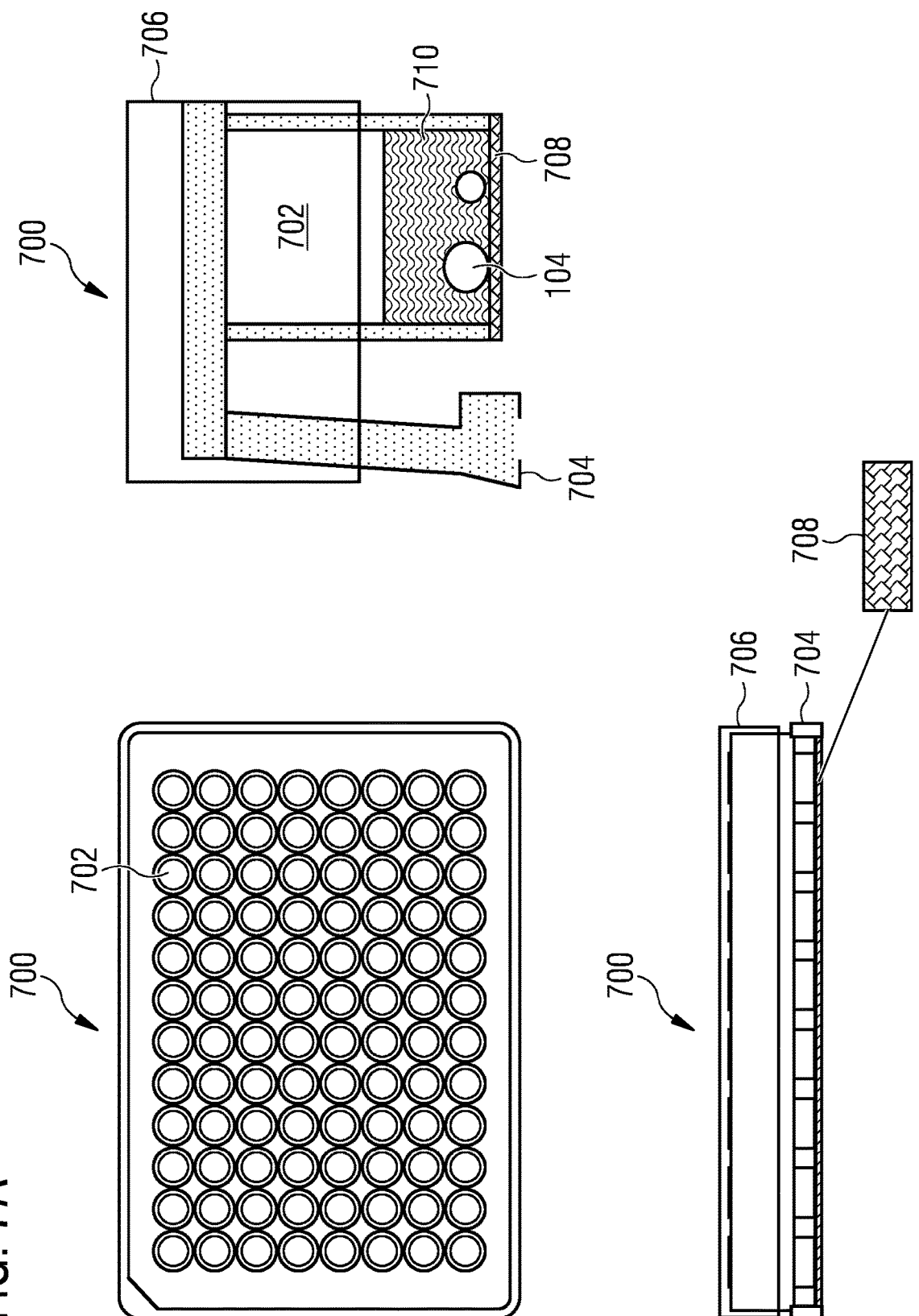
FIG. 7A shows three schematic views of a sample carrier for receiving a sample according to an embodiment.

FIG. 7A shows three schematic views of a sample carrier 700 for receiving a sample 104 according to an embodiment.

A first view shows the sample carrier 700 from the top. The sample carrier 700 is exemplary formed as a microplate that comprises a plurality of wells 702 for arranging samples 104. A second view shows the sample carrier 700 from the side. The sample carrier 700 comprises a base 704 in which the wells 702 are formed and a cover 706 for covering the wells 702 from the top. As can be seen in the second view, a bottom portion of the base 704 is formed as an optically transparent window portion 708. Thus, the samples 104 located in the wells 702 can be observed from below through the window portion 708.

A third view shows a single well of the microplate from the side. The well 702 is filled with an optical medium 710 and the samples 104 are embedded in the optical medium 710. The optical medium 710 has a first refractive index, for example 1.331 in case the optical medium 710 is water, a cell culture medium or a hydrogel matrix commonly used in 3D cell culture applications or a mixture of these. The window portion 708 is made from a material having a second refractive index. The first and second refractive indices are substantially the same, i.e. they do not deviate by more than 2.5%. Therefore, the material of the window portion 708 will also be referred to as index-matched material and denoted by a shingle-pattern in the Figures.

Figures 7B, 7C, 7D:
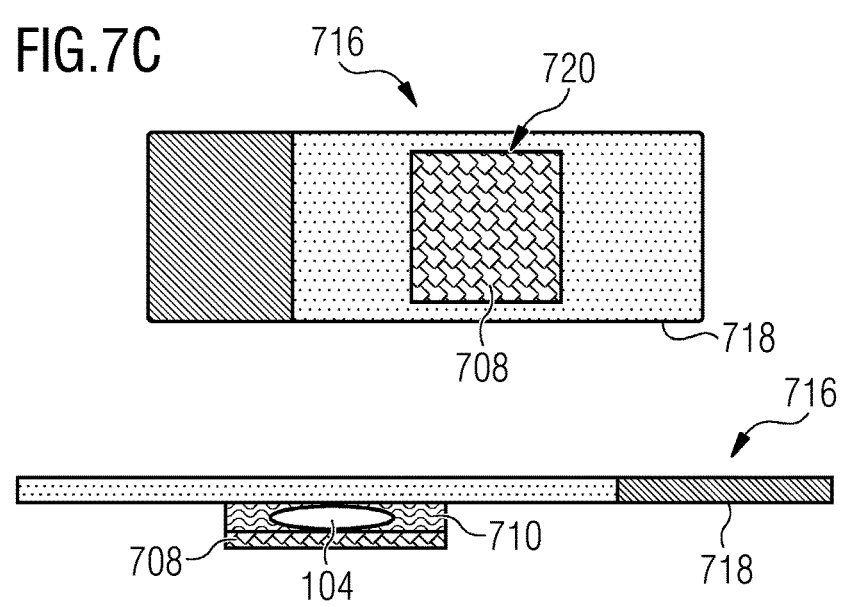
FIG. 7B shows three schematic views of a sample carrier according to another embodiment.
FIG. 7C shows a top view and a side view of a sample carrier according to another embodiment.
FIG. 7D shows three schematic views of a sample carrier according to another embodiment.

FIG. 7B shows three schematic views of a sample carrier 712 according to another embodiment.

A first view shows the sample carrier 712 from the top. The sample carrier 712 is exemplary formed as a petri-dish. A bottom portion of the sample carrier 712 comprises a window portion 714 made from the index-matched material. The window portion 714 allows the sample 104 or the samples arranged inside the sample carrier 712 to be observed from below. A second view shows an oblique plan view of the sample carrier 712. As can be seen from the second view, the samples 104 are arranged atop the window portion 714. A third view shows the sample carrier 712 from the side. The sample carrier 712 is filled with the optical medium 710.

FIG. 7C shows a top view and a side view of a sample carrier 716 according to another embodiment.

The sample carrier 716 is exemplary formed as a microscope slide. The sample carrier 716 has a base portion 718. The sample carrier 716 further comprises a cover glass 720 arranged parallel to the base portion 718. The cover glass 720 is made from the index-matched material. Thus, the cover glass 720 forms the window portion 708. The sample 104 is arranged between the window portion 708 and the base portion 718 and is observed from below through the window portion 708. As can be seen in the side view, the optical medium 710 is arranged between the base portion 718 and the cover glass 720 in order to embed the sample 104.

FIG. 7D shows three schematic views of a sample carrier 722 according to another embodiment.

A first view shows the sample carrier 722 from the side. The sample carrier 722 is exemplary formed as a chamber slide comprising 8 wells 724, for receiving the samples 104. The wells 724 may be filled with the optical medium 710, in order to embed the samples 104. A bottom portion 726 of the sample carrier 722 is made from the index-matched material, thereby forming the transparent window portion 708. A second view shows the sample carrier 722 from the top. The wells 724 are arranged in 2 rows comprising 4 wells 724 each. A third view shows the sample carrier 722 from the bottom. As can be seen in the third view, the window portion 708 is a single element attached to the sample carrier 722 form below.

FIG. 7E shows three schematic views of a sample carrier 728 according to another embodiment. The sample carrier 728 according to FIG. 7E is distinguished from the sample carrier 700 according to FIG. 7A in that the window portion 708 is made of a polymer 730 and a support element 732.

The polymer 730 is, in a preferred embodiment, BIO-133 which has an elastic modulus of only 5 MPa. While this is higher than the elastic modulus of an agarose hydrogel, it is several orders of magnitude lower than that of materials commonly used to manufacture optical-grade transparent windows for imaging plates or flow cells. The polymer 730 is arranged atop the support 732, which may be a support polymer film or support glass plate made out of a material with a higher hardness, tensile strength, and Young's modulus or elastic modulus. This support 732 is configured to be easily removable prior to using the sample carrier 728 by a suitable surface treatment. In this way, the window portion 708 can be generated from materials like BIO-133 that have desirable optical properties but lack the necessary mechanical properties to serve as a substitute for commonly used polystyrene, COC, COP or glass windows. The same strategy may thus be employed for polymers with similar optical and mechanical properties like for example polyacrylamide gels. Polyacrylamide gels are close to invisible in water but are likewise soft and delicate. Also, in this case the support 732 may be used to stabilize the gel. In some cases, for example in the case of polyacrylamide gels, it may be necessary to store them under a suitable storage buffer not unlike to how precast ready-to-use polyacrylamide electrophoresis gels such as TruPAGE™ (Sigma-Aldrich, https://www.sigmaaldrich.com) are being manufactured and stored.

FIG. 8A shows four sample carrier 800a, 800b, 800c, 800d according to different embodiments each in a side view and a top view.

The sample carriers 800a, 800b, 800c, 800d are exemplary formed as flow cells. Each sample carrier 800a, 800b, 800c, 800d comprises at least one fluidic channel 802a, 802b, 802c, 802d each that is filled with a flow medium 804. The samples 104 are embedded in the flow medium 804 and can be moved through the fluidic channels 802a, 802b, 802c, 802d by means of (micro) fluidic and/or pneumatic systems. The fluidic channels 802a, 802b, 802c, 802d are embedded in a base portion 806a, 806b, 806c, 806d of the sample carriers 800a, 800b, 800c, 800d. Slides or other carrier bodies like microplates or carrier bodies with outer dimensions complying to ANSI/SLAS microplate standard are particularly preferable as base portions 806 as they can be handled by standard lab automation solutions, for example robotic arms, grippers, and plate hotels.

A first sample carrier 800a comprises a single fluidic channel 802a having an inlet 808 and an outlet 810. The fluidic channel 802a comprises an optically transparent window portion 812a made from the index-matched material for observing the samples 104 moving through the fluidic channel 802a. A second sample carrier 800b comprises 3 fluidic channels 802b each having an inlet 808 and an outlet 810. Each fluidic channel 802b comprises an optically transparent window portion 812b made from the index-matched material. A third sample carrier 800c comprises 3 fluidic channels 802c each having an inlet 808 and an outlet 810. The three fluidic channels 802c comprises a single optically transparent window portion 812c made from the index-matched material that is shared by the three fluidic channels 802c. A fourth sample carrier 800d comprises a single fluidic channel 802d having an inlet 808 and an outlet 810. The fluidic channel 802d comprises an optically transparent window portion 812d made from the index-matched material spanning almost the entire base portion 806d.

Figure 8B:
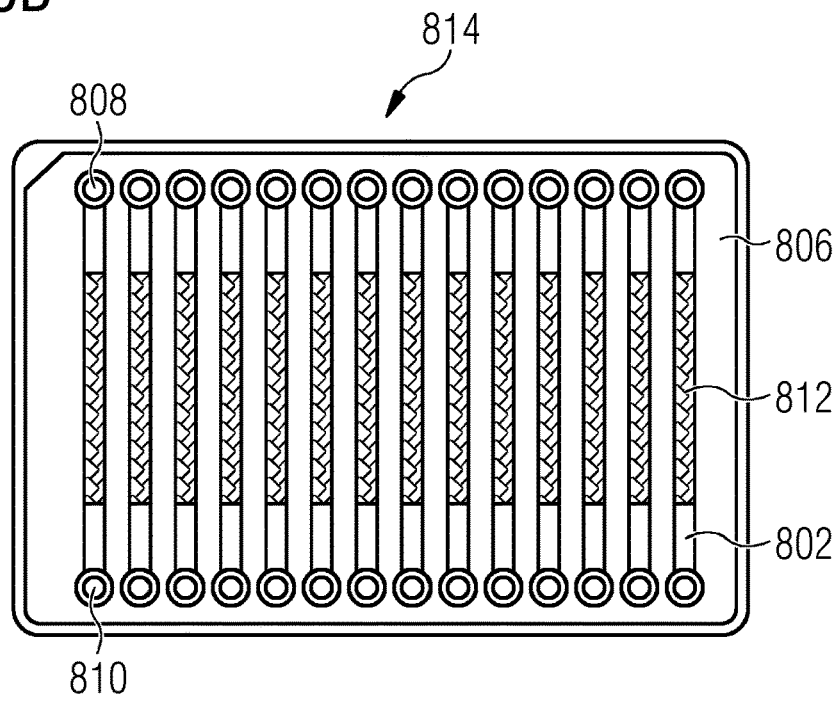
FIG. 8B is a top view of a sample carrier according to another embodiment.

FIG. 8B is a top view of a sample carrier 814 according to another embodiment. The sample carrier 814 according to FIG. 8B is distinguished from the sample carriers 800a, 800b, 800c, 800d according to FIG. 8A in being dimensioned to the normed specifications of a microwell plate. Since the sample carrier 814 is formed according to standardized proportions, the sample carrier 814 may be handled by standard lab automation solutions. The window portion of the sample carrier 814 can either have individual optically transparent window portions for each fluidic channel or one single optically transparent window portion for some or all fluidic channels, as e.g. shown in the sample carriers 800*b* or 800*c*.

Figure 8C:
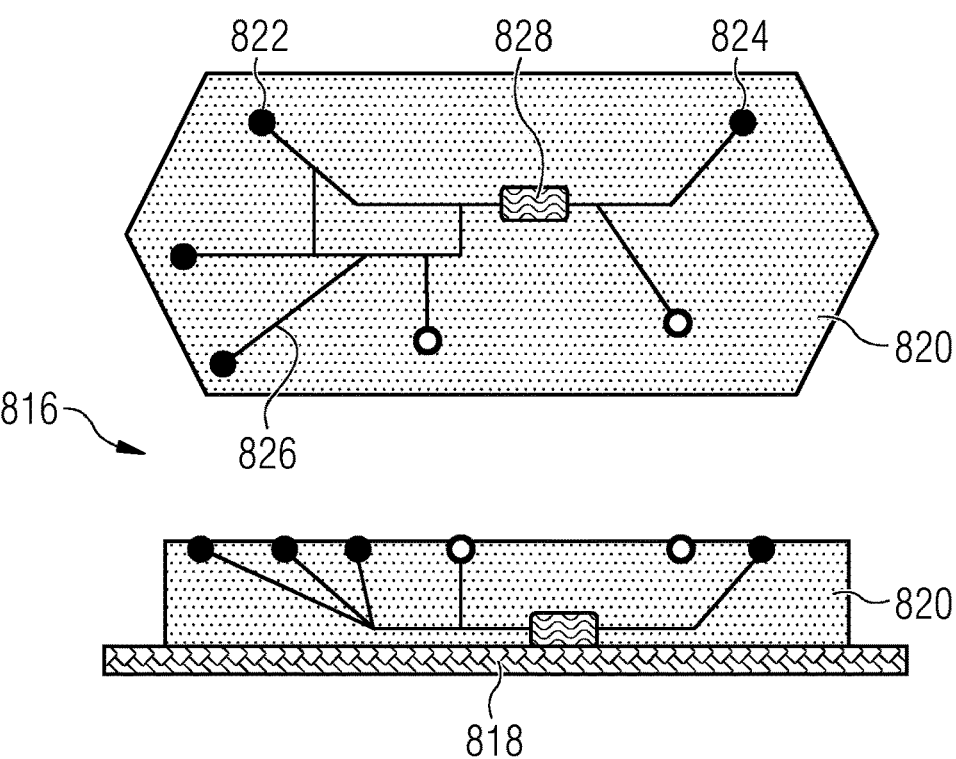
FIG. 8C is a schematic view of sample carrier according to another embodiment in a top view and a side view.

FIG. 8C is a schematic view of sample carrier 816 according to another embodiment in a top view and a side view.

The sample carrier 816 is exemplary formed as a microfluidic chip. As can be seen from the side view, the sample carrier 816 comprises a base portion 818 and a layer of a polymer 820, for example PDMS, arranged atop the base portion 818. An inlet 822, an outlet 824, an optically transparent window portion 828, and a microfluidic channels 826 are formed by the layer of polymer. The sample carrier 816 forms at least one flow cell.

Figure 8D:
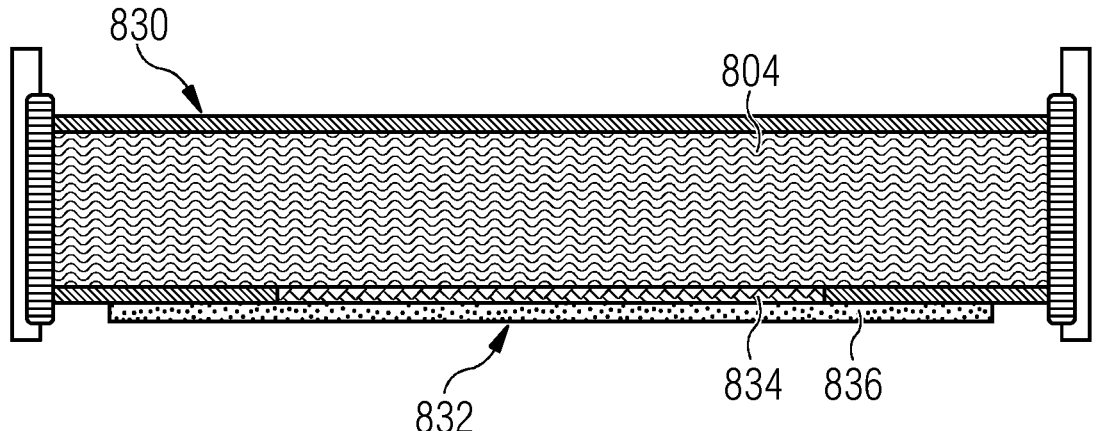
FIG. 8D is a schematic view of a sample carrier according to another embodiment.

FIG. 8D is a schematic view of a sample carrier 830 according to another embodiment. The sample carrier 830 according to FIG. 8D is distinguished from the sample carriers 800*a*, 800*b*, 800*c*, 800*d* according to FIG. 8A in that the window portion 832 is made of a polymer 834 and a support element 836. The polymer 834 may be BIO-133 or polyacrylamide gel. The support 836 may be a support polymer film or support glass plate. In particular, the support 836 may be removable from the polymer 834 without damaging the polymer 834. When the sample carrier 830 is in use in an imaging system 600, the polymer 834 is supported by optical media, in particular the flow medium 804, from the top and the bottom.

Figure 9:
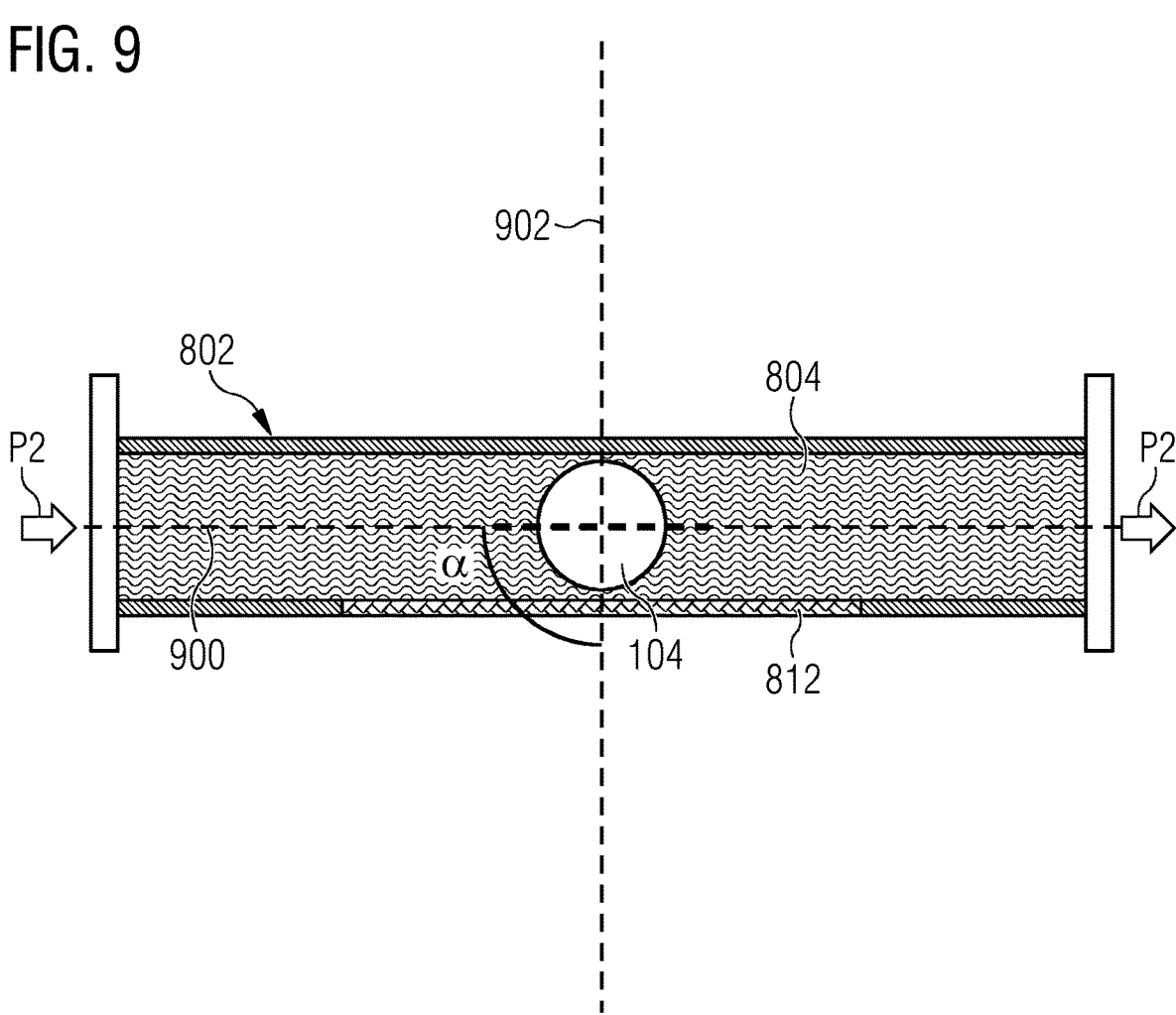
FIG. 9 is a schematic view of a fluidic channel of the sample carrier according FIGS. 8A to 8C.

FIG. 9 is a schematic view of the fluidic channel 802 of one of the sample carriers 800*a*, 800*b*, 800*c*, 800*d* according FIG. 8A.

In FIG. 9 a flow direction of the flow medium 804 in which the sample 104 is embedded is denoted by a set of arrows P2. Further, a reference plane 900 which is parallel to the flow direction P2 is denoted by a first dashed line, and the orthogonal 902 to the reference plane 900 is denoted by a second dashed line. The orthogonal 902 to the reference plane 900 is parallel to the axis of gravity.

Figure 10:
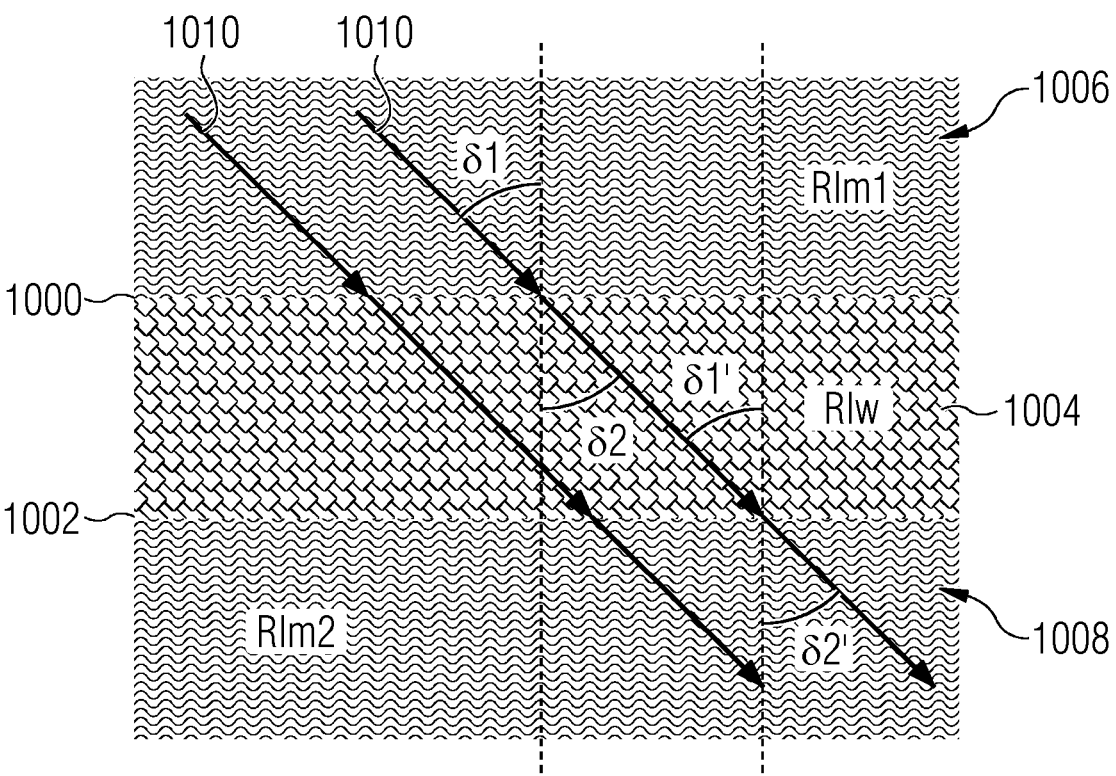
FIG. 10 is a schematic view of two optical interfaces formed at a window portion of the sample carrier according to the FIGS. 7A to 9.

FIG. 10 is a schematic of two optical interfaces 1000, 1002 formed at the window portion 1004 of one of the sample carriers 800*a*, 800*b*, 800*c*, 800*d*, 814, 816 according to the FIGS. 7A to 9.

The optical interfaces 1000, 1002 are formed at the boundary where the window portion 1004 made from the index-matched material touches a first optical medium 1006, i.e. the embedding medium 710 or the flow medium 804, and a second optical medium 1008 respectively. In FIG. 10 the second optical medium 1008 is exemplary the same medium as the first optical medium 1006, for example water, or has a refractive index R1$m$2 close the first refractive. A first optical interface 1000 is formed at the boundary between the window portion 1004 and the first optical medium 1006. A second optical interface 1000 is formed at the boundary between the window portion 1004 and the second optical medium 1008.

Two parallel light rays 1010 travel from the top through the first optical medium 1006, the window portion 1004, and the second optical medium 1008 in that order. Since the refractive indices R1$m$1, R1$m$2 of the first and second optical medium 1006, 1008 are essentially equal to the refractive index R1$w$ of the window portion 1004, the light rays 1010 are not or only slightly refracted at the first and second optical interfaces 1000, 1002. In the case the refractive indices R1$m$1, R1$m$2, R1$w$ do not deviate by more than 2.5%, the resulting spherical aberrations and coma are so mild that they can still be corrected computationally. As will be described below with reference to FIG. 11 multiple possible combinations of the first optical medium 1006, i.e.

the embedding medium 710 or the flow medium 804, the index-matched material of the window portion 1004, and the second optical medium 1008, i.e. the immersion medium, can be found that satisfy this criterion.

FIG. 11 is a table comparing refractive indices for different materials.

As can be seen from FIG. 11, multiple materials have a refractive index within 2.5% of the refractive index of water, i.e. 1.331. In particular, BIO-133, FEP, TFTE, Polyacrylamide can be used as the index-matched material, if water, a solution or a hydrogel with substantially similar refractive index are used as the first optical medium 406, 1006, for example 0.4% agarose with a refractive index of 1.3329 or 8% Polyacrylamide with a refractive index of 1.349. As the second optical medium 408, 1008, i.e. the immersion medium, water or a solution or an immersion liquid with substantially similar refractive index is used.

Water-based buffers and media are commonly used for cultivation of samples and staining reactions. Likewise, it is particularly preferable in the context of three-dimensional cell culture wherein hydrogels with a substantially similar refractive index to water are used as scaffolds or matrices for scaffold-based three-dimensional cell cultures. Such matrices include mixtures of natural origin and synthetic hydrogels, for example: agarose, alginate, chitosan, hyaluronan, dextran, collagen and fibrin as well as poly(ethylene glycol), poly(hydroxyethyl methacrylate), poly(vinyl alcohol) and poly(caprolactone). Further examples include basement membrane extracts, which may include Laminin I, Collagen I, Collagen IV, Vitronectin and Fibronectin amongst others, and extracellular matrix preparations, including for example, Cultrex, Matrigel™, or Jellagel. Hydrogels and extracellular matrices are used extensively with other elements for scaffold-based three-dimensional cell culture in "imaging plates" for both live imaging and end-point assays. Furthermore, such matrices are of great interest in the context of flow through-based imaging as described in PCT/EP2021/061754, the content of which is completely included here by reference. Citing from this document: "Cells and other elements can be efficiently embedded into discrete entities such as hydrogel beads by various means, cultivated in suspension, and imaged. Various forms of hydrogel beads including single-phase, multi-phase, mixed phase, hollow as well as solid core hydrogel beads with or without a shell can be manufactured using a variety of approaches including microfluidics, three-dimensional printing, emulsification or electro-spraying. This allows cultivation of large numbers of cells, including rare cells, for analytical, diagnostic and therapeutic purposes in a three-dimensional cell culture." Especially sample carriers formed as flow cells are ideally suited to enable ultra-high throughput volumetric imaging of samples encapsulated in for example hydrogel beads and may be used for imaging of a very high number of markers (high plexing).

Alternatively, dibenzyl ether and diphenyl ether having a refractive index of about 1.55 to 1.56 or a solvent or a solution with substantially similar refractive index may be used as the first optical medium 1000. In this case, the index-matched material may be a high refractive index (HRI) polymer. HRI polymers have been developed based on polysiloxanes (pSX) and polymethacrylates (pMA), and are widely used in medicine for example as intraocular lenses (IOLs) as described in Badur et al. 2018 in Macromolecules 2018 51 (11), 4220-4228. The HRI polymers are made from an HRI group, which features aromatic rings that provide a conjugated system of a electrons, and a spacer group that connects the HRI group to the polymerizable group, for example a siloxane (SX) or a methacrylate (MA) group. It is a particularly preferable embodiment to select the material for the window portion 1004 from the group of HRI polymers, which are based on polysiloxanes or polymethacrylates for their excellent optical properties as well as good biocompatibility. It is a particularly preferable embodiment to use diphenylmethane as an HRI group to obtain a polymer with a refractive index in the range of 1.55-1.56+/−2.5% at 589 nm, for example pSX-DPM having a refractive index of 1.567 at 589 nm or pMA-DPM having an refractive index of 1.588 at 589 nm. In a preferred embodiment of the window portion 1004 is made from polyimide film. As described in Wu et al. 2020 Macromol. Chem. Phys. 2020, 221, 1900506 colorless and transparent polyimide films can be made with good mechanical properties, e.g. a thicknesses in the 50 to 75 μm range and, a light transmission of 86 to 90% in the 400 to 760 nm wavelength range. Alternatively, or in addition the window portion 1004 may be made from one of the following a High Refractive Index Polymers, a nanocomposite, a polycarbonate, and an epoxy resin. Polycarbonate films can be made with a refractive index of 1.57 to 1.62 at 589 nm as disclosed in U.S. Pat. No. 10,632,696 B2, similar methods for the production of transparent polyimide optical films have been disclosed in U.S. Pat. No. 9,061,474 B2. Further EP 1 254 190 B1 discloses optical or ophthalmic lenses made from phosphonate homopolymers or copolymers. Such melt-processable poly-phosphonates have a refractive index of 1.58 to 1.64 at 589 nm. Polycarbonate microplates or microplates with a thin polycarbonate bottom are used to perform polymerase chain reaction.

Figure 12:
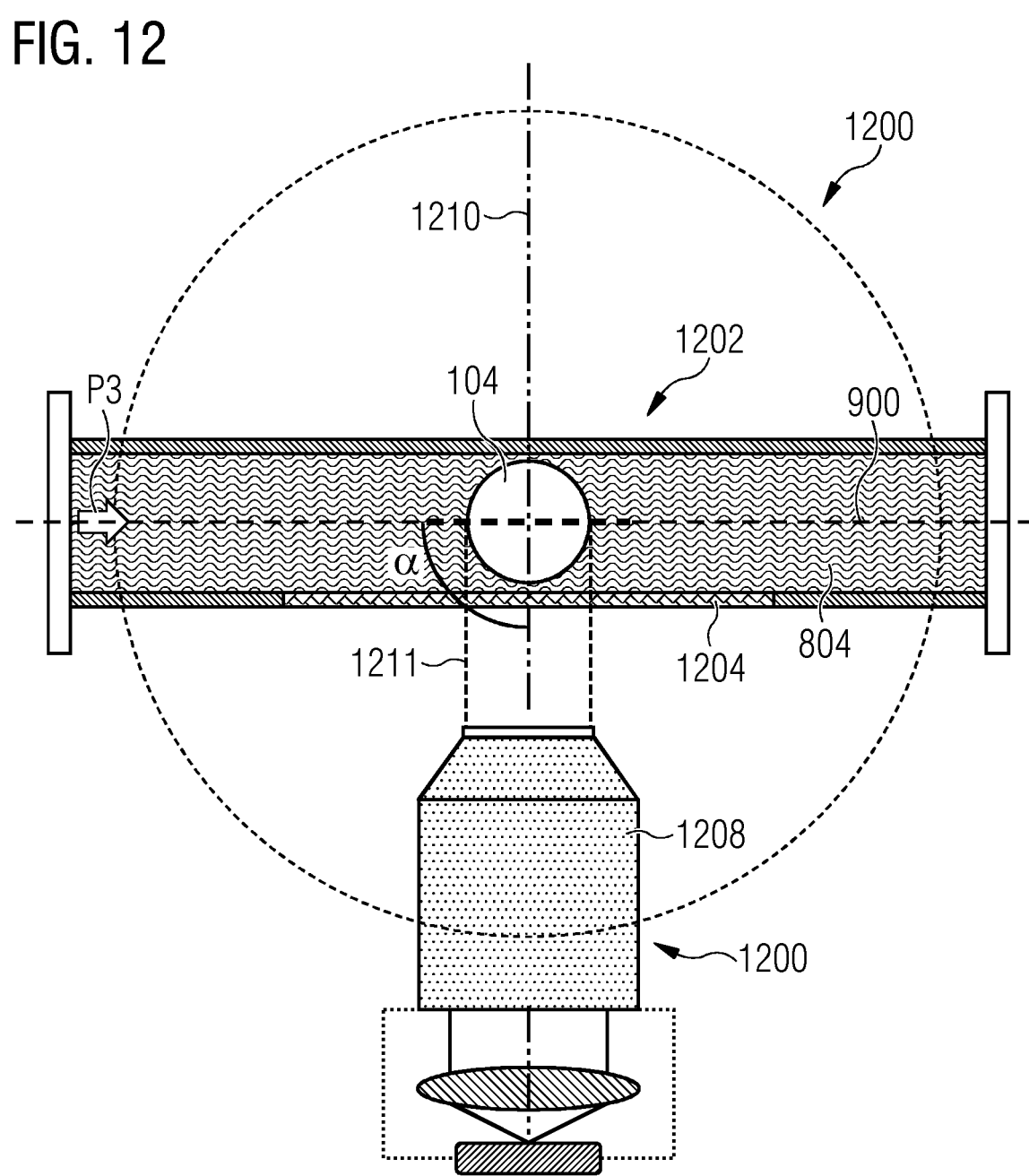
FIG. 12 is a schematic view of an imaging system according to an embodiment.

FIG. 12 is a schematic view of an imaging system 1200 according to an embodiment.

The imaging system 1200 comprises a sample carrier 1202, in particular one of the sample carriers described above with reference to FIGS. 7A to 9, having an optically transparent window portion 1204 arranged at a bottom side of the sample carrier 1202. The sample carrier 1202 is exemplary formed as a flow cell filled with the flow medium 804. A flow direction of the flow medium 804 is denoted by an arrow P3. Samples 104 embedded in the flow medium 804 are moving with the flow medium 804 along the flow direction P3. The reference plane 900 perpendicular to the axis of gravity and parallel to the flow direction is denoted by a dashed line.

The imaging system 1200 further comprises an optical detection system 1206 having an objective 1208 directed at the window portion 1004 of the sample carrier 1202. The optical axis 1210 of the objective 1208 is perpendicular to the flow direction and in this arrangement parallel to the axis of gravity. The space 1211 between a front lens of the objective 1208 and the window portion 1004 is filled with air, i.e. the objective 1208 is a so called dry objective 1208.

Figure 13:
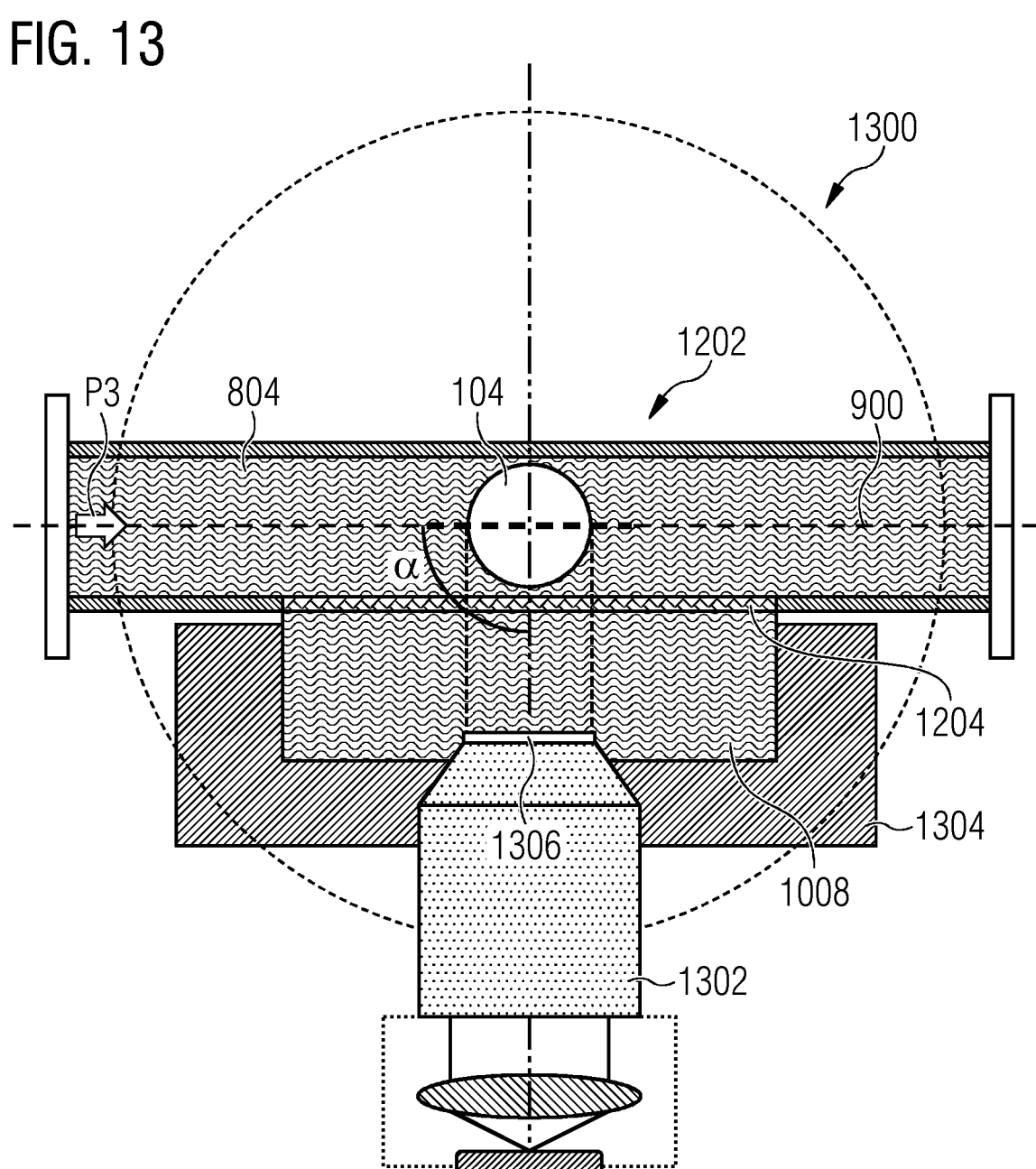
FIG. 13 shows a schematic view of an imaging system according to another embodiment.

FIG. 13 is a schematic view of an imaging system 1300 according to another embodiment. The imaging system 1300 according to FIG. 13 is distinguished from the imaging system 1200 according to FIG. 12 in having an immersion objective 1302.

The imaging system 1300 comprises an immersion container 1304 arranged below the window portion 1204 of the sample carrier 1202. The immersion container 1304 is filled with the second optical medium 1008, i.e. an immersion medium, such that the second optical medium 1008 touches, e.g. is in contact with the window portion 1204. The objective 1302 is partially received within the immersion container 1304 such that the front lens is completely immersed in the second optical medium 1008. Thus, the space between a front lens 1306 of the objective 1302 and the window portion 1204 is filled with the second optical medium 1008.

Figure 14:
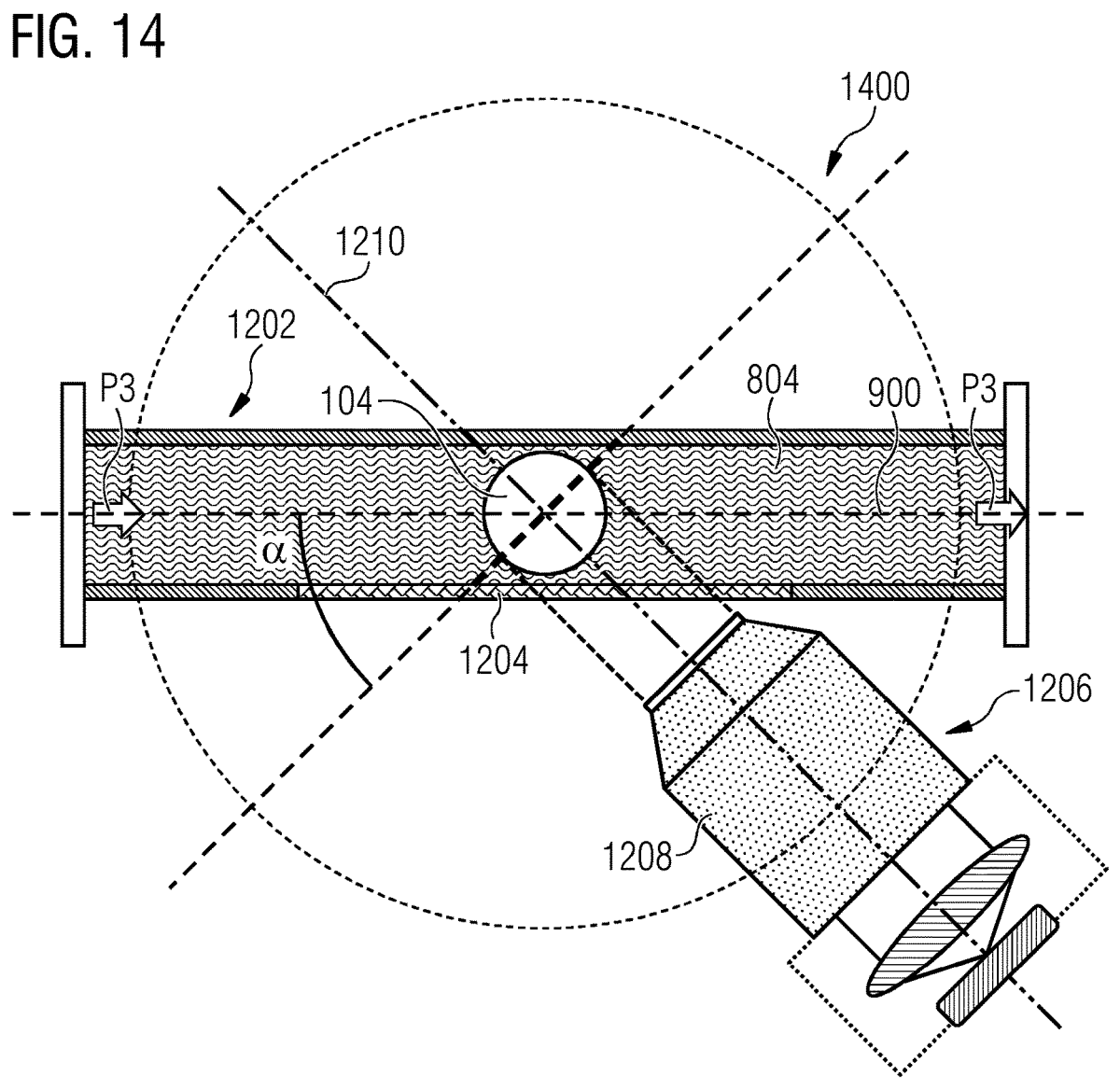

FIG. 14 is a schematic view of an imaging system 1400 according to another embodiment. The imaging system 1400 according to FIG. 14 is distinguished from the imaging system 1200 according to FIG. 12 in that the objective 1208 is tilted with respect e.g. to the reference plane 900.

The optical axis 1210 of the objective 1208 and the reference plane 900 enclose an angle α of about 45°. As is described above with reference to FIG. 10, almost no refraction takes place at the first optical interface, where the first optical medium 1006 and the window portion 1004 meet. However, because of the refraction between the window portion 1004 and the second medium 1008 being air in this example, the tilt of the objective 1208 does lead to aberrations or coma.

Figure 15:
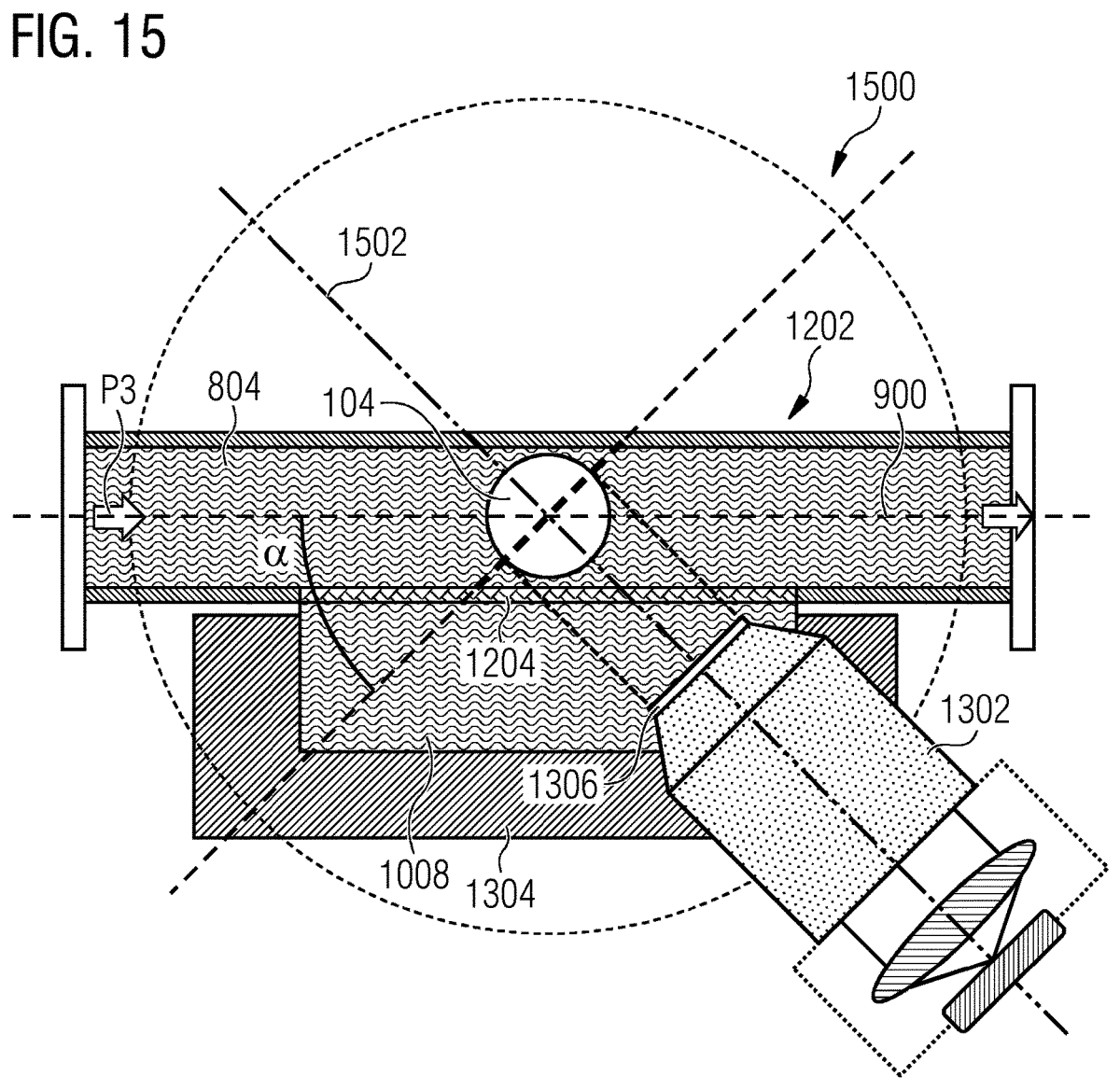

FIG. 15 is a schematic view of an imaging system 1500 according to another embodiment. The imaging system 1500 according to FIG. 15 is distinguished from the imaging system 1300 according to FIG. 13 in that the objective 1302 is tilted with respect e.g. to the reference plane 900.

The optical axis 1502 of the objective 1302 and the reference plane 900 enclose an angle α of about 45°. As is described above with reference to FIG. 10, almost no refraction takes place at the first optical interface 1000, where the first optical medium 1006 and the window portion 1004 meet. Since there is almost no refraction between the window portion 1004 and the second medium 1008, the tilt of the objective 1302 does not lead to aberrations or coma.

The imaging systems 1400, 1500 according to FIGS. 14 and 15 are a particularly preferable embodiment as they provide the possibility to perform high-speed volumetric imaging using an inverted microscope arrangement, that is compatible with the sample carriers described above with reference to FIGS. 8A to 8C.

Similar results could be achieved in a different way, by using sample carriers with glass bottom transparent windows. However, in this case the resulting aberrations have to be corrected using an additional free-form optical element in between the front lens 1306 of the objective 1208, 1302 and the sample carrier 1202 window as disclosed in WO 2019/063539 A1. While this approach is suited to perform high quality volumetric imaging, it is tied to two principle disadvantages which are described above with reference to FIG. 6. The present embodiment leverages index-matching as a strategy using suitable materials for the window portion 1004, 1204 to adjust the refractive indices to the most relevant ranges, which depend on the type of sample and assay.

Figure 16:
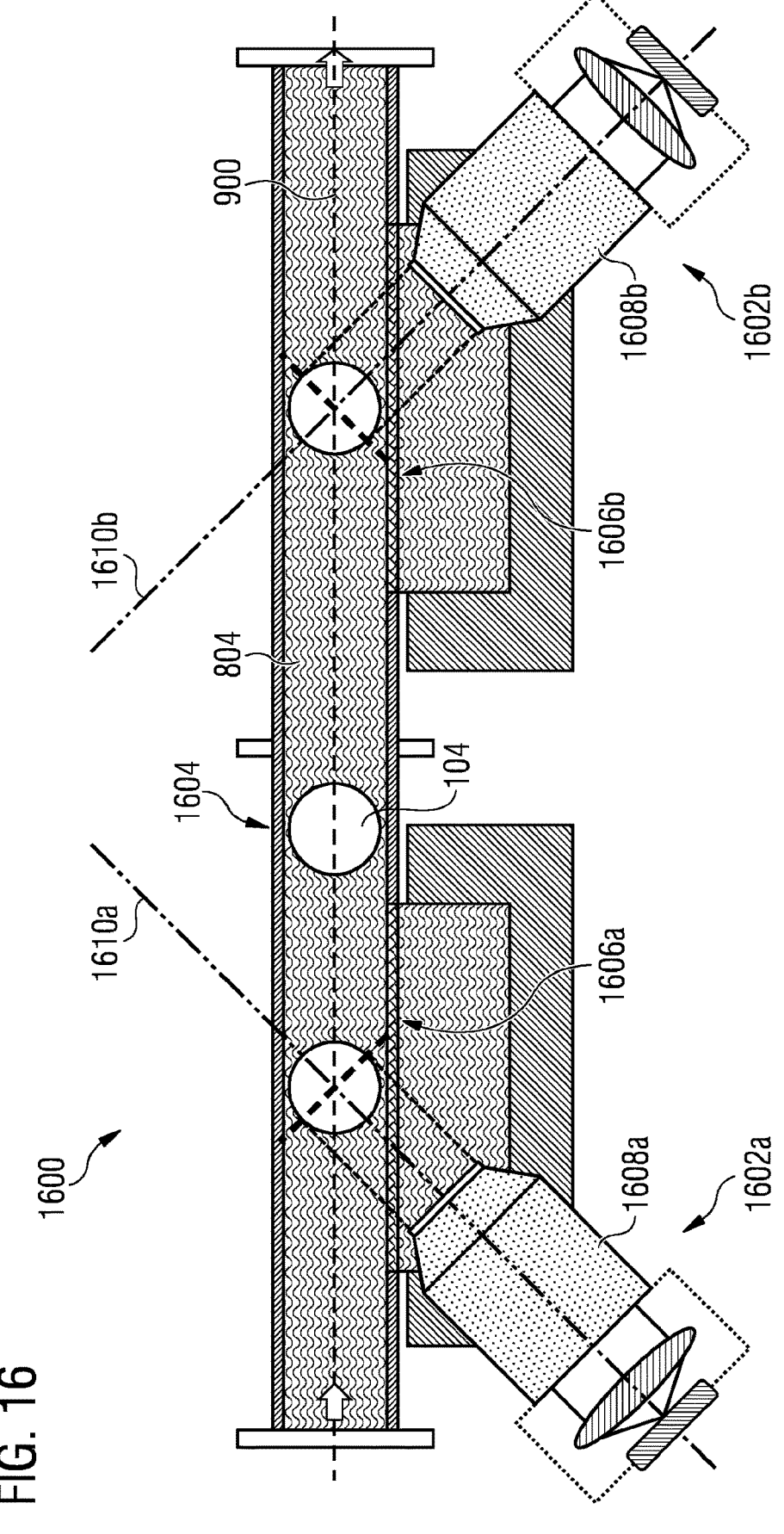
FIG. 16 shows a schematic view of an imaging system according to another embodiment.

FIG. 16 is a schematic view of an imaging system 1600 according to another embodiment. The imaging system 1600 according to FIG. 16 is distinguished from the imaging system 1500 according to FIG. 15 in having two optical detection systems 1602a, 1602b.

The sample carrier 1604 comprises a first window portion 1606a arranged next to second window portion 1606b at the bottom side of the sample carrier 1602. Both window portions 1606a, 1606b are made from the index matched material. An objective of the first optical detection system 1602a, called first objective 1608a in the following, is arranged below the first window portion 1606a and next to an objective of the second optical detection system 1602b, called second objective 1608b in the following. The optical axes 1610a, 1610b of the first and second objectives 1608a, 1608*b* enclose an angle of about 45° (and 135° respectively) with the reference plane 900 and intersect above the sample carrier 1202.

The first and second optical detection systems 1602*a*, 1602*b* are arranged in sequence allow the flow direction such that they generate multiple views, i.e. images of the sample 104 from multiple perspectives. Multiple optical detection systems may be configured in the same way, i.e. to generate images with essentially the same imaging parameters from different perspectives, e.g. by arranging further imaging systems such that the optical axis of the further objectives of the further imaging systems enclose a respective different angle relative to the reference plane 900 or the flow direction P3. Alternatively, the optical detection systems 1602*a*, 1602*b* may be configured such that they operate with substantially different imaging parameters and generate either different views or essentially the same view. For example, at least one imaging system 1602*a* may be used to record fluorescence images while at least a second imaging system 1602*b* is used to record fluorescence lifetime data, i.e. has a pulsed light source and a time-sensitive detector and is capable of acquiring fluorescence decay curves. Such a FLIM imaging unit can for example be implemented using widefield frequency-domain fluorescence lifetime imaging microscopy (FLIM).

Figure 17:
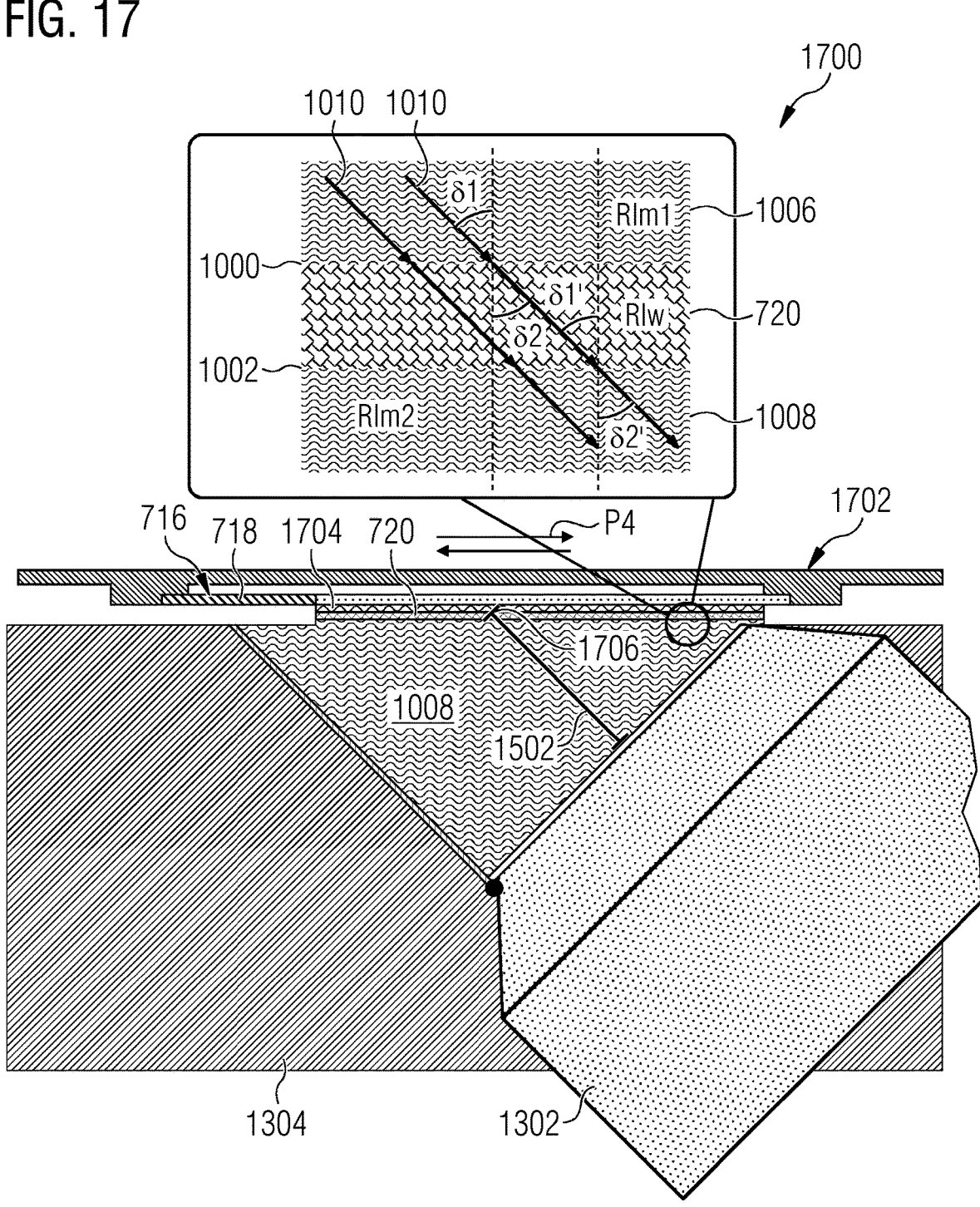
FIG. 17 shows a schematic view of an imaging system according to another embodiment.

FIG. 17 is a schematic view of an imaging system 1700 according to another embodiment. The imaging system 1700 according to FIG. 17 is distinguished from the imaging system 1500 according to FIG. 15 in having a movable sample carrier receiving portion 1702.

The sample carrier receiving portion 1702 is movable along at least one direction. This is shown in FIG. 17 by two arrows P4. The imaging system 1700 further comprises a sample carrier 716 formed as a microscope slide described above with reference to FIG. 7C. The sample carrier 716 is received in the sample carrier receiving portion 1702. Four tissue sections 1704 are arranged between the cover glass 720 and the base portion 718. By moving the sample carrier receiving portion 1702 relative to the objective 1302 the tissue sections 1704 are moved through the object plane 1706 of the objective 1302. Planes of the tissue sections 1704 parallel to the object plane 1706 can be imaged individually, thereby achieving optical sectioning. From the images of the plane volumetric images of the tissue sections 1704 can be generated.

A detail view in FIG. 17 shows the first and second optical interfaces 1000, 1002 atop and below the window portion 720. The optical interfaces 1000, 1002 are formed at the boundary where the window portion 1004 touches the first optical medium 1006, i.e. the embedding medium of the tissue sections 1704, and the second optical medium 1008 respectively. In FIG. 17 the second optical medium 1008, i.e. the immersion medium, is exemplary the same medium as the first optical medium 1006, for example water, or has a refractive index close the first refractive. Two parallel light rays 1010 (as an example of an imaging direction of a tissue section 1704) emitted by the tissue sections 1704 travel from the top through the first optical medium 1006, the window portion 720, and the second optical medium 1008 in that order. Since the window portion 720 is made from the index-matched material, no significant refraction occurs at the first and second optical interface.

Figure 18:
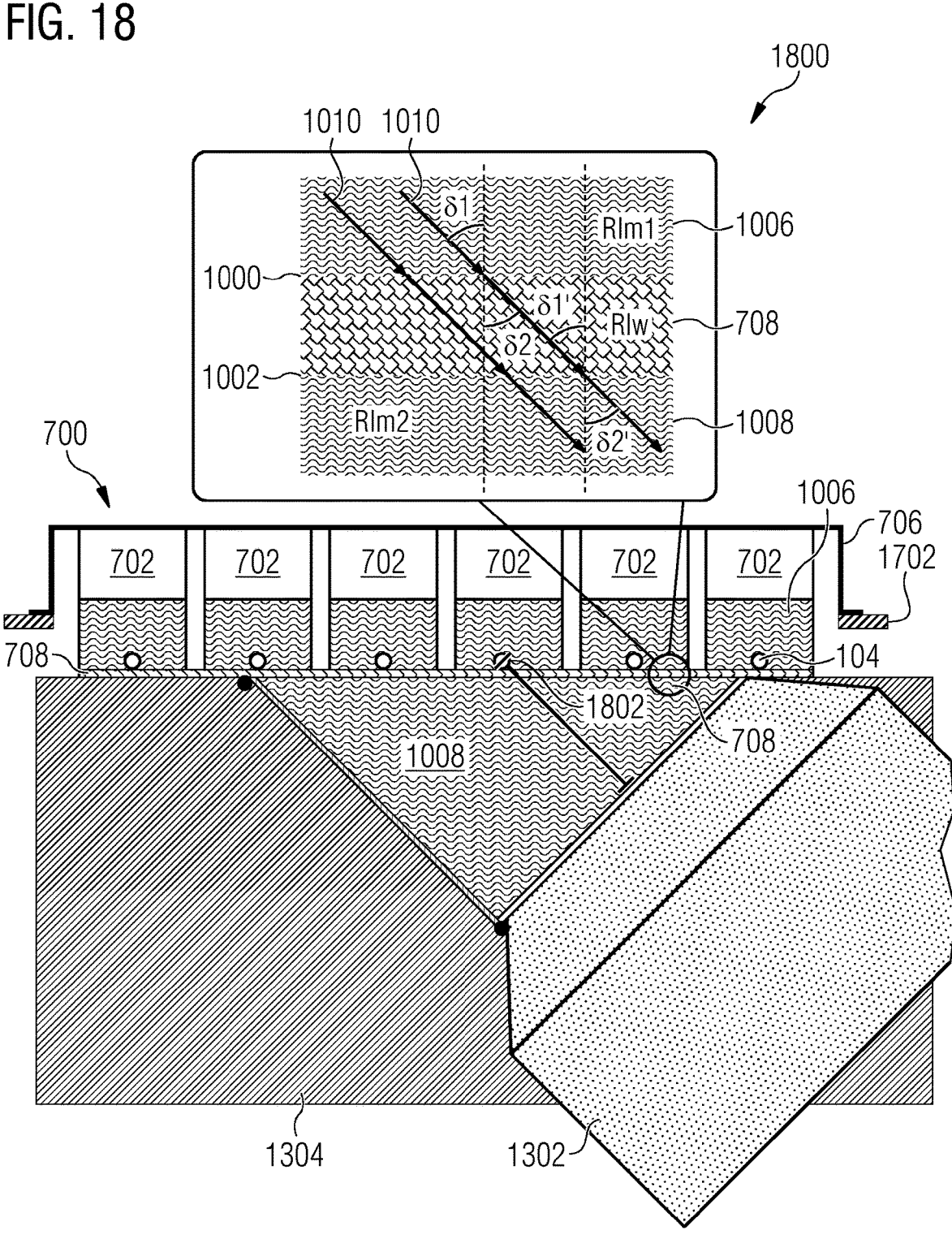
FIG. 18 shows a schematic view of an imaging system according to another embodiment.

FIG. 18 is a schematic view of an imaging system 1800 according to another embodiment.

The imaging system 1800 according to FIG. 18 is similar to the imaging system 1700 according to FIG. 17. However, the imaging system 1800 comprises the sample carrier 700 described above with reference to FIG. 7A. By moving the sample carrier receiving portion 1702 relative to the objective 1302 the samples 104 received in the wells 702 of the sample carrier 700 are moved through the object plane 1802 of the objective 1302. Planes of the samples 104 parallel to the object plane 1802 can be imaged individually, thereby achieving optical sectioning. From the images of the planes volumetric images of the samples 104 can be generated.

A detail view in FIG. 18 shows the first and second optical interfaces 1000, 1002 atop and below the window portion 708. In FIG. 18 the second optical medium 1008 is exemplary the same medium as the first optical medium 1006, for example water, or has a refractive index close the first refractive. Two parallel light rays emitted by the samples 104 in a well 702 travel from the top through the first optical medium 1006, the window portion 708, and the second optical medium 1008 in that order. Since the window portion 708 is made from the index-matched material, no significant refraction occurs at the first and second optical interface.

Figure 19:
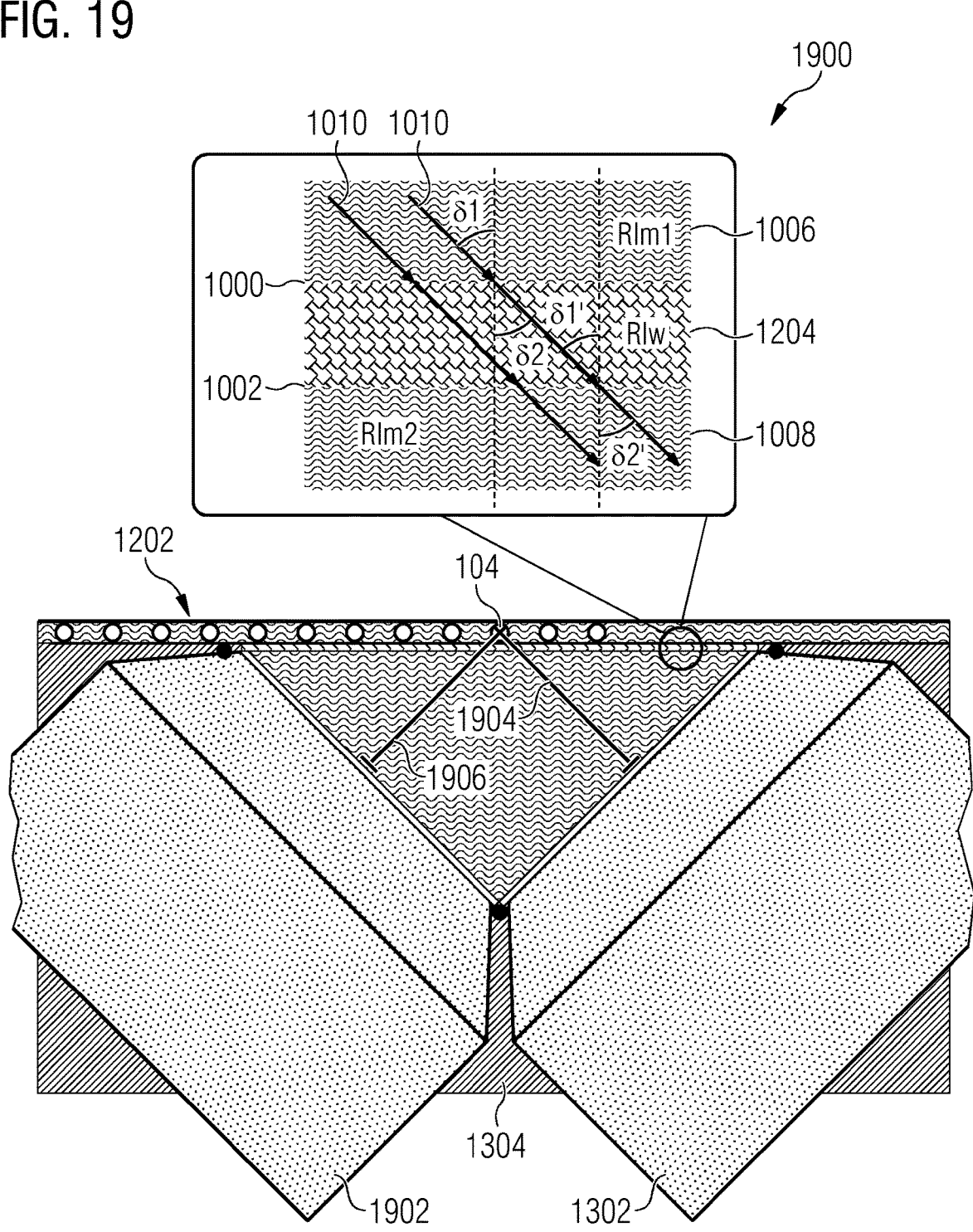
FIG. 19 shows a schematic view of an imaging system according to another embodiment.

FIG. 19 is a schematic view of an imaging system 1900 according to another embodiment. The imaging system 1900 according to FIG. 19 is distinguished from the imaging system 1500 according to FIG. 15 in having a second objective 1902.

The first and second objectives 1302, 1902 are arranged below the window portion 1204 of the sample carrier 1202 which is a flow cell in this example. The optical axes 1904, 1906 of the first and second objectives 1302, 1902 intersect within the sample carrier 1202 and enclose and angle of about 90°.

This setup may be used to provide images of the sample 104 having close—to isotropic resolution following to deconvolution and registration of the imaging data. This process will be explained in more detail below with reference to FIGS. 33 and 34. Achieving close—to isotropic resolution is mainly possible with a light sheet illumination but also with other types of illumination.

Figure 20:
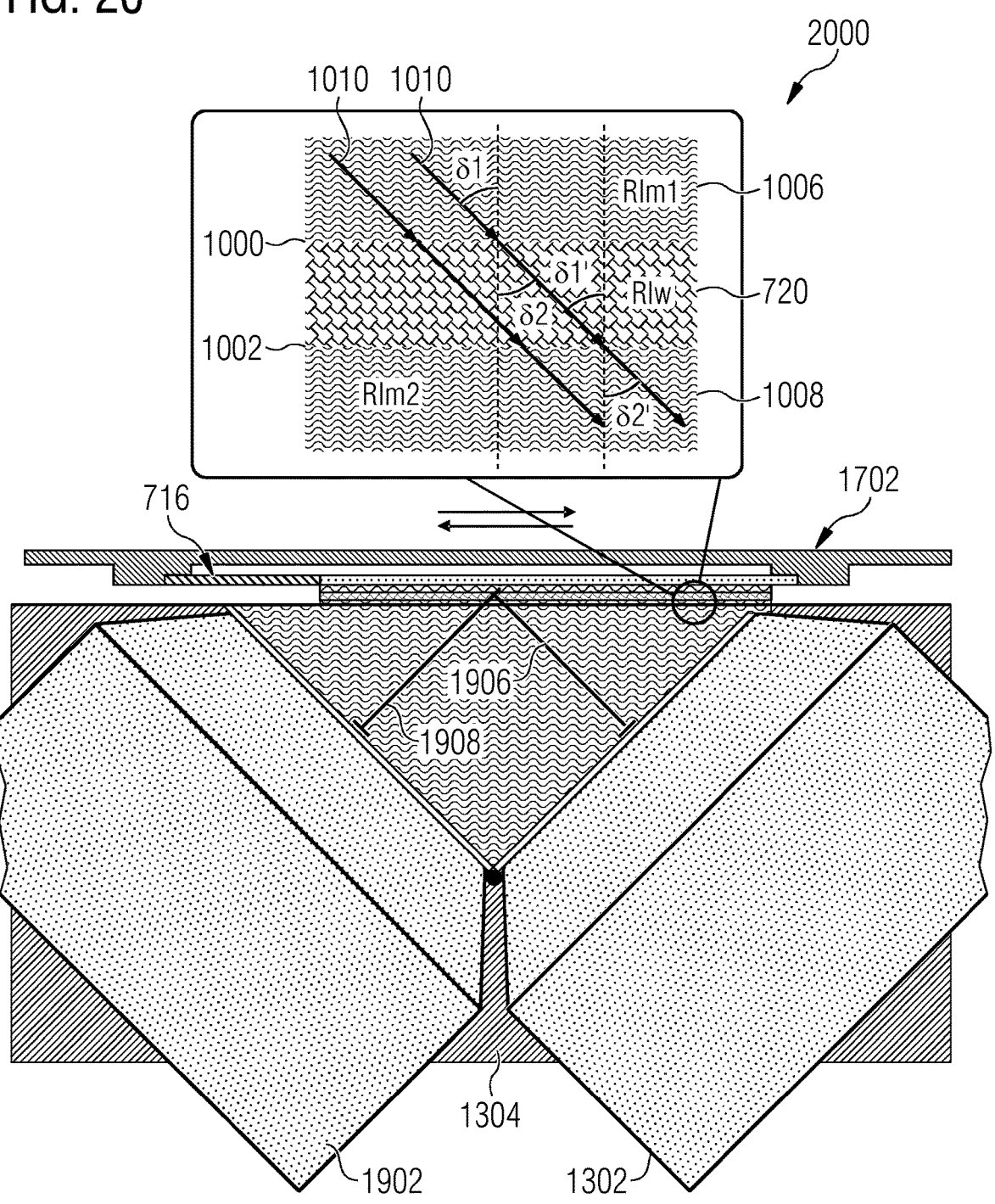
FIG. 20 shows a schematic view of an imaging system according to another embodiment.

FIG. 20 is a schematic view of an imaging system 2000 according to another embodiment. The imaging system 2000 according to FIG. 20 is distinguished from the imaging system 1900 according to FIG. 19 in having the movable sample carrier receiving portion 1702.

The imaging system 2000 according to FIG. 20 is similar to the imaging system 1900 according to FIG. 19. However, the imaging system 1900 comprises the sample carrier 716 described above with reference to FIG. 7C that is receiving in the sample carrier receiving portion 1702.

Figure 21:
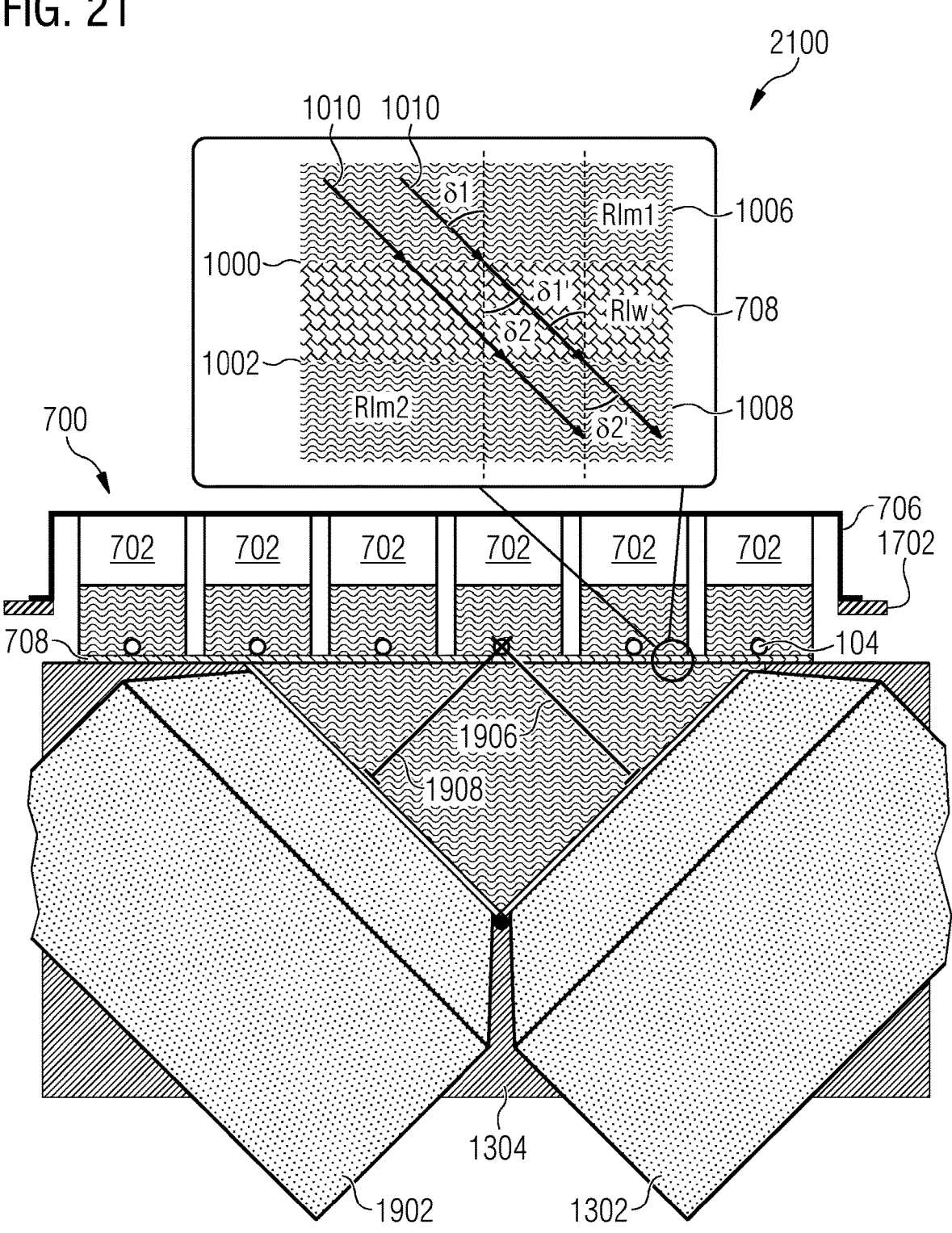
FIG. 21 shows a schematic view of an imaging system according to another embodiment.

FIG. 21 is a schematic view of an imaging system 2100 according to another embodiment.

The imaging system 2100 according to FIG. 21 is similar to the imaging system 2000 according to FIG. 20. However, the imaging system 2100 comprises the sample carrier 700 described above with reference to FIG. 7A.

Figure 22:
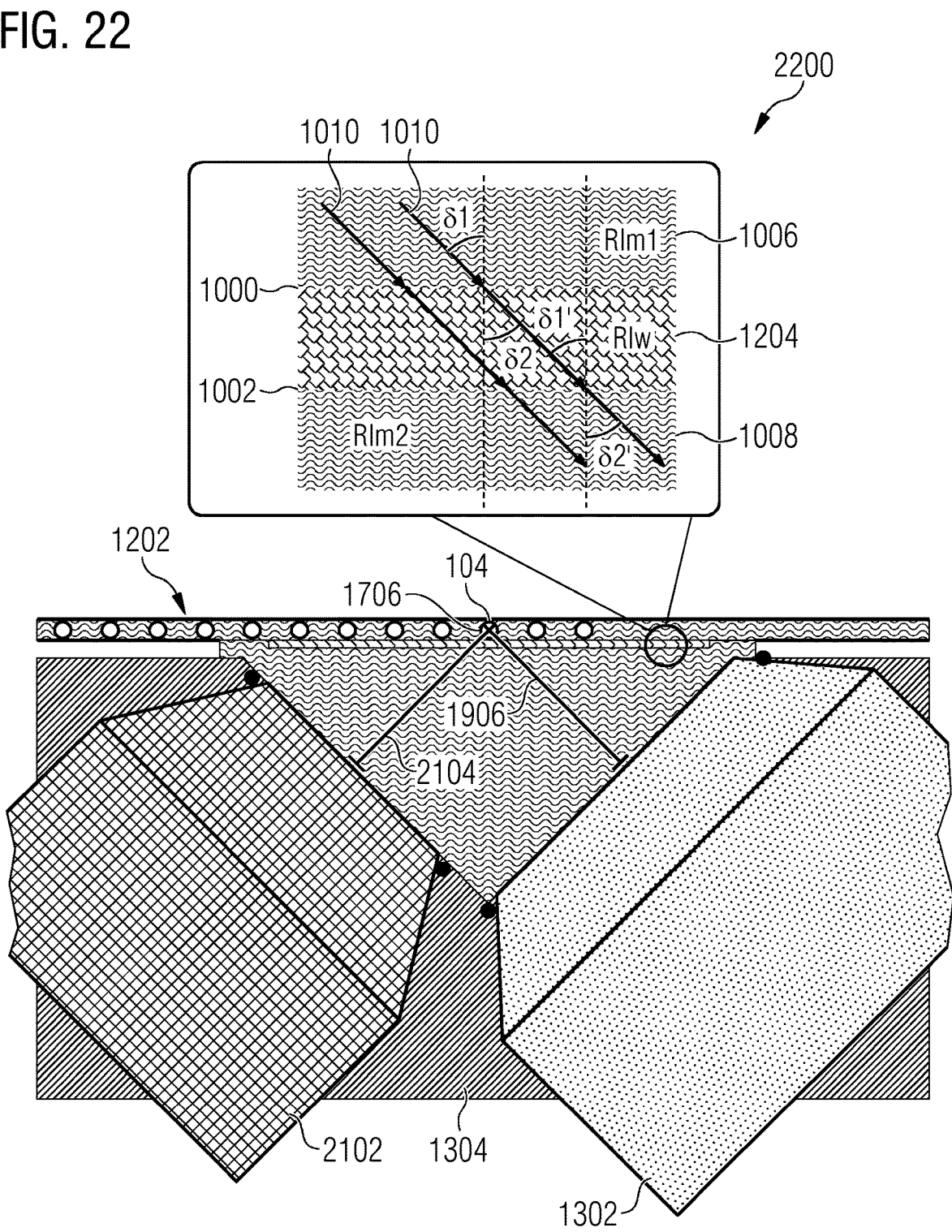
FIG. 22 shows a schematic view of an imaging system according to another embodiment.

FIG. 22 is a schematic view of an imaging system 2200 according to another embodiment. The imaging system 2200 according to FIG. 22 is distinguished from the imaging system 1500 according to FIG. 15 in having a second objective 2102 used for illumination of the sample region.

The first objective 1302, called detection objective, and the second objective 2102, called illumination objective, are arranged below the window portion 1204 of the sample carrier 1202. The optical axes 1906, 2104 of the first and second objective 1302, 2102 intersect within the sample carrier 1202 and enclose and angle of about 90°. Thus, the object plane 1706 of the detection objective 1302 is orthogonal to the optical axis 2104 of the illumination objective 2102.

The present embodiment is a particularly preferred arrangement used for various types of light sheet fluorescence microscopy. The sample 104 may be illuminated with a static or scanned virtual light sheet with one of the following beam profiles: a Gaussian beam, a Bessel beam, a sinc2 profile, a lattice light sheet. Alternatively, or in addition the sample 104 may be illuminated by an illumination pattern resulting from interference.

Figure 23:
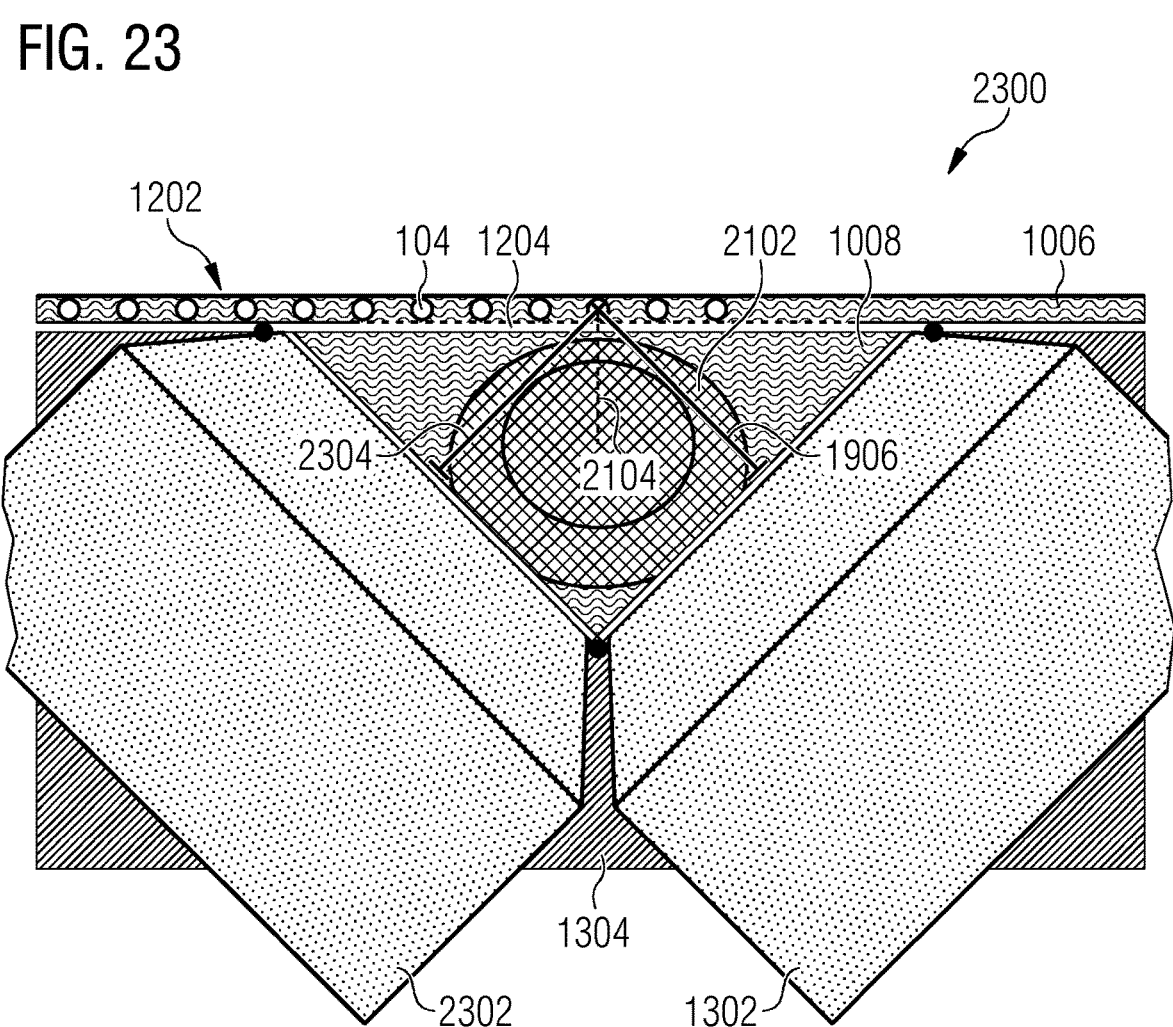
FIG. 23 shows a schematic view of an imaging system according to another embodiment.

FIG. 23 is a schematic view of an imaging system 2300 according to another embodiment. The imaging system 2300 according to FIG. 23 is distinguished from the imaging system 2200 according to FIG. 22 in having a second detection objective 2302.

The second detection objective 2302 is arranged below the window portion 1204 of the sample carrier 1202. The optical axes 1906, 2104, 2304 of the illumination objective 2102 and first and second detection objectives 1302, 2303 intersect within the sample carrier 1202 and enclose and angle of about 90°. Thus, in this embodiment the intersection of the object planes of the first and second detection objectives 1302, 2303 is essentially parallel to the optical axis 2104 of the illumination objective 2102. Thereby, illumination provided through the illumination objective 2102 illuminates the object planes of both the first and second detection objectives 1302, 2303.

Figure 24:
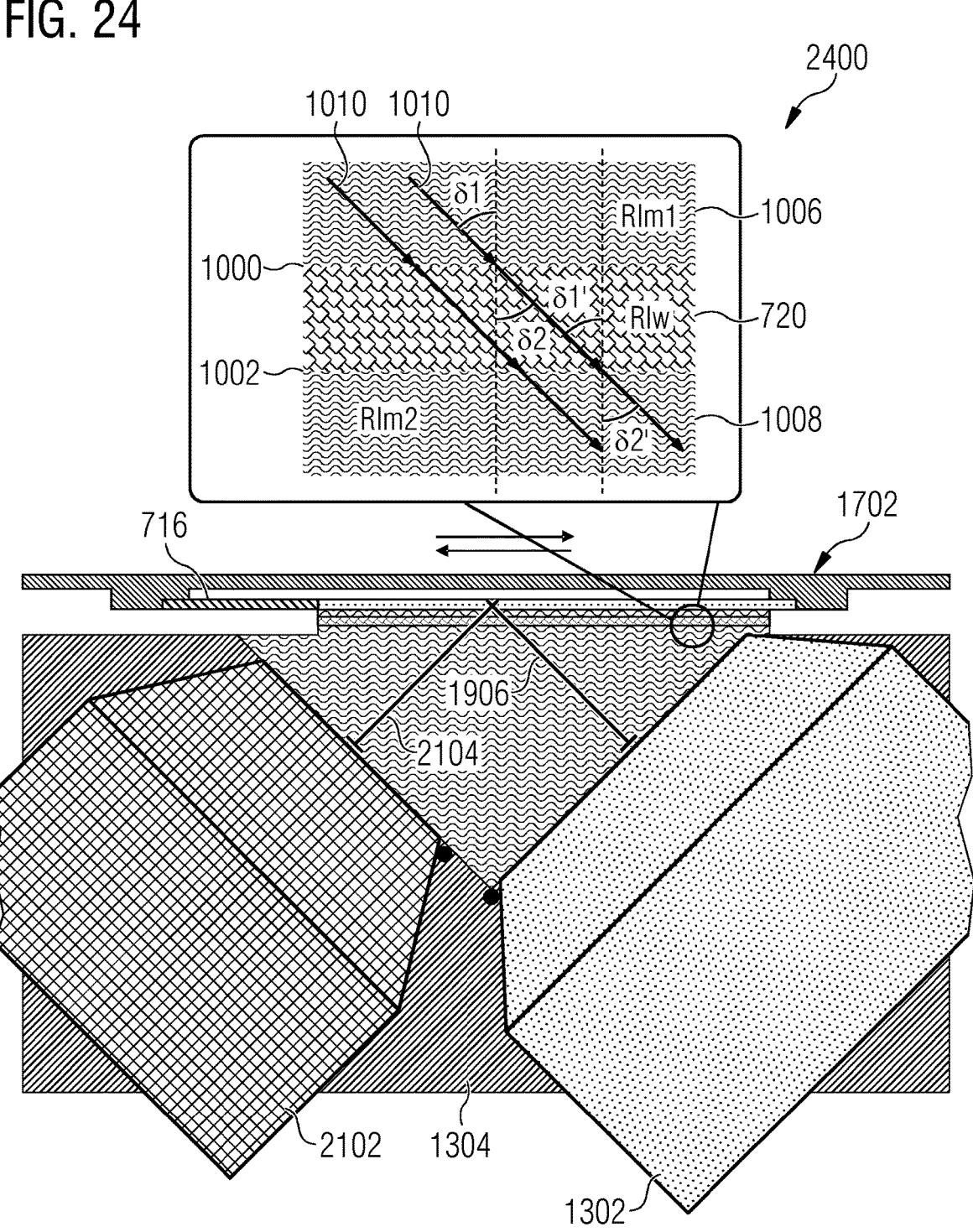
FIG. 24 shows a schematic view of an imaging system according to another embodiment.

FIG. 24 is a schematic view of an imaging system 2400 according to another embodiment. The imaging system 2400 according to FIG. 24 is distinguished from the imaging system 2200 according to FIG. 22 in having the movable sample carrier receiving portion 1702.

Since optical axes 1906, 2104 of the first and second objective 1302, 2102 intersect within the sample carrier 1202 and enclose and angle of about 90°, the object plane of the detection objective 1302 is parallel to the optical axis 2104 of the illumination objective 2102. Thereby, illumination provided through the second objective 2102, i.e. illumination objective, illuminates the object planes of the first objective 1302, i.e. the detection objective.

Figure 25:
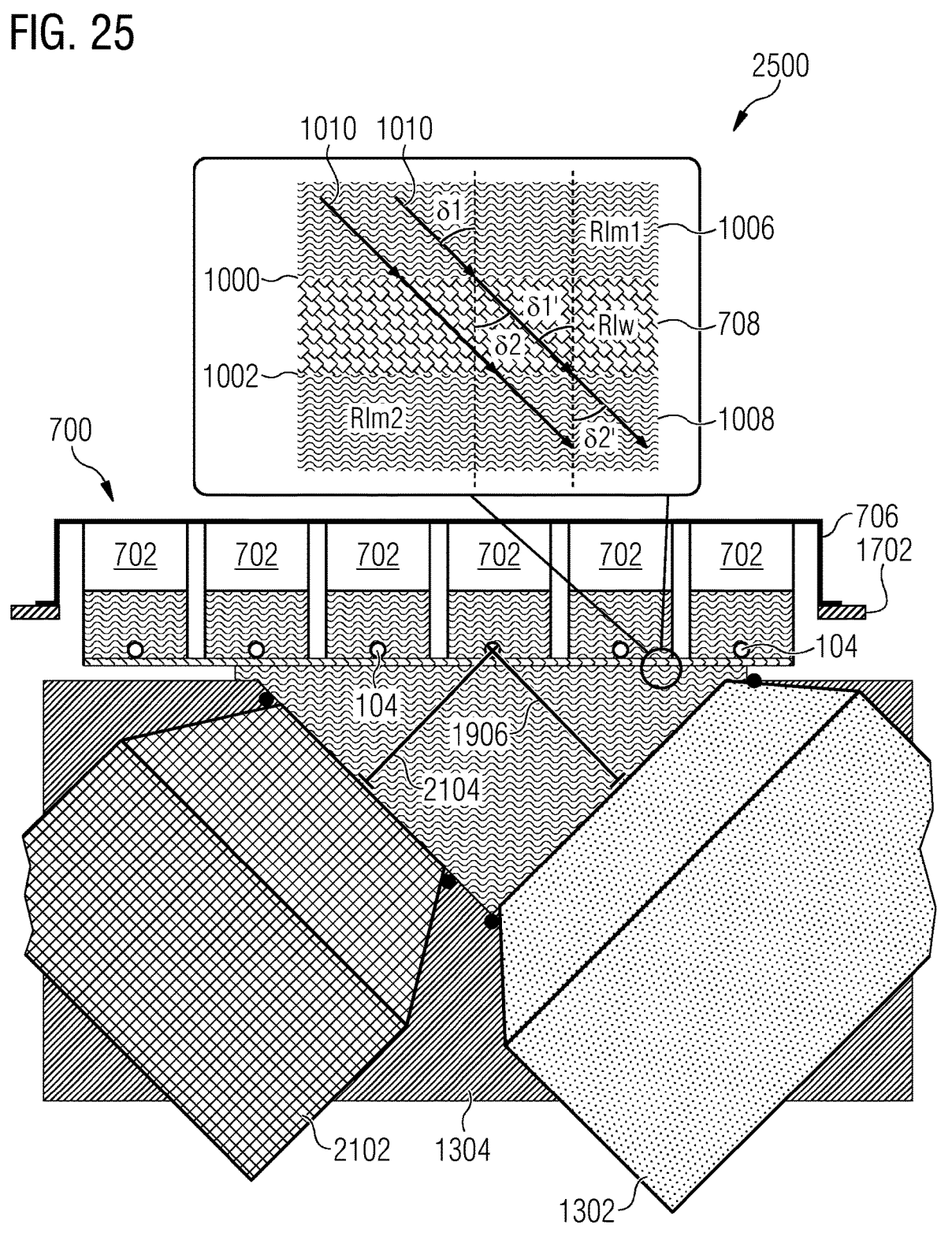

FIG. 25 is a schematic view of an imaging system 2500 according to another embodiment. The imaging system 2500 according to FIG. 25 is distinguished from the imaging system 2400 according to FIG. 24 in comprising the sample carrier 700 described above with reference to FIG. 7A.

Figure 26:
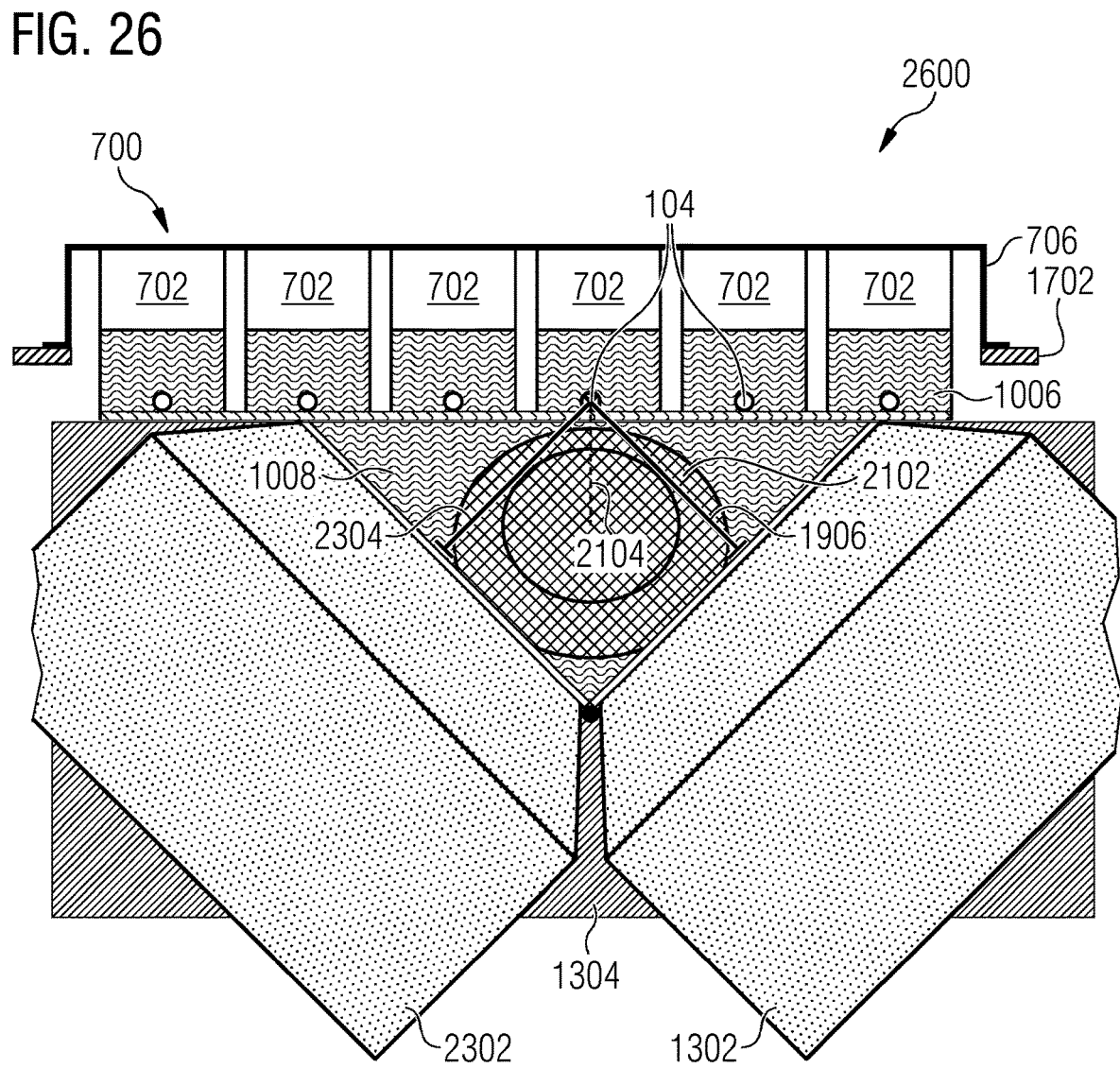
FIG. 26 shows a schematic view of an imaging system according to another embodiment.

FIG. 26 is a schematic view of an imaging system 2600 according to another embodiment. The imaging system 2600 according to FIG. 26 is distinguished from the imaging system 2500 according to FIG. 25 in having the second detection objective 2302. The two detection objectives 1302 and 2302 and the illumination objective 2102 are arranged in a comparable manner as shown and described in FIG. 23.

Figure 27:
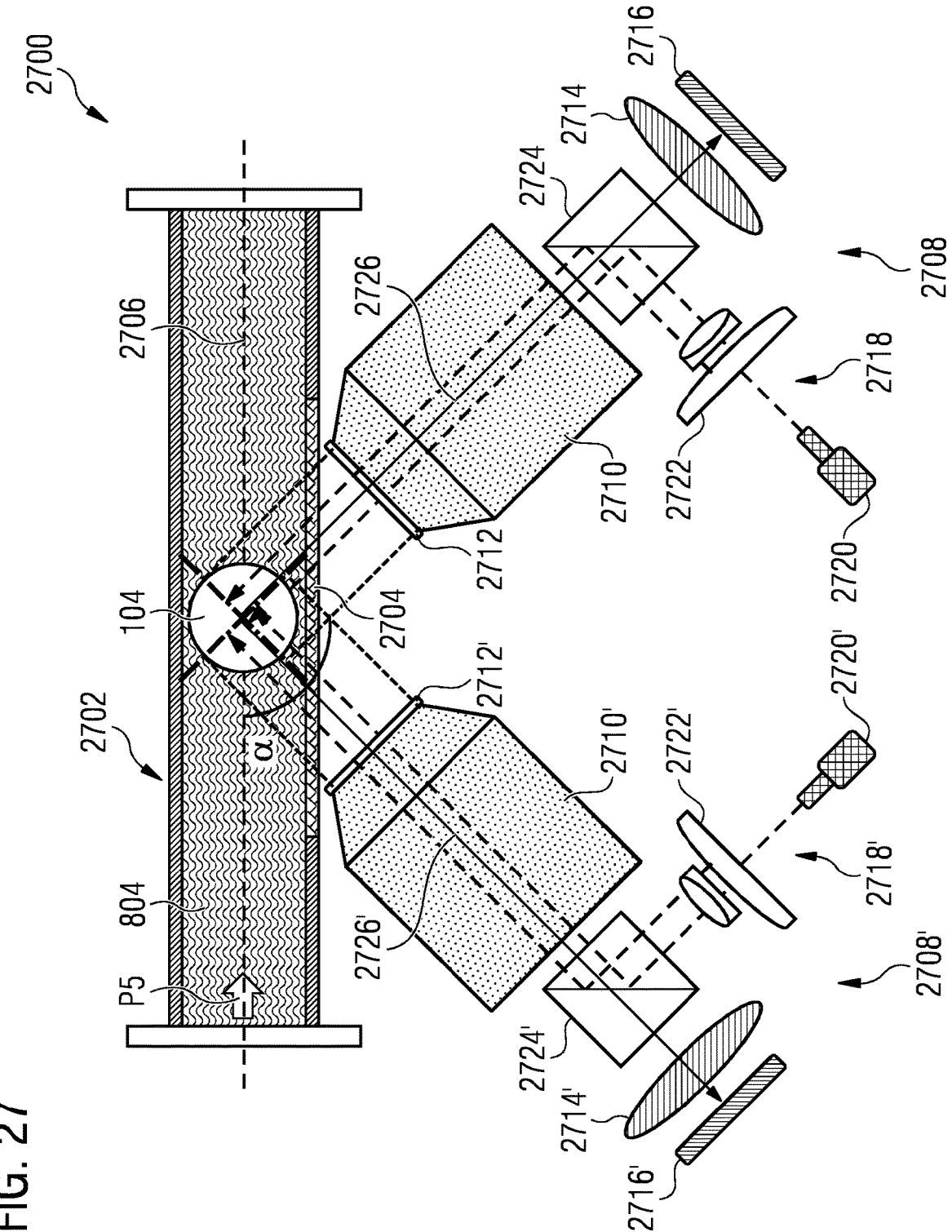
FIG. 27 shows a schematic view of an imaging system according to another embodiment.

FIG. 27 is a schematic view of an imaging system 2700 according to another embodiment.

The imaging system 2700 comprises a sample carrier 2702 that is exemplary formed as a flow cell, in particular one of the sample carriers described above with reference to FIGS. 7A to 9. The sample carrier 2702 has an optically transparent window portion 2704 arranged at a bottom side of the sample carrier 2702. The flow direction of the flow medium 804 is denoted by an arrow P5. Samples 104 embedded in the flow medium 804 are moving with the flow medium 804 along the flow direction. A reference plane 2706 perpendicular to the axis of gravity and parallel to the flow direction is denoted by a dashed line.

A first optical detection system 2708 of the imaging system 2700 has a first objective 2710 directed at the window portion 2704 of the sample carrier 2702. The optical axis 1210 of the first objective 2710 and the reference plane 2706 enclose an angle α of about 45°. The space between a front lens 2712 of the objective 2710 (as well as the space between the front lens 2712' of the second objective 2710') and the window portion 2704 is filled with a suitable, e.g. matched, immersion medium in a comparable manner as this is shown for example in FIG. 15 or 21. As is described above with reference to FIG. 10, almost no refraction takes place at the first optical interface, where the first optical medium 1006, i.e. the flow medium 804 in FIG. 27, and the window portion 2704 meet as well as at the second optical interface, where the window portion 2704 is in contact with the immersion medium. Thus, the tilt of the objective 2710 does lead to aberrations or coma. The first optical detection system 2708 further comprises a tube lens 2714 and a detection unit 2716. Detection light that is emitted by the sample 104 is received by the first objective 2710. The detection light is then directed via the tube lens 2714 onto the detection unit 2716. Thereby an image of the sample 104 is captured.

A first illumination system 2718 of the imaging system 2700 comprises a coupling port 2720 for coupling in illumination light. The coupling port 2720 may be a fiber coupling port connected to a light guide or a light fiber, or be configured for air coupling for use with high powered lasers. The illumination light is provided by an illumination light source unit 2800 that is described below with reference to FIG. 28. The first illumination system 2718 further comprises a light sheet forming unit 2722, and a beam splitter 2724. The light sheet forming unit 2722 will be described in more detail below with reference to FIGS. 32 and 33. The illumination light is directed at the light sheet forming unit 2722 in order to form a light sheet. The light sheet is directed at the beam splitter 2724. The beam splitter 2724 is configured to direct the light sheet into the first objective 2710 for illuminating the sample 104, and to direct the detection light received by the first objective 2710 onto the detection unit 2716 via the tube lens 2714. An alternative illumination system 3400 is described below with reference to FIG. 34.

The imaging system 2700 also comprises a second optical detection system 2708' having a second objective 2710'. The second objective 2710' is directed at the window portion 2704 of the sample carrier 2702. The optical axis 2726' of the second objective 2710' and the reference plane 2706 enclose an angle α of about 45°. The optical axes 2726, 2726' of the first and second objectives 2710, 2710' enclose an angle of about 90°. Otherwise, the second optical detection system 2708' is identical to the first optical detection system 2708.

The imaging system 2700 further comprises a second illumination system 2718'. The second illumination system 2718' is configured to illuminate the sample 104 via the second objective 2710' but otherwise identical to the first illumination system 2718.

Figure 28:
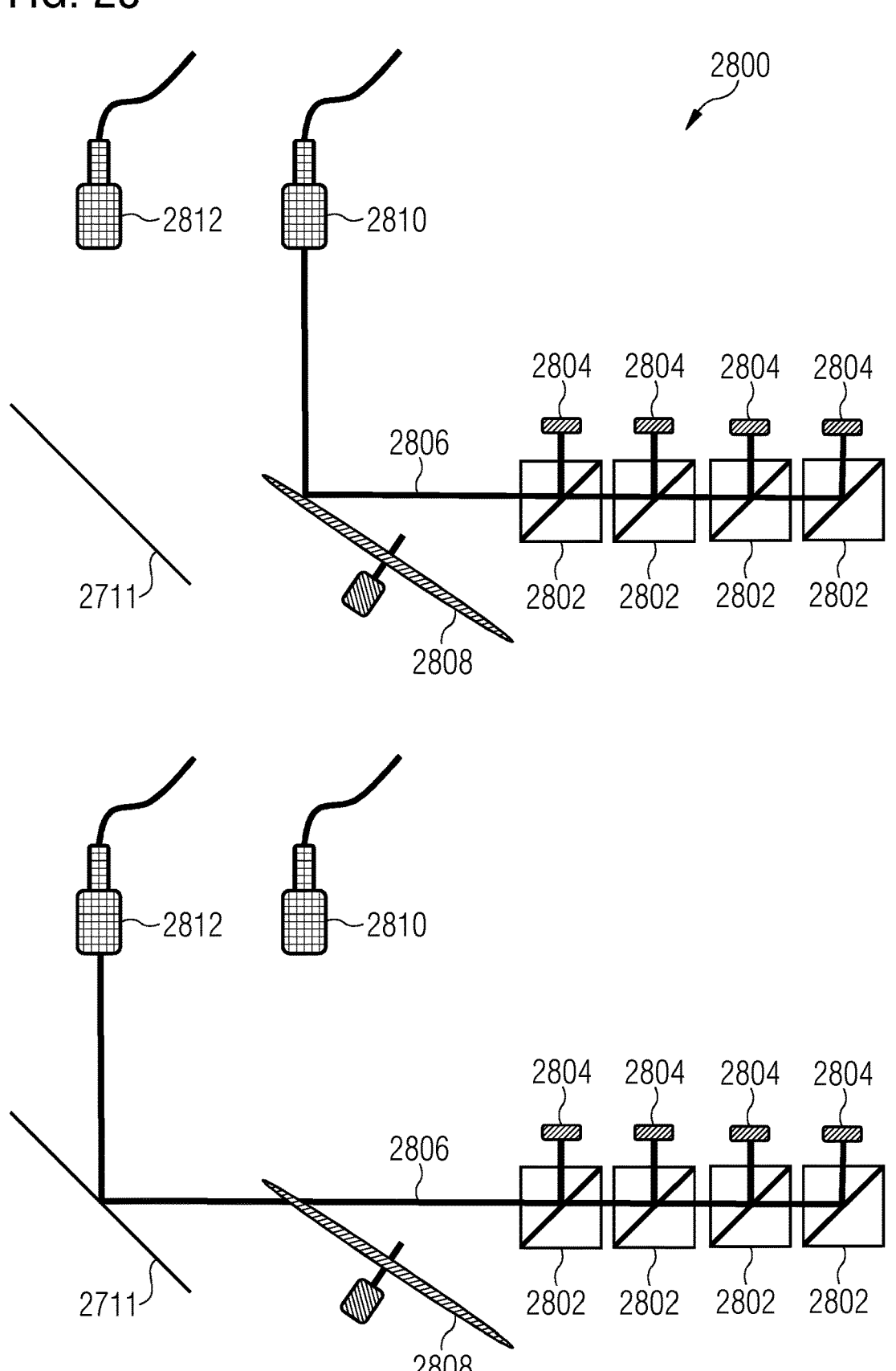
FIG. 28 is a schematic view of an illumination light source of the imaging system according to FIG. 27.

FIG. 28 is a schematic view of an illumination light source unit 2800 of the imaging system 2700 according to FIG. 27.

The illumination light source unit 2800 comprises four beam splitters 2802 that are arranged such that they combine illumination light from four light sources 2804 into a single beam 2806. The single beam 2806 is directed at a chopper wheel 2808 comprising holes and mirrors arranged alternately in a circumferential manner. When the beam meets a mirror of the chopper wheel, the beam is directed to a first coupling port 2810, as is shown in the upper view of FIG. 28. The first coupling port 2810 is connected to the coupling port 2720 of the first illumination system 2718. When the beam 2806 meets a hole of the chopper wheel 2808, the beam is directed via a mirror 2711 to a second coupling port 2812, as is shown in the lower view of FIG. 28. The second coupling port 2812 is connected to the coupling port 2720' of the second illumination system 2718'. Rotating the chopper wheel 2808 allows rapid switching of the light output between the two coupling ports 2810, 2812. The first and second coupling ports 2810, 2812 may be fiber coupling ports connected to light guides or light fibers, or be configured for air coupling for use with high intensity lasers.

Figure 29:
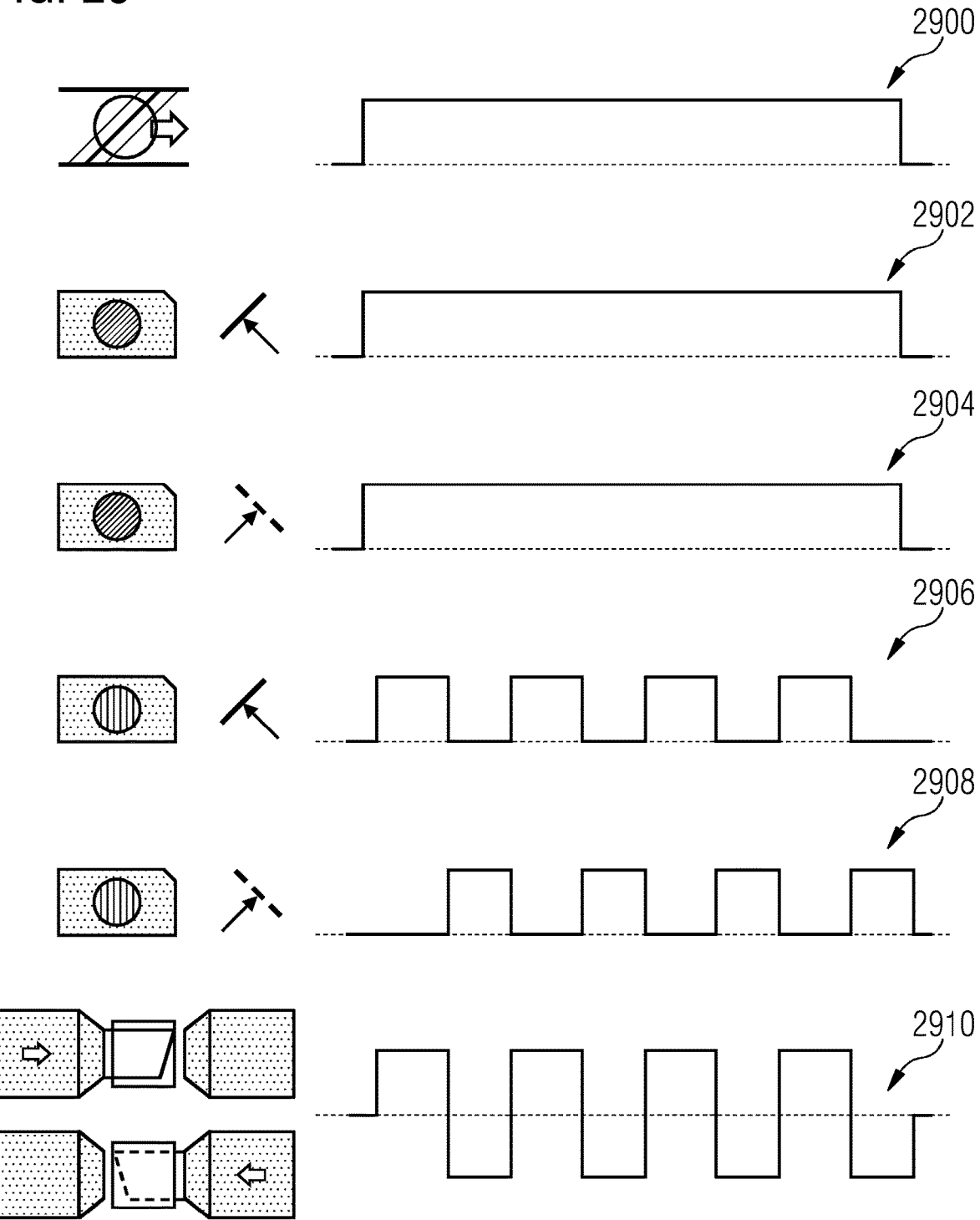
FIG. 29 is a diagram showing an exemplary synchronization scheme of an illumination unit and two imaging units of the imaging system according to FIG. 27.

FIG. 29 is a diagram showing an exemplary synchronization scheme of the illumination unit and the two imaging units of the imaging system 2700 according to FIGS. 27 and 28.

The diagram comprises 6 graphs 2900, 2902, 2904, 2906, 2908, 2910. The abscissa of each graph 2900, 2902, 2904, 2906, 2908, 2910 denotes time. A first graph 2900 shows whether a sample detection unit 3000, 3100 detects the passage of a sample 104 above the window portion 2704 of the sample carrier 2702. The sample detection unit 3000, 3100 is described in more detail below with reference to FIGS. 30 and 31. The graph 2900 shown has the value 0 when no passage is detected and the value 1 when the sample 104 is detected. A second and third graph 2902, 2904 show the exposure of the first and second optical detection system 2708, 2708', respectively. When the graph 2902, 2904 has the value 0, no image is captured. When the graph 2902, 2904 has the value 1, an image is captured by the first and second optical detection systems 2708, 2708' respectively. As can be seen by comparing the first, second and third diagrams 2900, 2902, 2904, the exposure is synchronized with the detection of the sample 104, i.e. when the sample 104 is detected above the window portion 2704, an image is captured by the first and second optical detection systems 2708, 2708'. A fourth and fifth graph 2906, 2908 show a shutter position of the first and second optical detection systems 2708, 2708', respectively. When the graph 2906, 2908 has the value 0, the shutter is closed and no (emission) light from the sample is detected by the detection unit 2716, 2716'. A shutter could be implemented in the form of a physical shutter, e.g. a chopper wheel having at least one opening, or by a "virtual shutter", i.e. an electronic shutter of the camera of the detection unit 2716, 2716'. When the graph 2906, 2908 has the value 1, the shutter is open and (emission) light from the sample is detected by the detection unit 2716, 2716'. A sixth graph 2910 shows which objective 2710 is used as illumination objective 2710, 2710', i.e. through which objective 2710, 2710' the light sheet is guided to the sample 104. When the graph 2910 has the value 0, no illumination takes place. When the graph 2910 has the value 1, the second objective 2710' is used as illumination objective, i.e. the object plane of the first objective 2710 is illuminated. When the graph 2910 has the value −1, the first objective 2710 is used as illumination objective, i.e. the object plane of the second objective 2710' is illuminated. As can be seen by comparing the fourth, fifth and sixth graph 2906, 2908, 2910, the shutter positions and the illumination are synchronized. When the shutter of the first optical detection system 2708 is open, the second objective 2710' is used as the illumination objective, and object plane of the first objective 2710 is illuminated. When the shutter of the second optical detection system 2708' is open, the first objective 2710 is used as the illumination objective, and object plane of the second objective 2710' is illuminated.

Figure 30:
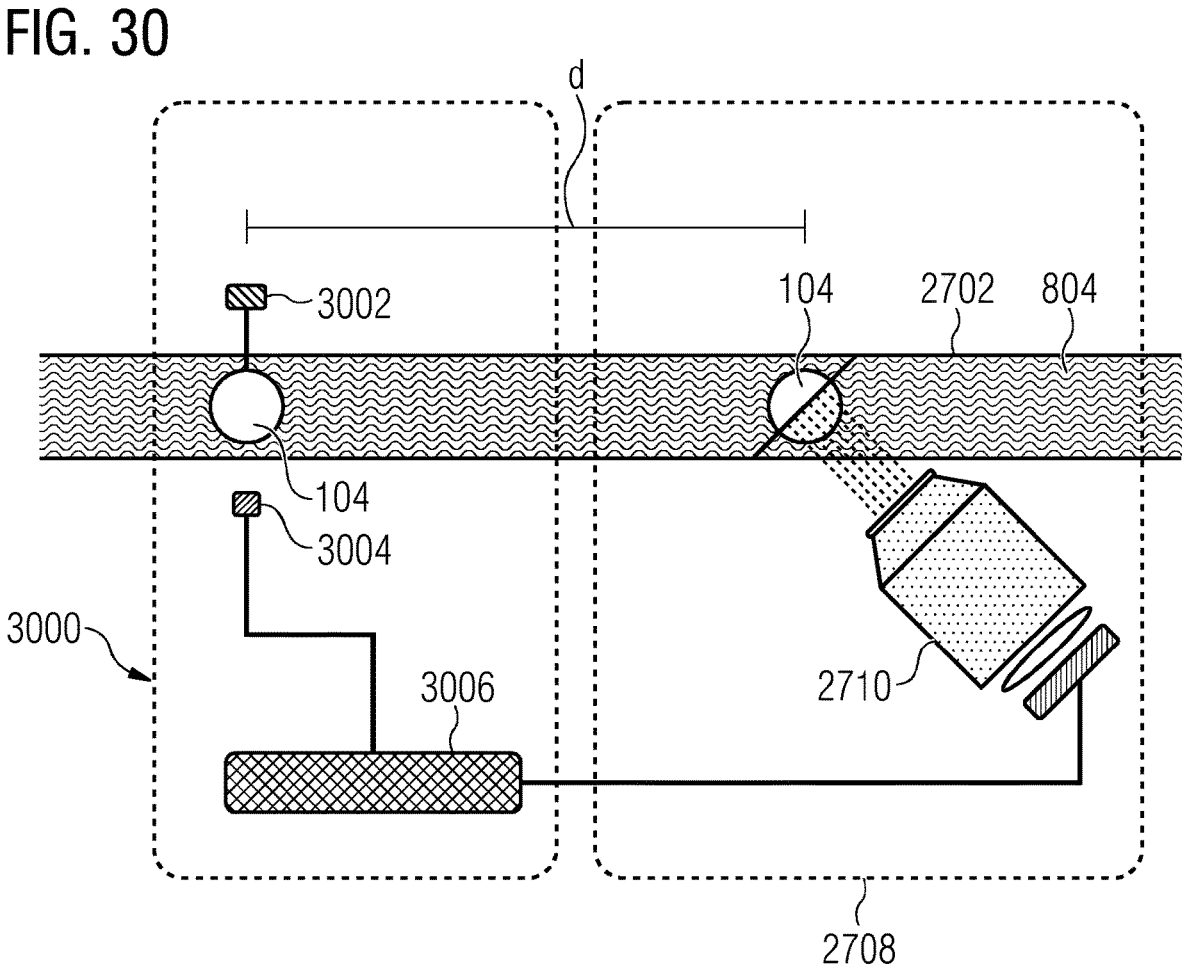
FIG. 30 is a schematic view of a sample detection unit according to an embodiment.

FIG. 30 is a schematic view of the sample detection unit 3000 according to an embodiment.

The sample detection unit 3000 comprises a light source 3002, light gate sensor 3004, and a processor 3006. The light source 3002 and the light gate sensor 3004 are arranged at opposite sides of the sample carrier 2702 such that a sample 104 passing between the light source 3002 and the light gate sensor 3004 can be detected by the light gate sensor 3004. A signal from the light gate sensor 3004 is received by the processor 3006 which calculates the arrival of the sample 104 above the optical imaging system 2700 or the optical detection system 2708 based on the flow speed of the flow medium 804 and the distance d between light gate sensor 3004 and the objective 2710 of the object plane of the optical detection system 2708.

Figure 31:
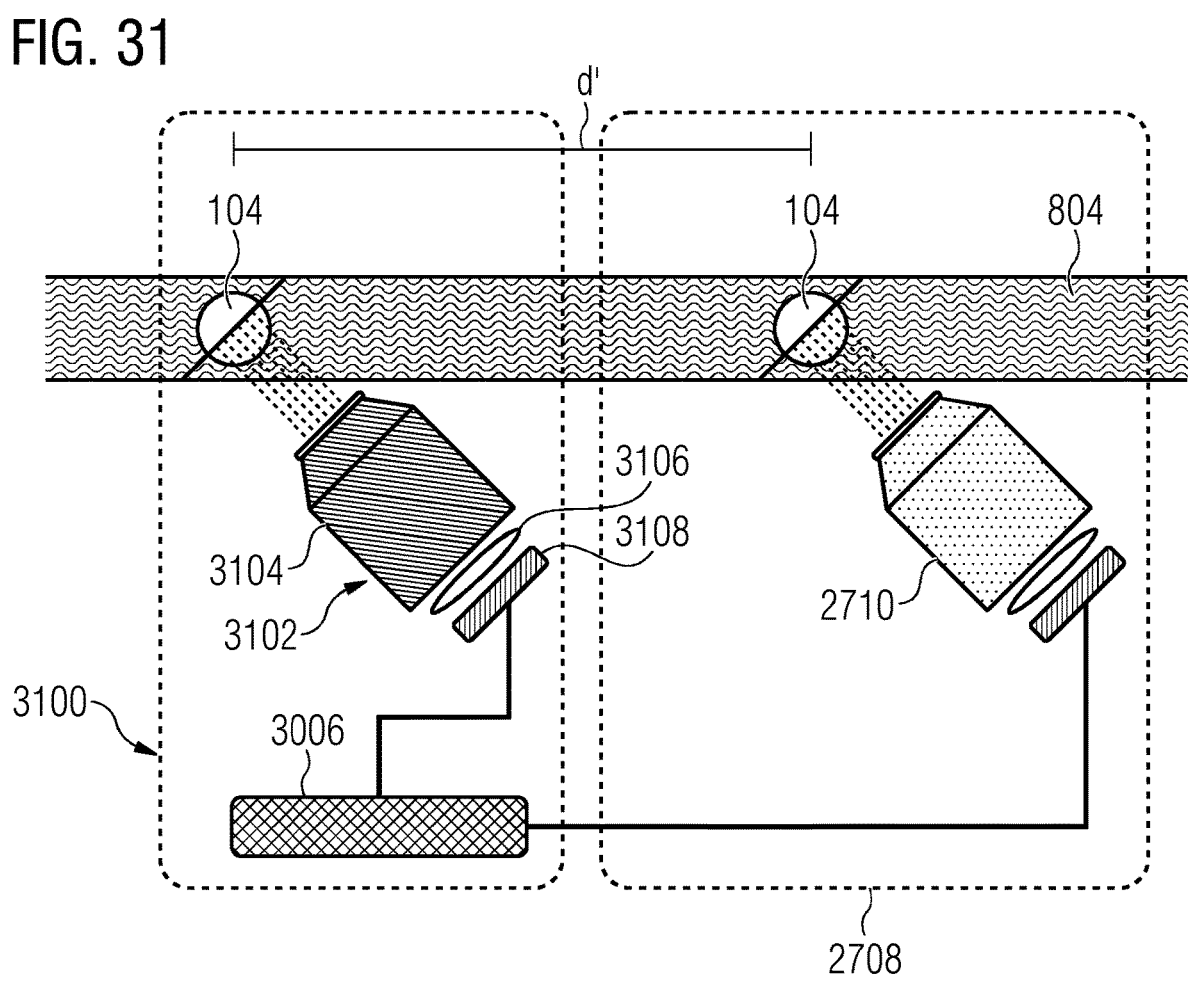

FIG. 31 is a schematic view of the sample detection unit 3100 according to another embodiment. The sample detection unit 3100 according to FIG. 31 is distinguished from the sample detection unit 3000 according to FIG. 30 in comprising an imaging sample detection system 3102 instead of the light source 3002 and light gate sensor 3004.

The imaging sample detection system 3102 comprises an objective 3104, a tube lens 3106 and a detector unit 3108 and is configured to detect whether a sample 104 is passing above the objective 2710 or its object plane. A signal from the imaging sample detection system 3102 is received by the processor 3006 which calculates the arrival of the sample 104 above the optical imaging system 2700 or the optical detection system 2708 based on the flow speed of the flow medium 804 and the distance d' between objective 3104 of the imaging sample detection system 3102 and the objective 2710 of the optical imaging system 2700.

The imaging sample detection system 3102 may also be configured for brightfield imaging of the sample 104. The transport intensity equation may be used to derive a three-dimensional representation of the sample 104. There is immersion between the objective 2710, 3104 and the respective window portion of the sample carrier 2702 shown in FIGS. 30 and 31.

Figures 32, 33:
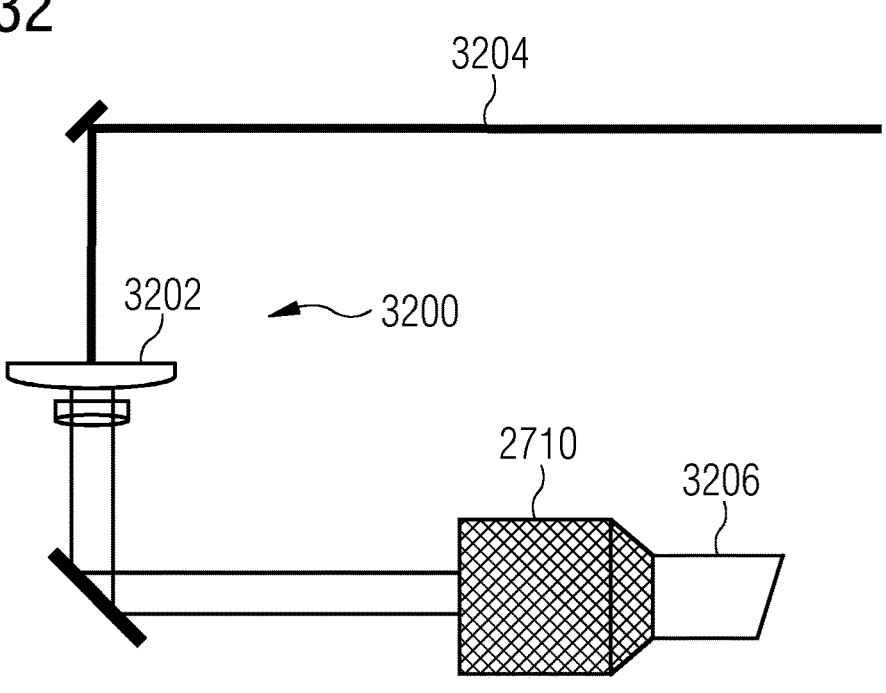
FIG. 32 shows the light sheet forming unit according to an embodiment.
FIG. 33 shows an illumination system according to an embodiment.

FIG. 32 shows a light sheet forming unit 3200 according to an embodiment.

The light sheet forming unit 3200 is exemplary formed by a cylindrical lens 3202. When the illumination light 3204 passes through the cylindrical lens 3202 a static light sheet 3206 is formed.

FIG. 33 show the light sheet forming unit 3300 according to another embodiment.

The light sheet forming unit 3300 according to FIG. 33 comprises a scan mirror 3302 and a cylindrical lens 3304. A chopper wheel 3306 is provided for stroboscopic illumination of the sample 104. Further, a spatial-light modulator element 3308 allows the illumination to be spatially patterned, which is advantageous as it allows structured illumination super resolution microscopy to be performed and/ or may be used for photomanipulation and/or photolithography applications and/or destriping/stripe reduction. An adaptive optical element 3310 allows the shape of the light sheet, in particular its length, waist and thickness, to be quickly adjusted, this is advantageous as the imaging may be used with sample 104 in different embedding, embedding and immersion media. Further, the adaptive optical element 3310 may be configured to allow adaptation to different refractive indices of embedding and immersion media as well as properties of the window portion 2704. The light source of the light sheet forming unit 3300 may be a white light laser WLL.

Figure 34:
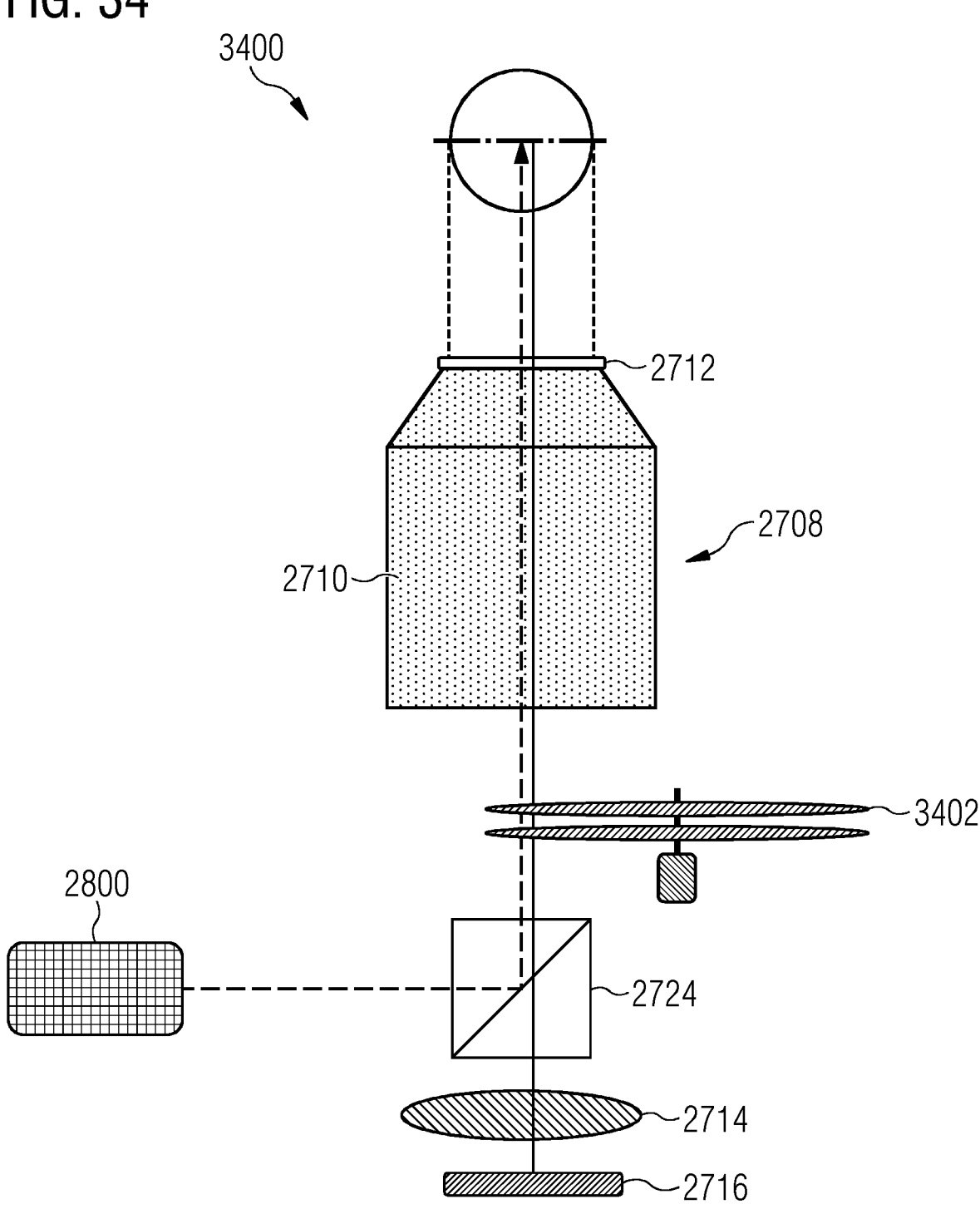
FIG. 34 shows an illumination system according to another embodiment.

FIG. 34 show illumination system 3400 according to another embodiment.

The illumination system 3400 comprises a spinning disk unit 3402. The spinning disk unit 3402 is arranged between the beam splitter 2724 and the objective 2710 of the optical detection system 2708 and configured to illuminate the sample 104 with light of the light source unit 2800 with a plurality of focal points generated by the spinning disk unit 3402. The light coming from the sample 104 passes the beam splitter 2724 and the tube lens 2714 and is detected by the detection unit 2716. The present embodiment provides good confocality and does not need a second illumination system. The illumination system 3400 may be combined with other optical sectioning modalities such as for example a light sheet illumination.

FIG. 35 shows schematic views of different point spread functions. A first column, in FIG. 35 to the left, schematically depicts illumination point spread functions 3500, 3504 with dotted lines and detection point spread functions 3502, 3506, 3508*a*, 3508*b*, 3510*a*, 3510*b*, 3510*c*, 3510*d*, 3510*e*, 3510*f* as solid lines. A second column, in FIG. 35 to the right, schematically depicts effective point spread functions 3512, 3514, 3516, 3518 that result from registration, deconvolution and fusion with a dashed line.

The point spread function describes how an optical system images a point object and determines the optical systems spatial resolution. As can be seen in a first row, the point spread functions 3500, 3502 of a typical objective, e.g. in a confocal laser scanning microscope arrangement, are ellipsoid and elongated along the optical axis of the objective, i.e. the z-axis. This means that the Z or axial-resolution is lower than X-Y or lateral resolution. A second row shows an illumination light distribution 3504 in comparison to the detection point spread function 3506 of a single objective in case of a light sheet illumination. As can be seen in FIG. 34, the illumination light distribution 3504 is much bigger than the detection point spread function 3506, and thus, the effective resolution is determined by the detection point spread function 3506.

A third row shows the point spread functions 3508*a*, 3508*b* of two objectives whose object planes intersect within the sample, e.g. under an angle of 90 degrees. The point spread functions 3508*a*, 3508*b* of the two objectives overlap and can therefore be combined into a single effective point spread function 3516 by means of registration, deconvolution and fusion of the individual images. The effective point spread function 3516 then comprises the intersection of the two individual point spread functions 3508*a*, 3508*b*. A can be seen in FIG. 35, the effective point spread function 3516 is approximately cube-shaped.

Using even more objectives, for example six objectives as shown in the fourth row, will result in an effective point spread function 3518 that approximates a sphere. Having a spherical effective point spread function corresponds to an isometric resolution, i.e. a comparable spatial resolution in all directions that is approximately equal to the lateral resolution of a single objective.

Figure 36:
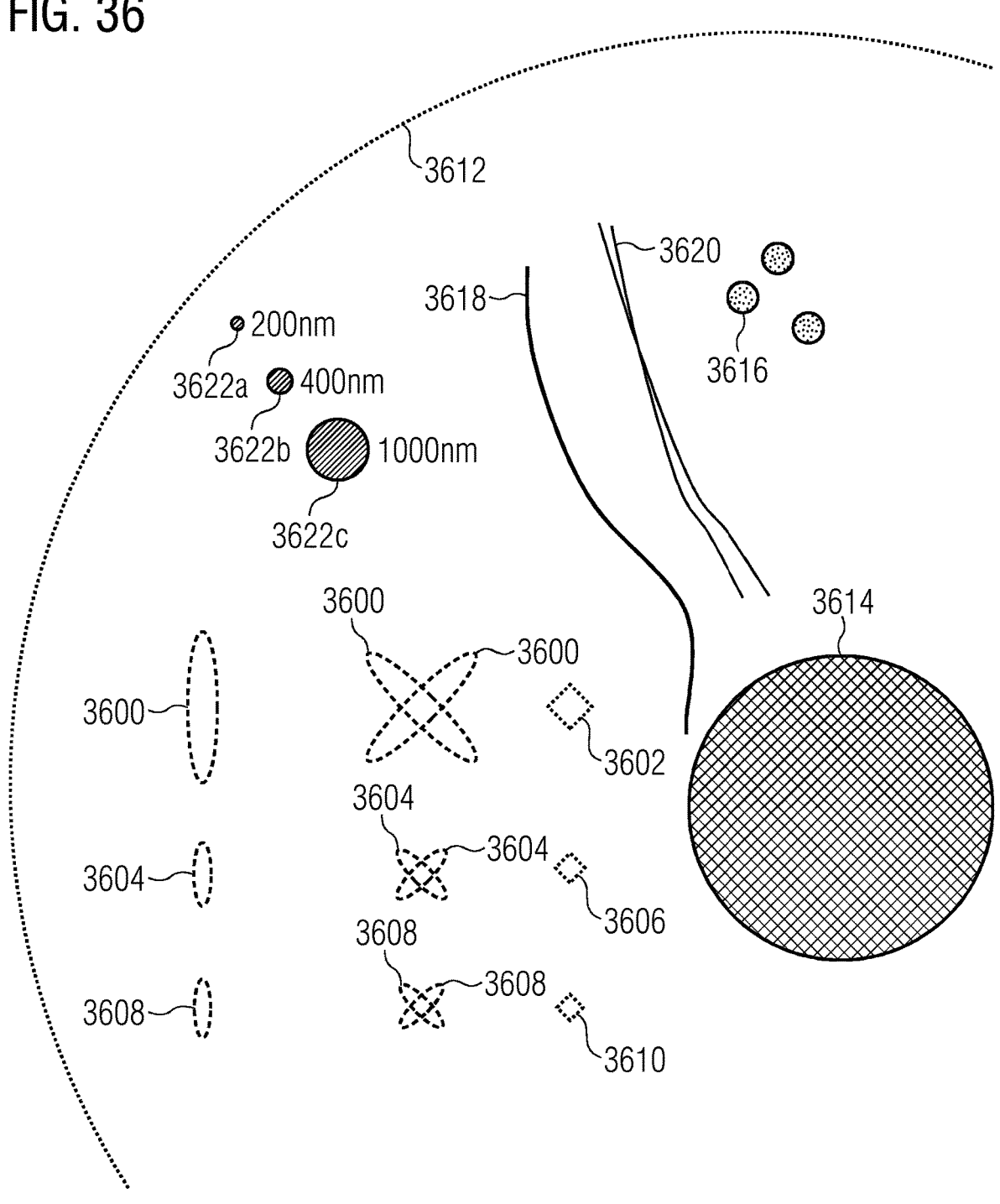
FIG. 36 is a schematic view of samples compared to the effective point spread functions of different objectives.

FIG. 36 is a schematic view of samples compared to the effective point spread functions of different objectives.

A first point spread function 3600 is the point spread function of a first objective having a magnification of 16 and a numerical aperture of 0.6. The axial resolution of the first objective is 2889 nm and its lateral resolution is 529 nm. By using two first objectives whose object planes intersect within the sample, the point spread functions 3600 of the two first objectives can be made to overlap. The point spread functions 3600 can then be combined into a single effective point spread function 3602 having a roughly isotropic resolution of about 529 nm.

A second point spread function 3604 is the point spread function of a second objective having a magnification of 25 and a numerical aperture of 0.95. The axial resolution of the second objective is 1152 nm and its lateral resolution is 334 nm. By using two second objectives whose object planes intersect within the sample, the point spread functions 3604 of the two second objectives can be made to overlap. The point spread functions 3604 can then be combined into a single effective point spread 3606 function having a roughly isotropic resolution of about 334 nm.

A third point spread function 3608 is the point spread function of a third objective having a magnification of 20 and a numerical aperture of 1.0. The axial resolution of the third objective is 1040 nm and its lateral resolution is 317 nm. By using two third objectives whose object planes intersect within the sample, the point spread functions 3608 of the two third objectives can be made to overlap. The point spread functions 3608 can then be combined into a single effective point spread function 3610 having a roughly isotropic resolution of about 317 nm. FIG. 36 further shows common biological structures. Exemplary a cell 3612 with a diameter of 25 μm, a nucleus 3614 with a diameter of 5 μm, a mitochondrium 3616 with a diameter of 500 nm, microtubules 3618 with a diameter of 25 nm, an actin filament 3620 with a diameter of 6 nm, as well as microspheres 3622*a*, 2622*b*, 3622*c* of 200, 400, and 1000 nm diameter are shown. As can be seen from FIG. 35 using two objectives with overlapping object planes followed by registration, deconvolution, and fusion yields effective point spread functions that are well suited to study subcellular dynamics and anatomy. Importantly, FIG. 35 also illustrates that an imaging system configured to perform dual view imaging with detection objectives having a numerical aperture in the range of 0.6 to 1.0 range would be well suited for imaging of subcellular structures like mitochondria 3616 and actin filaments 3620. When the sample is an expansion microscopy sample, that may be expanded by a factor of ~4, which would bring many structures otherwise inaccessible to this aperture range in a size range where these structures can be resolved by a corresponding detection optic.

FIG. 37 shows three diagrams illustrating how spectral information and fluorescence lifetime information can be used to increase the power of the imaging system to discriminate fluorescent dyes.

The upper and middle diagram show different excitation and emission spectra 3700 of fifteen fluorescent dyes grouped into three classes 3702*a*, 3702*b*, 3702*c* by their fluorescence lifetime t. Each class 3702*a*, 3702*b*, 3702*c* comprises five fluorescent dyes with different emission spectra each. For the sake of clarity only the first three of all fifteen emission spectra are denoted in FIG. 37 by reference numerals 3704*a*, 3704*b*, 3704*c*. The diagram upper diagram has three axes. A first axis denotes wavelength λ in nm, a second axis denotes intensity I, and a third axis denotes fluorescence lifetime τ in ns. Since the fluorescent dyes grouped are grouped by fluorescence lifetime, their emission spectra 3704*a*, 3704*b*, 3704*c* to appear in three distinct class 3702*a*, 3702*b*, 3702*c* along the third axis. These three classes 3702*a*, 3702*b*, 3702*c* are denoted in the upper diagram by rectangles with solid borders in the plane defined by the first and third axes and can also be named τ-gates. The classes 3702*a*, 3702*b*, 3702*c* too can be separated with for example at least one time-sensitive detector. Such a detector registers not only the wavelength spectrum or a part thereof, but also the arrival time of the captured fluorescence light from the sample. Alternatively, the detector may be time-gated, i.e. configured to register events within fluorescence lifetime gates. In FIG. 37 the lifetime gates correspond to the rectangles to with solid borders in the upper diagram. By separating the classes 3702a, 3702b, 3702c with a suitable detector, fluorescent dyes having significantly overlapping emission spectra but different fluorescence lifetimes—such as the group of three dyes denoted in FIG. 37 the rectangle with the dotted border—can be separated reliably into different channels.

The middle diagram shows a plot of the fluorescence lifetime vs. the emission spectrum, wherein the height reflects intensity. This leads to a topographic map-like graph 3706, which provides rich information that can be leveraged for the separation of fluorescent dyes. In particular, this approach may be used in conjunction with machine learning, deep learning or artificial intelligence approaches to train a classifier to separate fluorescent dyes.

The bottom diagram 3708 on the bottom schematically shows a phasor approach, which can be successfully used to separate fluorescent dyes species based on their fluorescence lifetime and/or spectral fluorescence lifetime. In the bottom diagram an angle represents the phase of a wave and the length of the vector resembles its amplitude. Phasors are an elegant and effective approach for spectral and/or lifetime based imaging. In particular, spectral FLIM phasors are used in conjunction with machine learning, deep learning or artificial intelligence approaches to train a class 3702a, 3702b, 3702c to separate fluorescent dyes.

The embodiments of the sample carrier and the imaging system described above allow high-speed volumetric spectral fluorescence lifetime-based imaging. They are ideally suited for imaging large sample volumes, for example high numbers of tissue microarrays, in a short time with a high number of markers. Likewise, they are ideally suited for life imaging and particularly suited for life imaging of a growing toolbox of FRET-based biosensors. For FRET-based biosensors applications the embodiments described above provide high imaging speeds and the possibility to perform FLIM-FRET, which renders assays largely invariant to differences in reporter concentration. As such the proposed embodiments combine highly desirable attributes of an imaging system into a solution that does not require the manufacturing of free-form optics and does not require the user to change the way the sample is being mounted, i.e. standard sample carrier formats albeit with a different index-matched transparent window portion can be used.

Identical or similarly acting elements are designated with the same reference signs in all Figures. As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Microplate
102, 126 Well
104 Sample
106 Embedding medium
108 Base
110 Cover
112, 116, 130, 228, 308, 404 Window portion
114 Petri-dish
118 Microscope slide
120, 128 Bottom portion
122 Cover glass
124 Chamber slide
200a, 200b, 200c, 200d, 214 Flow cell
202, 202a, 202b, 202c, 202d Fluidic channel
204 Flow medium
206, 206a, 206b, 206c, 206d, 218 Base portion
208, 222 Inlet
210, 224 Outlet
212, 212a, 212b, 212c, 212d, 226 Window portion
216 Microfluidic chip
220 Polymer
222 Inlet
224 Outlet
226 Microfluidic channel
228 microfluidic channel
300 Flow cell
302 fluidic channel
304 Reference plane
306 Orthogonal to (304)
400, 402 Optical interface
406, 408 Optical medium
410 Light ray
500 Imaging system
502 Reference plane
504 Optical detection system
506 Objective
508 Optical axis
510 Object plane
600 Imaging system
602 Optical element
700 Sample carrier
702 Well
704 Base 706 Cover
708 Window portion
710 Optical medium
712 Sample Carrier
714 Window portion
716 Sample Carrier
718 Base portion
720 Cover glass
722 Sample carrier
724 Well
726 Bottom portion
728 Sample carrier
730 Polymer
732 Support
800*a*, 800*b*, 800*c*, 800*d* Sample carrier
802, 802*a*, 802*b*, 802*c*, 802*d* Fluidic channel
804 Flow medium
806, 806*a*, 806*b*, 806,*c* 806*d* Base Portion
808 Inlet
810 Outlet
812, 812*a*, 812*b*, 812,*c* 812*d* Window portion
814 Sample carrier
816 Sample carrier
818 Base portion
820 Polymer
822 Inlet
824 Outlet
826 Microfluidic channel
828 Window portion
830 Sample Carrier
832 Window portion
834 Polymer
836 Support
900 Reference plane
902 Orthogonal
1000, 1002 Optical interface
1004 window portion
1006, 1008 Optical medium
1010 Light ray
1200 Imaging system
1202 Sample carrier
1204 Window portion
1206 Optical detection system
1211 Space between (1208) and (1204)
1300 Imaging system
1208, 1302 Objective
1304 Immersion container
1306 Lens
1400 Imaging system
1500 Imaging system
1502, 1610*a*, 1610*b* Optical axis
1600 Imaging system
1602*a*, 1602*b* Optical detection system
1604 Sample carrier
1606*a*, 1606*b* Window portion
1608*a*, 1608*b* Objective
1700 Imaging system
1702 Sample carrier receiving portion
1704 Tissue section
1706 Object plane
1800 Imaging system
1802 Object plane
1900 Imaging system
1902 Objective
1904, 1906 Optical axis
2000 Imaging system
2100 Imaging system 2200 Imaging system
2300 Imaging system
2102, 2302 Objective
2304 Optical axis
2400 Imaging system
2500 Imaging system
2600 Imaging system
2700 Imaging system
2702 Sample carrier
2704 Window portion
2706 Reference plane
2708, 2708' Optical detection system
2710, 2710' Objective
2711 mirror
2712, 2712', 2714, 2714' Lens
2716, 2716' Detection unit
2718, 2718' Illumination system
2720, 2720' Coupling port
2722, 2722' Light sheet forming unit
2724, 2724' Beam splitter
2726, 2726' Optical axis
2800 Light source unit
2802 Beam splitter
2804 Light source
2806 Light beam
2808 Wheel
2810 Coupling port
2812 Coupling port
2900, 2902, 2904, 2906, 2908, 2910 Graph
3000 Sample detection unit
3002 Light source
3004 Light gate sensor
3006 Processor
3100 Sample detection unit
3102 Optical sample detection unit
3104 Objective
3106 Lens
3108 Detector Unit
3200 Light sheet forming unit
3202 Lens
3204 Illumination light
3206 Light sheet
3300 Light sheet forming unit
3302 Scan mirror
3304 Lens
3306 Wheel
3308 Spatial-light modulator element
3400 Illumination system
3402 Spinning disk unit
3500, 3502, 3504, 3506, 3508*a*, 3508*b*, 3510*a*, 3510*b*, 3510*c*, 3510*d*, 3510*e*, 3510*f,* 3512, 3514, 3516, 3518, 3600, 3602, 3604, 3606, 3608, 3610 Point spread function
3612 Cell
3614 Nucleus
3616 Mitochondrium
3618 Microtube
3620 Actin filament
3622*a*, 3622*b*, 3622*c* Microsphere
3700 Spectrum
3702*a*, 3702*b*, 3702*c* Class
3704*a*, 3704*b*, 3704*c* Spectrum
3706 Graph
3708 Phasor diagram

The invention claimed is:

1. An imaging system for imaging a sample, comprising:
a sample carrier for receiving the sample, the sample carrier comprising:
an optical medium in which the sample is received, the optical medium having a first refractive index; and
a window portion defining two parallel surfaces that comprises an optically transparent material having a second refractive index, and that is arranged at a bottom side of the sample carrier, wherein the first and second refractive indices do not deviate by more than 2.5%;
a sample carrier receiving portion configured to receive the sample carrier;
an optical detection system, comprising a first objective arranged below, above or to the side of the sample carrier receiving portion and being configured to receive detection light emitted by the sample; and
a second objective arranged below, above or to the side of the sample carrier receiving portion and configured to receive the detection light emitted by the sample,
wherein an optical axis of the first objective and the parallel surfaces of the window portion enclose an oblique angle when the sample carrier is received in the sample carrier receiving portion, and
wherein an optical axis of the second objective and the parallel surfaces of the window portion enclose an oblique angle when the sample carrier is received in the sample carrier receiving portion.

2. The imaging system according to claim 1, wherein the sample carrier comprises at least one of a microplate, a carrier body, a lid or a cover, a sample container, a petri dish, a chamber slide, and a flow cell.

3. The imaging system according to claim 1, wherein the parallel surfaces are plan parallel surfaces.

4. The imaging system according to claim 1, wherein the optically transparent material is one of the following polymers or their derivatives: BIO-133, FEP, PEG-DA, PTFE, collagen, Matrigel™, agarose, alginate, cellulose, or polyacrylamide; and wherein the second refractive index has a value between 1.2977 and 1.3643.

5. The imaging system according to claim 1, wherein the optically transparent material is one of the following polymers or their derivatives: PMMA, EVASKY S87, or Optorez; and wherein the second refractive index has a value between 1.47 and 1.49.

6. The imaging system according to claim 1, wherein the optically transparent material is one of the following polymers or their derivatives: pSX-DPM, pMA-DPM, a polycarbonate, a polyphosphonate, or a polyester; and wherein the second refractive index has a value between 1.55 and 1.56.

7. The imaging system according to claim 1, wherein the angle enclosed by the optical axis of the at least one objective and the parallel surfaces of the window portion when the sample carrier is received in the sample carrier receiving portion is between 10° and 80°.

8. The imaging system according to claim 1, wherein the optical axis of the first objective and the optical axis of the second objective intersect each other; or wherein the first objective and the second objective are arranged relative to each other such that a field of view of the first objective and a field of view of the second objective intersect each other; or wherein the first objective and the second objective are adapted to generate different views of the sample.

9. The imaging system according to claim 1, further comprising an illumination system configured to create illumination light and to direct the illumination light through the first objective onto the sample.

10. The imaging system according to claim 9, wherein the illumination system is configured to form a light sheet by directing the illumination light through the first objective onto the sample.

11. The imaging system according to claim 1, wherein the sample carrier comprises at least one flow cell, the at least one flow cell comprising the window portion; wherein the imaging system comprises a fluid or pneumatic pump device configured to move the optical medium through the at least one flow cell, thereby moving samples received in the optical medium along a flow direction past the window portion, the flow direction being parallel to the parallel surfaces; and wherein the optical detection system is configured to sequentially image the samples being moved past the window portion.

12. The imaging system according to claim 1, wherein the sample carrier receiving portion is movable along at least one direction parallel to the parallel surfaces or relative to the first objective.

13. The imaging system according to claim 1, wherein the first objective is an immersion objective; wherein the imaging system comprises an immersion medium that is arranged between a front lens of the at least one objective and the window portion of the sample carrier; wherein the immersion medium has a third refractive index; and wherein the first and third refractive indices and/or the second and third refractive indices do not deviate by more than 2.5%.

14. The imaging system according to claim 1, wherein the optical detection system is a widefield microscope.

15. The imaging system according to claim 1, wherein the imaging system is configured to perform at least one of widefield microscopy, widefield fluorescence microscopy, spinning disc microscopy, fluorescence lifetime microscopy, and light sheet microscopy.

16. A method for imaging a sample with an imaging system, the method comprising the following steps:
providing a sample carrier having an optical medium for embedding the sample, the optical medium having a first refractive index, and a window portion defining two parallel surfaces, comprising an optically transparent material that has a second refractive index, and is arranged at a bottom side of the sample carrier, wherein the first and second refractive indices do not deviate by more than 2.5%;
arranging the sample in the sample carrier by immersing the sample in the optical medium;
positioning the sample carrier in a sample carrier receiving portion of an imaging device; and
capturing at least one image of the sample with an optical detection system of the imaging device, wherein the optical detection system comprises first objective arranged below, above or to the side of the sample carrier and configured to receive detection light emitted by the sample,
wherein the optical axis of the first objective and the parallel surfaces of the window portion enclose an oblique angle,
wherein the imaging system comprises a second objective arranged below, above or to the side of the sample carrier receiving portion and configured to receive the detection light emitted by the sample, and
wherein the optical axis of the second objective and the parallel surfaces of the window portion enclose an oblique angle when the sample carrier is received in the sample carrier receiving portion.

17. An imaging system for imaging a sample, comprising:

a sample carrier for receiving a sample, comprising:

an optical medium in which the sample is received, the optical medium having a first refractive index; and a window portion defining two parallel surfaces that comprises an optically transparent material having a second refractive index, and that is arranged at a bottom side of the sample carrier, wherein the first and second refractive indices do not deviate by more than 2.5%;

a sample carrier receiving portion configured to receive the sample carrier;

an optical detection system, comprising a first objective arranged below, above or to the side of the sample carrier receiving portion and being configured to receive detection light emitted by the sample, wherein an optical axis of the first objective and the parallel surfaces of the window portion enclose an oblique angle when the sample carrier is received in the sample carrier receiving portion; and a second objective arranged below, above or to the side of the sample carrier receiving portion and configured to receive the detection the light emitted by the sample, wherein an optical axis of the second objective and the parallel surfaces of the window portion enclose an oblique angle when the sample carrier is received in the sample carrier receiving portion, wherein at least one of an illumination characteristic and a detection characteristic are different for the first objective and for the second objective for generating images from different dyes in the sample with the first and the second objective, or wherein the optical axis of the first objective encloses an angle with the optical axis of the second objective within a range of 50° to 90°.

18. The imaging system according to claim 17, wherein the at least one of the illumination characteristic and the detection characteristic are different for the first objective and for the second objective for generating images from different dyes in the sample with the first and the second objective.

19. The imaging system according to claim 17, wherein the optical axis of the first objective encloses the angle with the optical axis of the second objective within the range of 50° to 90°.

20. A method for imaging a sample with an imaging system, the method comprising the following steps:

providing a sample carrier having an optical medium for embedding the sample, the optical medium having a first refractive index, and a window portion defining two parallel surfaces, comprising an optically transparent material that has a second refractive index, and is arranged at a bottom side of the sample carrier, wherein the first and second refractive indices do not deviate by more than 2.5%;

arranging the sample in the sample carrier by immersing the sample in the optical medium;

positioning the sample carrier in a sample carrier receiving portion of an imaging device; and capturing at least one image of the sample with an optical detection system of the imaging device, wherein the optical detection system comprises a first objective arranged below, above or to the side of the sample carrier and configured to receive detection light emitted by the sample, wherein the optical axis of the first objective and the parallel surfaces of the window portion enclose an oblique angle, wherein the imaging system comprises a second objective arranged below, above or to the side of the sample carrier receiving portion and configured to receive the detection light emitted by the sample, and wherein the optical axis of the second objective and the parallel surfaces of the window portion enclose an oblique angle when the sample carrier is received in the sample carrier receiving portion, wherein at least one of an illumination characteristic and a detection characteristic are different for the first objective and for the second objective for generating images from different dyes in the sample with the first and the second objective, or wherein the optical axis of the first objective encloses an angle with the optical axis of the second objective within a range of 50° to 90°.

*    *    *    *    *